(12) United States Patent
Ooishi et al.

(10) Patent No.: US 10,927,940 B2
(45) Date of Patent: Feb. 23, 2021

(54) BICYCLE SPROCKET

(71) Applicant: SHIMANO INC., Sakai (JP)

(72) Inventors: Toshinari Ooishi, Sakai (JP); Sota Yamaguchi, Sakai (JP)

(73) Assignee: SHIMANO INC., Sakai (JP)

(*) Notice: Subject to any disclaimer, the term of this patent is extended or adjusted under 35 U.S.C. 154(b) by 47 days.

(21) Appl. No.: 16/441,008

(22) Filed: Jun. 14, 2019

(65) Prior Publication Data

US 2019/0293166 A1 Sep. 26, 2019

Related U.S. Application Data

(62) Division of application No. 15/410,653, filed on Jan. 19, 2017, now Pat. No. 10,378,637.

(51) Int. Cl.
*F16H 55/30* (2006.01)
*B62M 9/10* (2006.01)
*B62M 9/00* (2006.01)

(52) U.S. Cl.
CPC ............... *F16H 55/30* (2013.01); *B62M 9/10* (2013.01); *B62M 9/00* (2013.01); *B62M 2009/007* (2013.01)

(58) Field of Classification Search
CPC .................................. F16H 55/30; B62M 9/10
USPC .................................................. 474/156, 160
See application file for complete search history.

(56) References Cited

U.S. PATENT DOCUMENTS

| | | | | |
|---|---|---|---|---|
| 586,991 A * | 7/1897 | Curley | ................... | F16H 55/30 474/156 |
| 3,969,947 A * | 7/1976 | Martin | ................... | F16H 55/30 474/156 |
| 4,174,642 A * | 11/1979 | Martin | ................... | F16H 55/30 474/152 |
| 8,888,631 B2 * | 11/2014 | Morita | ................... | F16H 55/30 474/153 |
| 9,062,758 B2 * | 6/2015 | Reiter | ................... | F16H 55/30 |
| 9,086,138 B1 * | 7/2015 | Emura | ................... | F16H 7/06 |
| 9,150,277 B2 * | 10/2015 | Emura | ................... | B62M 3/00 |
| 9,182,027 B2 * | 11/2015 | Reiter | ................... | B62M 9/105 |
| 9,316,302 B2 * | 4/2016 | Braedt | ................... | F16H 55/30 |
| 9,328,814 B2 * | 5/2016 | Wesling | ................... | F16H 55/30 |
| 9,394,986 B2 * | 7/2016 | Pfeiffer | ................... | B62M 9/105 |
| 9,394,987 B2 * | 7/2016 | Pfeiffer | ................... | F16H 55/30 |

(Continued)

OTHER PUBLICATIONS

Office Action issued by the U.S. Patent and Trademark Office for U.S. Appl. No. 15/410,653, dated Dec. 11, 2018.

*Primary Examiner* — Henry Y Liu
(74) *Attorney, Agent, or Firm* — Mori & Ward, LLP

(57) ABSTRACT

A bicycle sprocket comprises a sprocket body and sprocket teeth. The sprocket teeth include at least one first tooth. The at least one first tooth has a first maximum chain-engaging width, a first tooth center plane, a first projection, and a second projection. The first maximum chain-engaging width is defined in an axial direction parallel to a rotational center axis. The first tooth center plane is defined to bisect the first maximum chain-engaging width in the axial direction. The first projection has a first maximum axial length defined from the first tooth center plane in the axial direction. The second projection has a second maximum axial length defined from the first tooth center plane in the axial direction. The second maximum axial length is different from the first maximum axial length.

12 Claims, 52 Drawing Sheets

(56) References Cited

U.S. PATENT DOCUMENTS

| | | | | |
|---|---|---|---|---|
| 9,404,565 B2* | 8/2016 | Pfeiffer | ............ | F16H 55/30 |
| 9,581,229 B2* | 2/2017 | Pfeiffer | ............ | F16H 55/30 |
| 9,581,230 B2* | 2/2017 | Pfeiffer | ............ | F16H 55/30 |
| 9,581,231 B2* | 2/2017 | Pfeiffer | ............ | F16H 55/30 |
| 9,625,027 B2* | 4/2017 | Pfeiffer | ............ | F16H 55/30 |
| 9,701,364 B2* | 7/2017 | Sugimoto | ............ | B62M 9/105 |
| 9,719,590 B2* | 8/2017 | Reiter | ............ | F16H 55/30 |
| 9,873,481 B2* | 1/2018 | Braedt | ............ | B62M 9/10 |
| 2007/0054768 A1* | 3/2007 | Miyazawa | ............ | F16H 55/30 474/152 |
| 2013/0139642 A1* | 6/2013 | Reiter | ............ | B62M 9/08 74/594.2 |
| 2013/0184110 A1* | 7/2013 | Reiter | ............ | F16H 55/30 474/152 |
| 2014/0364259 A1* | 12/2014 | Reiter | ............ | B62M 9/10 474/155 |
| 2015/0198231 A1* | 7/2015 | Emura | ............ | F16H 7/06 474/156 |
| 2015/0226305 A1* | 8/2015 | Pfeiffer | ............ | B62M 9/105 474/152 |
| 2015/0226306 A1* | 8/2015 | Pfeiffer | ............ | B62M 9/105 474/152 |
| 2015/0226307 A1* | 8/2015 | Pfeiffer | ............ | B62M 9/105 474/152 |
| 2015/0226308 A1* | 8/2015 | Pfeiffer | ............ | B62M 9/10 474/152 |
| 2015/0239528 A1* | 8/2015 | Barefoot | ............ | B62M 9/00 474/152 |
| 2015/0285362 A1* | 10/2015 | Pfeiffer | ............ | B62M 9/10 474/152 |
| 2015/0285363 A1* | 10/2015 | Pfeiffer | ............ | F16H 55/30 474/152 |
| 2015/0285364 A1* | 10/2015 | Pfeiffer | ............ | B62M 9/10 474/152 |
| 2015/0291255 A1* | 10/2015 | Nishimoto | ............ | B62M 9/06 474/152 |
| 2015/0337943 A1* | 11/2015 | Sugimoto | ............ | B62M 9/00 474/152 |
| 2016/0052597 A1 | 2/2016 | Reiter et al. | | |
| 2016/0238122 A1* | 8/2016 | Medaglia | ............ | F16H 55/12 |
| 2016/0298752 A1* | 10/2016 | Winans | ............ | B62M 9/00 |
| 2017/0234418 A1* | 8/2017 | Barefoot | ............ | F16H 55/30 474/156 |
| 2017/0247081 A1* | 8/2017 | Sugimoto | ............ | B62M 9/10 |
| 2017/0355422 A1* | 12/2017 | Sugimoto | ............ | B62M 9/12 |
| 2017/0370462 A1* | 12/2017 | Akanishi | ............ | F16H 55/303 |
| 2018/0112764 A1* | 4/2018 | Sugimoto | ............ | B62M 1/36 |
| 2018/0141615 A1* | 5/2018 | Sugimoto | ............ | B62M 9/12 |
| 2018/0170479 A1* | 6/2018 | Sugimoto | ............ | B62M 9/105 |
| 2018/0178880 A1* | 6/2018 | Akanishi | ............ | B62M 9/10 |
| 2018/0180157 A1* | 6/2018 | Akanishi | ............ | B62M 9/12 |
| 2018/0290712 A1* | 10/2018 | Taniguchi | ............ | F16H 55/30 |

\* cited by examiner

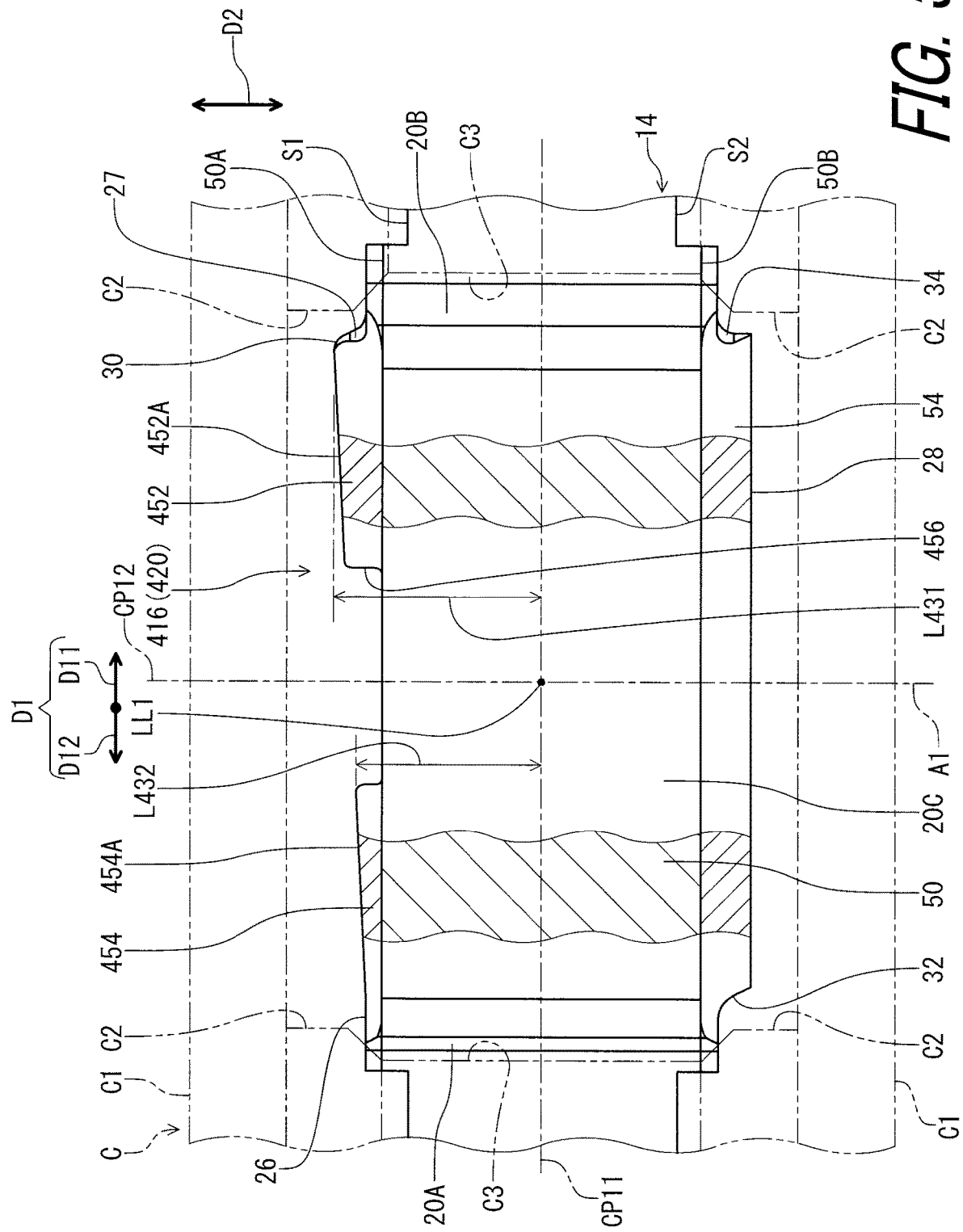

BICYCLE SPROCKET

CROSS-REFERENCE TO RELATED APPLICATIONS

The present application is a divisional application of the U.S. patent application Ser. No. 15/410,653 filed Jan. 19, 2017. The contents of this application are incorporated herein by reference in their entirety.

BACKGROUND OF THE INVENTION

Field of the Invention

The present invention relates to a bicycle sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle sprocket comprises a sprocket body and sprocket teeth. The sprocket teeth extend radially outwardly from an outer periphery of the sprocket body with respect to a rotational center axis of the bicycle sprocket. The sprocket teeth include at least one first tooth. The at least one first tooth has a first maximum chain-engaging width, a first tooth center plane, a first projection, and a second projection. The first maximum chain-engaging width is defined in an axial direction parallel to the rotational center axis. The first tooth center plane is defined to bisect the first maximum chain-engaging width in the axial direction. The first projection has a first maximum axial length defined from the first tooth center plane in the axial direction. The second projection has a second maximum axial length defined from the first tooth center plane in the axial direction. The second maximum axial length is different from the first maximum axial length.

With the bicycle sprocket according to the first aspect, the first projection and the second projection improve chain-holding performance of the bicycle sprocket even if the bicycle chain is inclined relative to the bicycle sprocket along a specific chain line.

In accordance with a second aspect of the present invention, the bicycle sprocket according to the first aspect is configured so that the sprocket teeth further includes at least one second tooth. The at least one second tooth has a second maximum chain-engaging width defined in the axial direction, the first maximum chain-engaging width being larger than the second maximum chain-engaging width.

With the bicycle sprocket according to the second aspect, the first projection and the second projection further improve the chain-holding performance of the bicycle sprocket.

In accordance with a third aspect of the present invention, the bicycle sprocket according to the second aspect is configured so that the first maximum chain-engaging width is larger than an axial length of an inner link space defined between an opposed pair of inner link plates of a bicycle chain in the axial direction and smaller than an axial length of an outer link space defined between an opposed pair of outer link plates of the bicycle chain in the axial direction. The second maximum chain-engaging width is smaller than the axial length of the inner link space.

With the bicycle sprocket according to the third aspect, the at least one first tooth further improves the chain-holding performance of the bicycle sprocket.

In accordance with a fourth aspect of the present invention, the bicycle sprocket according to any one of the first to third aspects is configured so that the first projection at least partly overlaps with the second projection when viewed in a circumferential direction with respect to the rotational center axis.

With the bicycle sprocket according to the fourth aspect, the first projection and the second projection further improves the chain-holding performance of the bicycle sprocket since the first projection and the second projection are more likely to contact the bicycle chain.

In accordance with a fifth aspect of the present invention, the bicycle sprocket according to any one of the first to fourth aspects is configured so that the first maximum axial length is larger than the second maximum axial length.

With the bicycle sprocket according to the fifth aspect, the first projection and the second projection further improves the chain-holding performance of the bicycle sprocket.

In accordance with a sixth aspect of the present invention, the bicycle sprocket according to the fifth aspect is configured so that the first projection is provided on an upstream side of the second projection in a driving rotational direction in which the bicycle sprocket is rotated during pedaling.

With the bicycle sprocket according to the sixth aspect, the first projection and the second projection effectively improve the chain-holding performance of the bicycle sprocket even if the bicycle chain is inclined relative to the bicycle sprocket along a specific chain line.

In accordance with a seventh aspect of the present invention, the bicycle sprocket according to the fifth aspect is configured so that the first projection is provided on a downstream side of the second projection in a driving rotational direction in which the bicycle sprocket is rotated during pedaling.

With the bicycle sprocket according to the seventh aspect, the first projection and the second projection effectively improve the chain-holding performance of the bicycle sprocket even if the bicycle chain is inclined relative to the bicycle sprocket along a specific chain line.

In accordance with an eighth aspect of the present invention, the bicycle sprocket according to any one of the first to seventh aspects is configured so that at least one of the first projection and the second projection includes an inclined surface inclined with respect to the first tooth center plane in a circumferential direction with respect to the rotational center axis.

With the bicycle sprocket according to the eighth aspect, the first projection and the second projection effectively improve the chain-holding performance of the bicycle sprocket even if the bicycle chain is inclined relative to the bicycle sprocket along a specific chain line.

In accordance with a ninth aspect of the present invention, the bicycle sprocket according to any one of the first to seventh aspects is configured so that at least one of the first projection and the second projection includes a projection end having a curved surface.

With the bicycle sprocket according to the ninth aspect, the curved surface reduces wear of the at least one first tooth.

In accordance with a tenth aspect of the present invention, the bicycle sprocket according to any one of the first to ninth aspects is configured so that the at least one first tooth includes a first tooth body. The first tooth body includes a first axial surface and a first additional axial surface provided on a reverse side of the first axial surface in the axial direction. At least one of the first projection and the second projection is attached to the first axial surface as a separate member from the first tooth body.

With the bicycle sprocket according to the tenth aspect, it is possible to expand the range of choices for material of the at least one of the first projection and the second projection.

In accordance with an eleventh aspect of the present invention, the bicycle sprocket according to the tenth aspect is configured so that at least one of the first projection and the second projection is made of a metallic material.

With the bicycle sprocket according to the eleventh aspect, the metallic material provides the at least one first tooth with the wear resistance.

In accordance with a twelfth aspect of the present invention, the bicycle sprocket according to the tenth aspect is configured so that at least one of the first projection and the second projection is made of a non-metallic material.

With the bicycle sprocket according to the twelfth aspect, the non-metallic material reduces noise of the bicycle sprocket and/or saves weight of the bicycle sprocket.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 52 is a plan view of a first tooth of a bicycle sprocket in accordance with another modification of the fourth embodiment.

DESCRIPTION OF THE EMBODIMENTS

Figure 1:
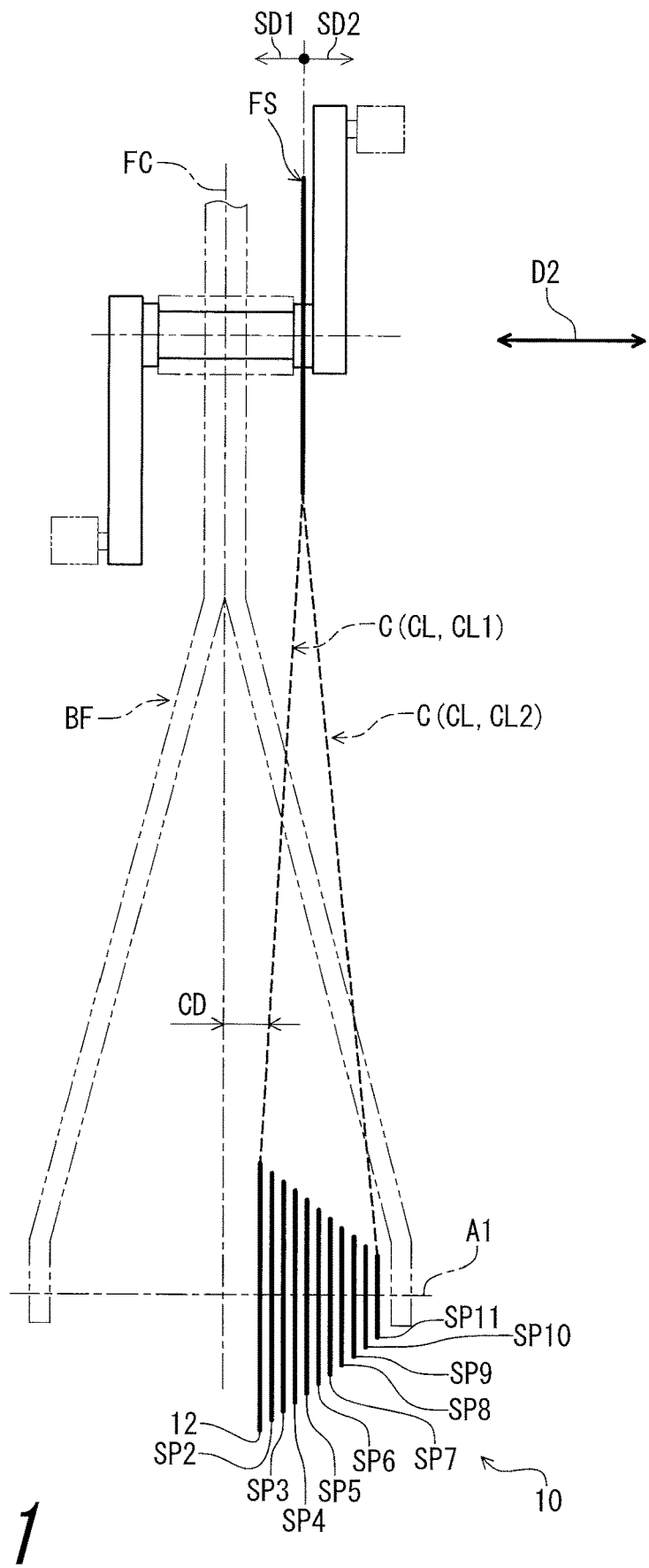
FIG. 1 is a schematic diagram of a bicycle drive train including a bicycle sprocket assembly comprising a bicycle sprocket in accordance with a first embodiment.

The embodiment(s) will now be described with reference to the accompanying drawings, wherein like reference numerals designate corresponding or identical elements throughout the various drawings.

First Embodiment

Figure 2:
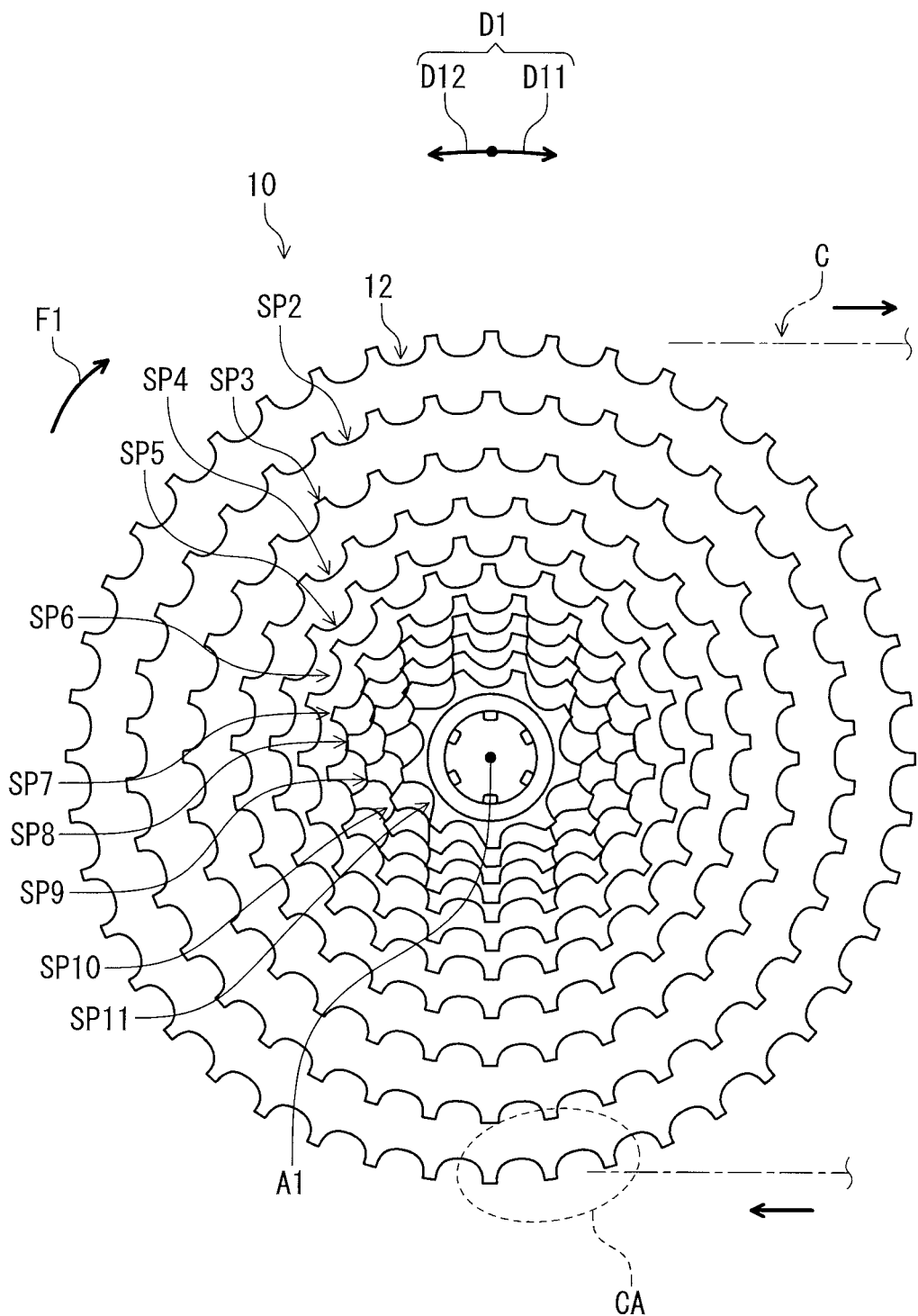
FIG. 2 is a side elevational view of the bicycle sprocket assembly illustrated in FIG. 1.

Referring initially to FIG. 1, a bicycle sprocket assembly 10 comprises a bicycle sprocket 12 in accordance with a first embodiment. The bicycle sprocket 12 has a rotational center axis A1. The bicycle sprocket 12 is rotatable about the rotational center axis A1 relative to a bicycle frame BF. The bicycle sprocket assembly 10 further includes sprockets SP2 to SP11. A bicycle chain C extends between a front sprocket FS and the bicycle sprocket assembly 10. In this embodiment, the bicycle sprocket 12 is a rear sprocket. However, the structure of the bicycle sprocket 12 can be applied to the front sprocket FS. As seen in FIG. 2, the bicycle sprocket 12 corresponds to low gear of the bicycle sprocket assembly 10 and has the largest outer diameter in the bicycle sprocket assembly 10. However, the structure of the bicycle sprocket 12 can be applied to at least one of the sprockets SP2 to SP11.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket 12, should be interpreted relative to the bicycle equipped with the bicycle sprocket 12 as used in an upright riding position on a horizontal surface.

Figure 3:
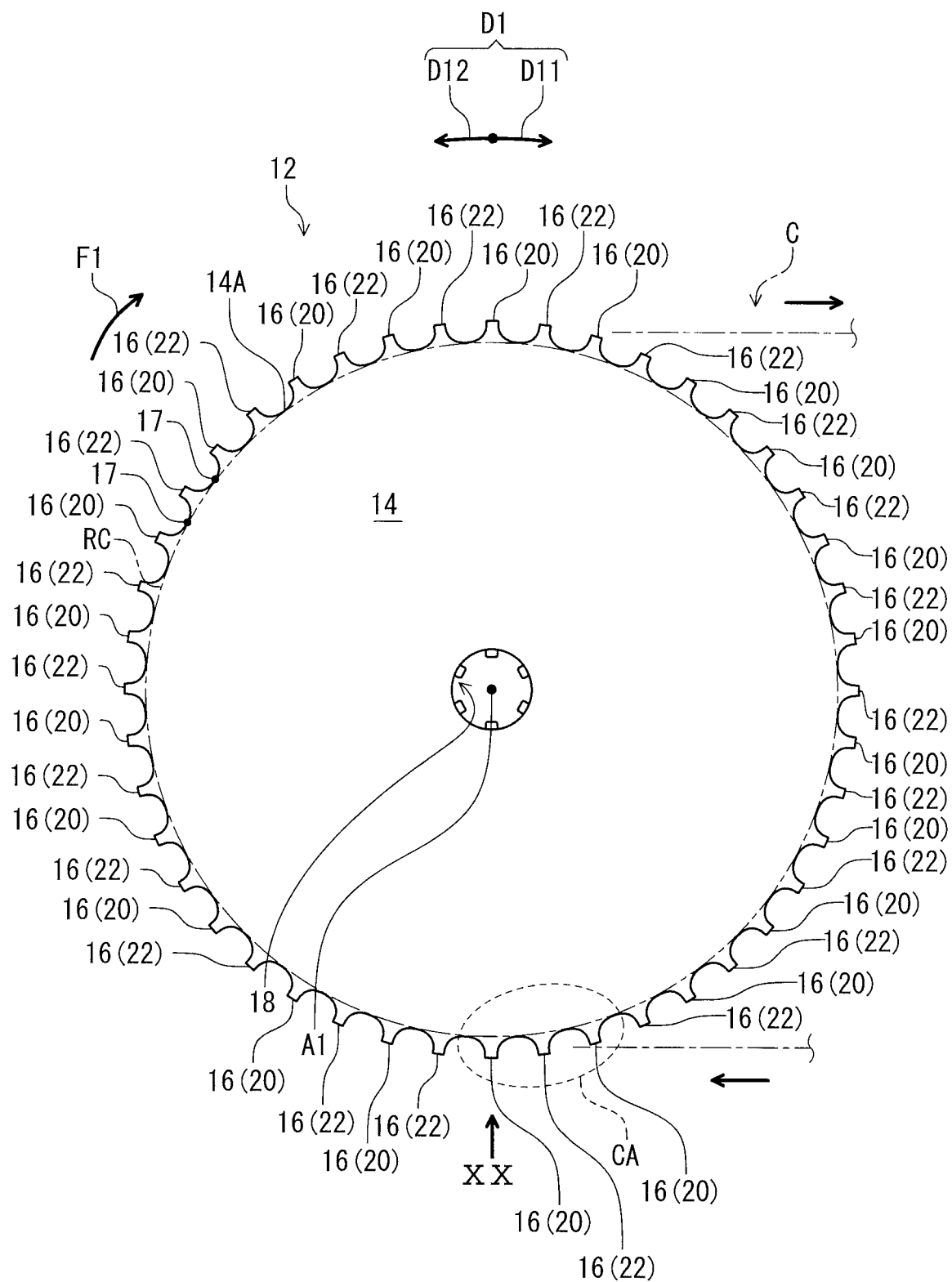
FIG. 3 is a side elevational view of the bicycle sprocket of the bicycle sprocket assembly illustrated in FIG. 1.

As seen in FIG. 3, the bicycle sprocket 12 is engaged with the bicycle chain C to transmit a rotational driving force F1 between the bicycle sprocket 12 and the bicycle chain C. The bicycle sprocket 12 is rotatable about the rotational center axis A1 in a first circumferential direction D11 during pedaling. A second circumferential direction D12 is opposite to the first circumferential direction D11. The first circumferential direction D11 and the second circumferential direction D12 are defined along a circumferential direction D1 of the bicycle sprocket 12. The circumferential direction D1 is defined about the rotational center axis A1 of the bicycle sprocket 12. In this embodiment, the first circumferential direction D11 can be defined as a driving rotational direction in which the bicycle sprocket 12 is rotated about the rotational center axis A1 during pedaling. The first circumferential direction D11 can also be referred to as a driving rotational direction D11. However, the second circumferential direction D12 can be defined as a driving rotational direction in which the bicycle sprocket 12 is rotated about the rotational center axis A1 during pedaling.

The bicycle sprocket 12 comprises a sprocket body 14 and sprocket teeth 16. The sprocket body 14 includes an outer periphery 14A provided about the rotational center axis A1 of the bicycle sprocket 12. The sprocket teeth 16 extend radially outwardly from the outer periphery 14A of the sprocket body 14 with respect to the rotational center axis A1 of the bicycle sprocket 12. The sprocket teeth 16 comprise tooth bottoms 17 defining a root circle RC of the bicycle sprocket 12. The outer periphery 14A coincides with the root circle RC of the bicycle sprocket 12. The bicycle sprocket 12 further comprises a hub attachment portion 18 configured to engage with a bicycle hub assembly (not shown). The bicycle sprocket 12 can comprise a crank arm attachment portion instead of the hub attachment portion 18 in a case where the bicycle sprocket 12 is a front sprocket.

As seen in FIG. 3, the sprocket teeth 16 include at least one first tooth 20 and at least one second tooth 22. In this embodiment, the at least one first tooth 20 includes first teeth 20. The at least one second tooth 22 includes second teeth 22. The first teeth 20 and the second teeth 22 are alternately arranged on the outer periphery 14A of the sprocket body 14 in the circumferential direction D1. However, the arrangement of the first teeth 20 and the second teeth 22 is not limited to this embodiment.

A total number of the sprocket teeth 16 is an even number. In this embodiment, the total number of the sprocket teeth 16 is forty-four. A total number of the first teeth 20 is equal to a total number of the second teeth 22. However, the total number of the sprocket teeth 16, the total number of the first teeth 20, and the total number of the second teeth 22 are not limited to this embodiment. The bicycle sprocket 12 is made of a metallic material. However, the bicycle sprocket 12 can be made of a material other than the metallic material. A surface of the sprocket teeth 16 can be subjected to surface treatment such as electrodeposition coating, Ni-PTFE plate processing, and alumite treatment.

Figure 4:
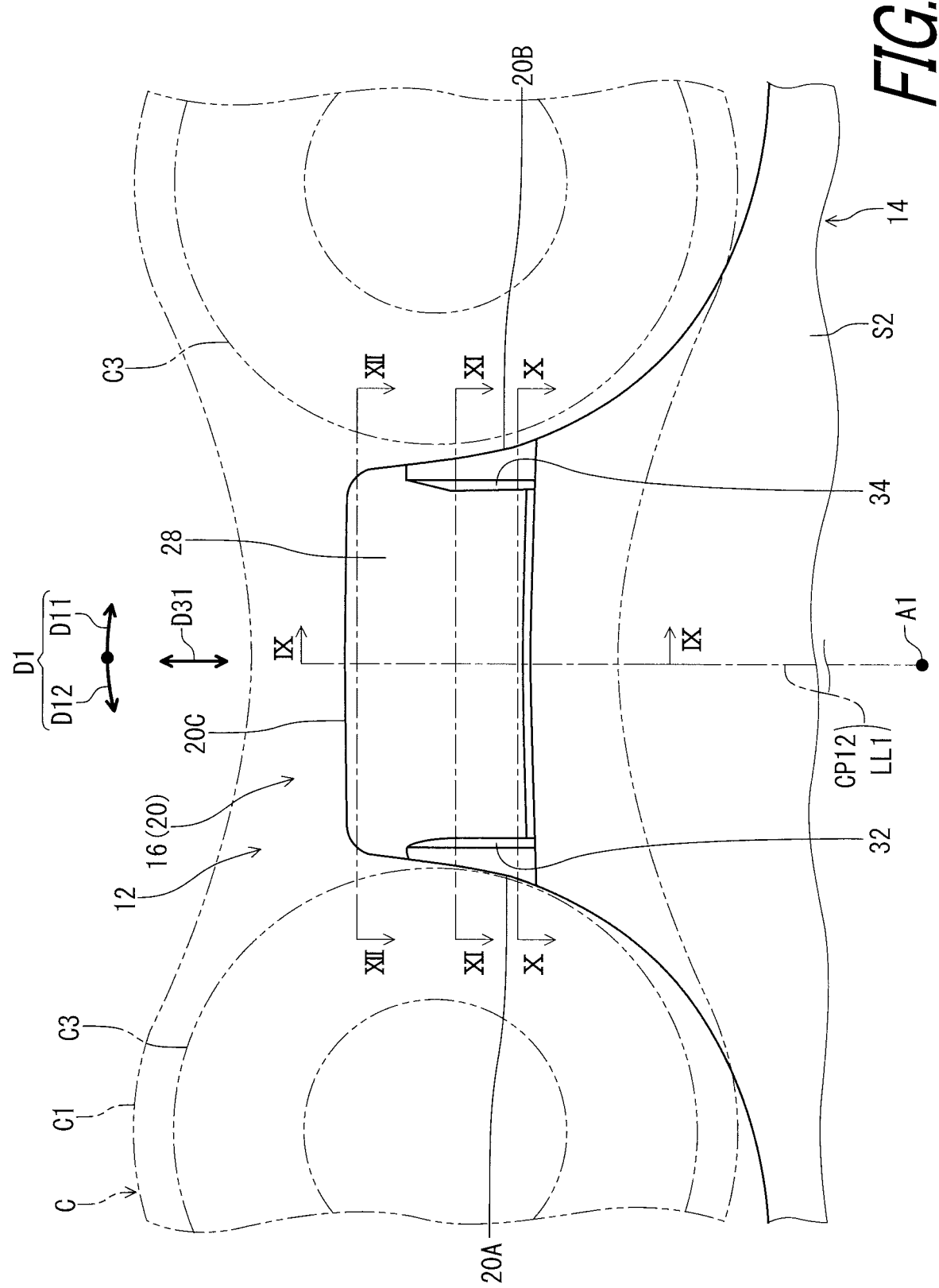
FIG. 4 is a side elevational view of a first tooth of the bicycle sprocket illustrated in FIG. 3, with a bicycle chain.
Figure 5:
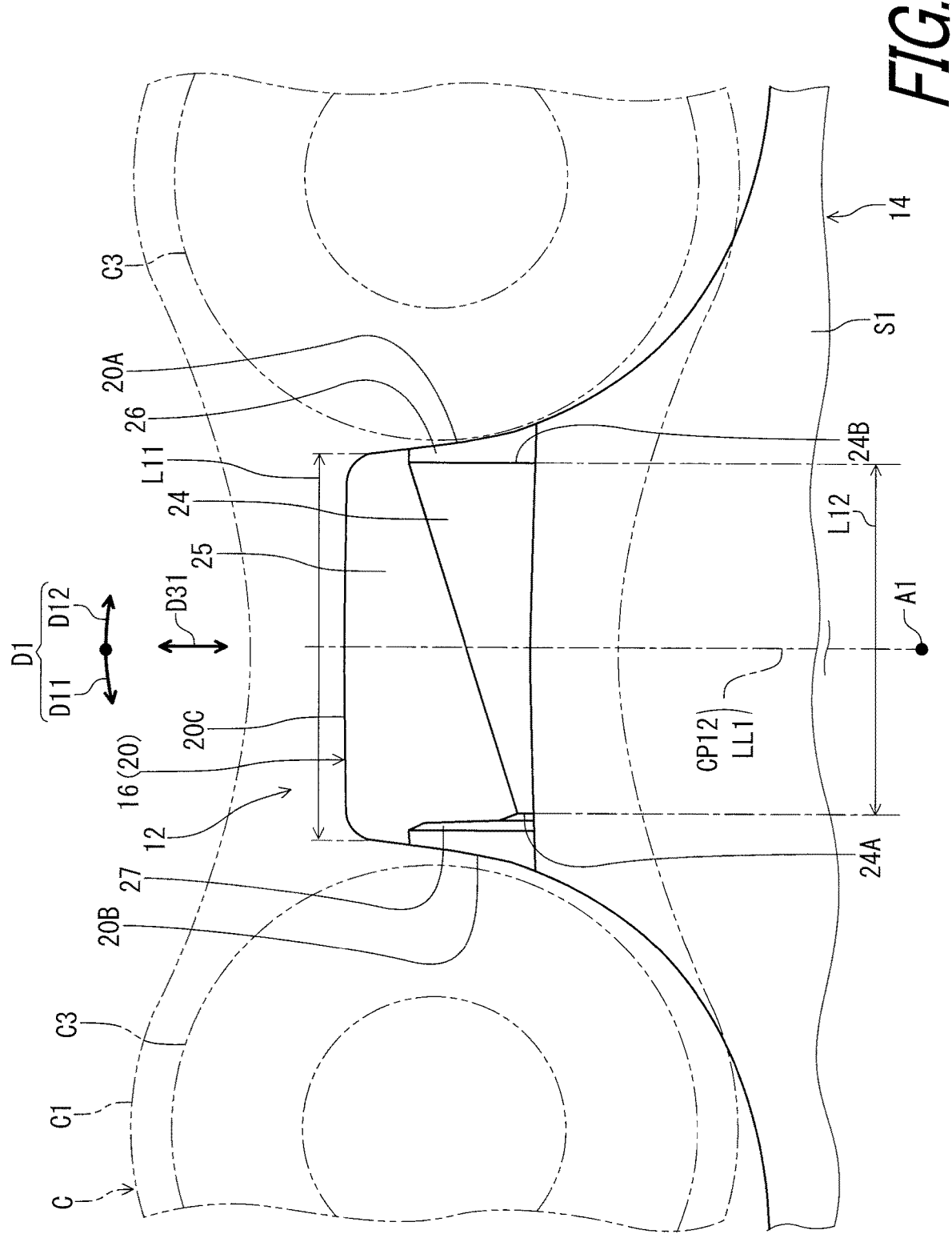
FIG. 5 is another side elevational view of the first tooth of the bicycle sprocket illustrated in FIG. 3, with the bicycle chain.

As seen in FIGS. 4 and 5, the at least one first tooth 20 has a driving surface 20A and a non-driving surface 20B. The non-driving surface 20B is provided on a reverse side of the driving surface 20A in the circumferential direction D1 with respect to the rotational center axis A1. The driving surface 20A faces in the second circumferential direction D12 to contact a roller C3 of the bicycle chain C during pedaling.

Figure 6:
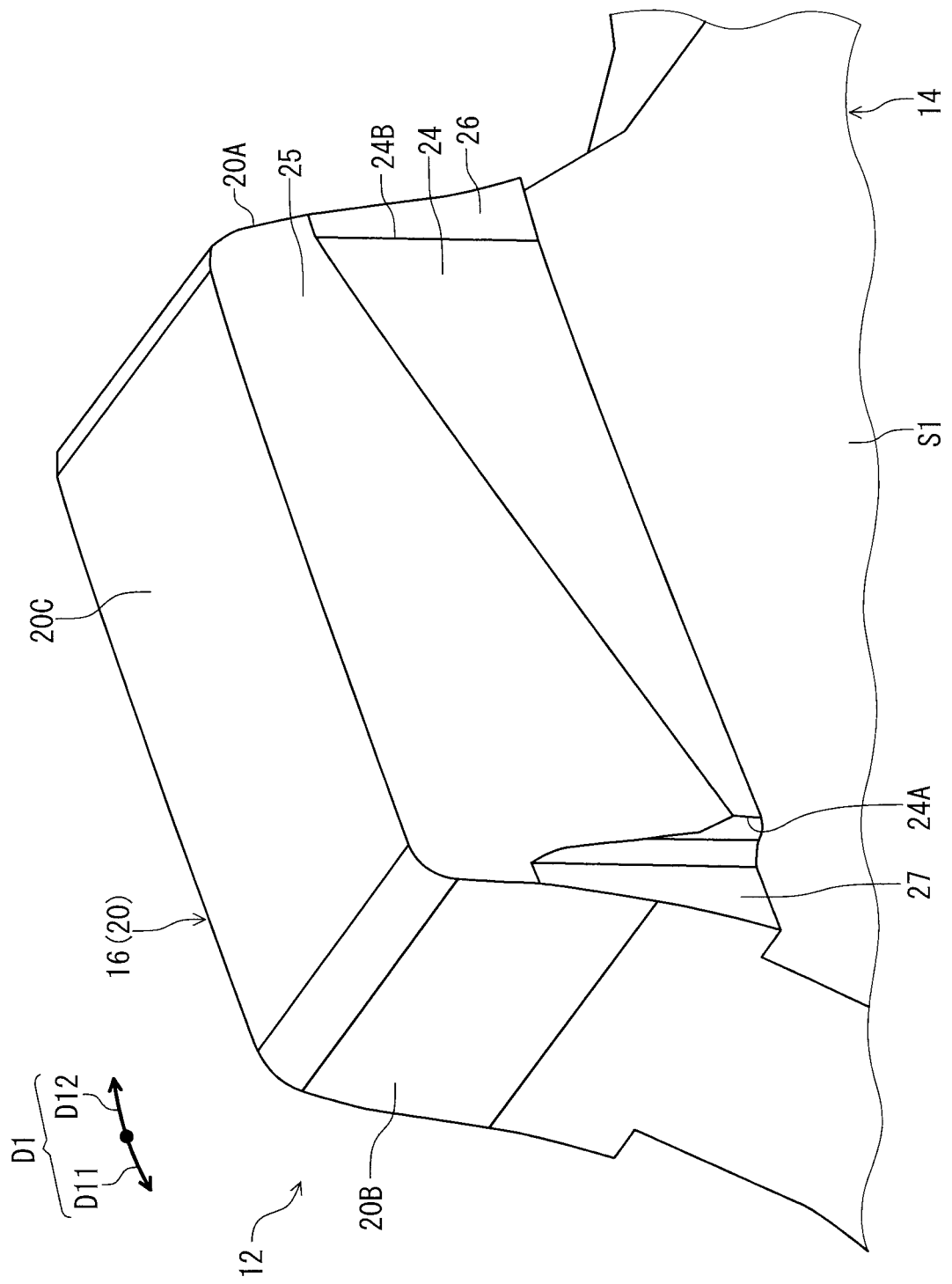
FIG. 6 is a perspective view of the first tooth of the bicycle sprocket illustrated in FIG. 3.

As seen in FIGS. 5 and 6, the at least one first tooth 20 has a first chain-facing surface 24. The first chain-facing surface 24 is provided between the driving surface 20A and the non-driving surface 20B in the circumferential direction D1. In this embodiment, the at least one first tooth 20 has a first surface 25 and a second surface 26. The first chain-facing surface 24 and the second surface 26 are provided radially inwardly of the first surface 25. The first surface 25 is provided between the driving surface 20A and the non-driving surface 20B in the circumferential direction D1. The second surface 26 is provided between the first chain-facing surface 24 and the non-driving surface 20B in the circumferential direction D1.

As seen in FIG. 5, the at least one first tooth 20 has a first minimum tooth length L11 defined between the driving surface 20A and the non-driving surface 20B in the circumferential direction D1. The first chain-facing surface 24 has a first maximum length L12 defined in the circumferential direction D1. The first maximum length L12 is equal to or larger than a half of the first minimum tooth length L11 of the at least one first tooth 20. In this embodiment, the first maximum length L12 is larger than a half of the first minimum tooth length L11 of the at least one first tooth 20. However, the first maximum length L12 can be smaller than a half of the first minimum tooth length L11 of the at least one first tooth 20.

As seen in FIG. 6, the first chain-facing surface 24 is at least partly flat. In this embodiment, the first chain-facing surface 24 is entirely flat. However, the first chain-facing surface 24 can be partly flat or can at least partly have a curved shape. The shape of the first chain-facing surface 24 is not limited to this embodiment. The first surface 25 and the second surface 26 are flat. However, the shapes of the first surface 25 and the second surface 26 are not limited to this embodiment.

The at least one first tooth 20 includes a recess 27 provided between the first chain-facing surface 24 and the one of the driving surface 20A and the non-driving surface 20B in the circumferential direction D1. In this embodiment, the recess 27 is provided between the first chain-facing surface 24 and the non-driving surface 20B in the circumferential direction D1. However, a recess can be provided between the first chain-facing surface 24 and the driving surface 20A in the circumferential direction D1 instead of or in addition to the recess 27. The recess 27 can be omitted from the first tooth 20.

Figure 7:
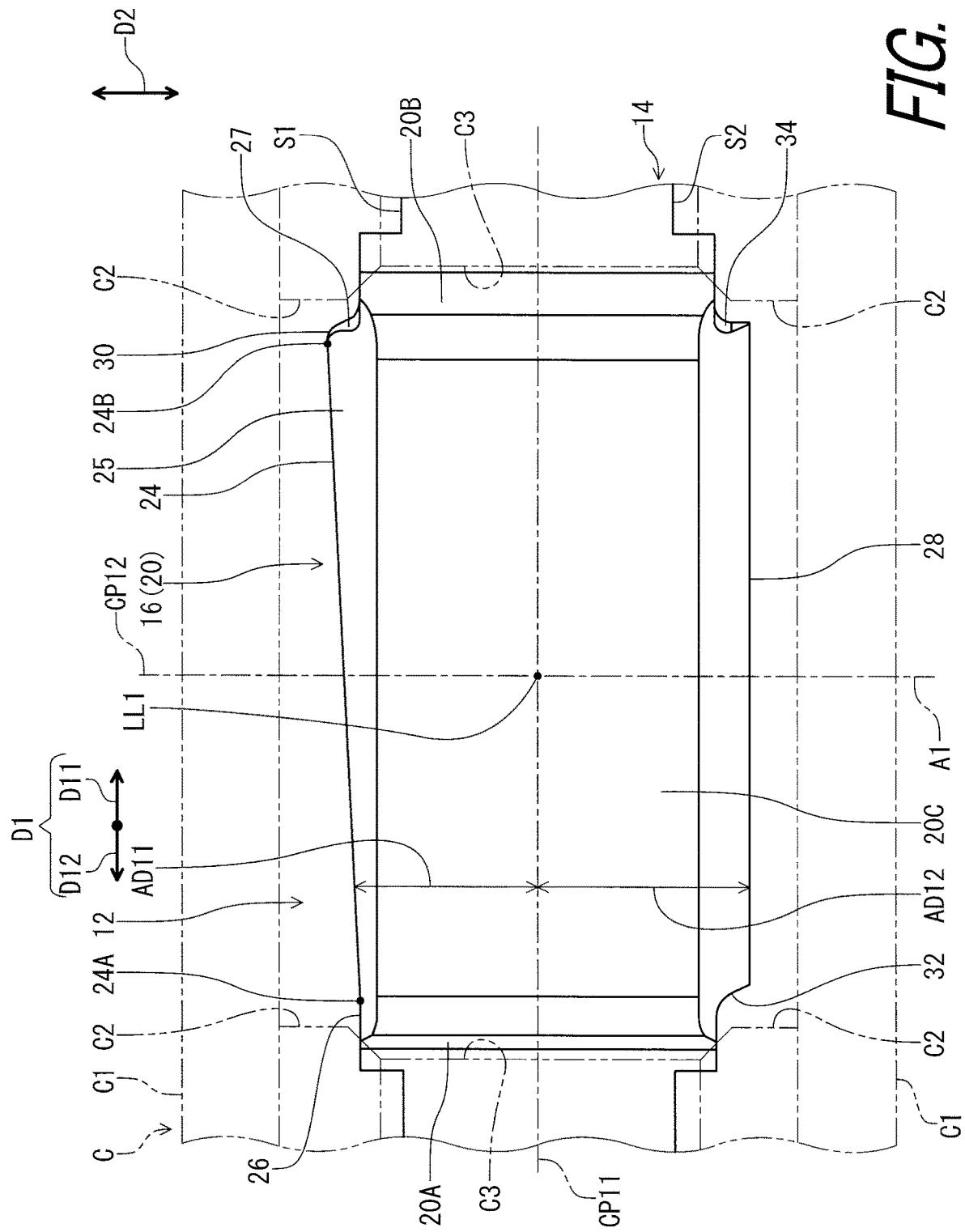
FIG. 7 is a plan view of the first tooth of the bicycle sprocket illustrated in FIG. 3.

As seen in FIG. 7, the recess 27 has a substantially angular shape when viewed in a radial direction perpendicular to the rotational center axis A1. However, the recess 27 can have other shapes such as a curved concave shape, a chamfered shape, or a combination thereof.

The first chain-facing surface 24 faces one of an opposed pair of outer link plates C1 of the bicycle chain C in an axial direction D2 in a state where the first tooth 20 is engaged with the opposed pair of outer link plates C1. Namely, the term "chain-facing" means facing a link plate of the bicycle chain C in the axial direction D2 in a state where a tooth is engaged with the bicycle chain C. The first chain-facing surface 24 is contactable with the one of the opposed pair of outer link plates C1 of the bicycle chain C.

Figure 8:
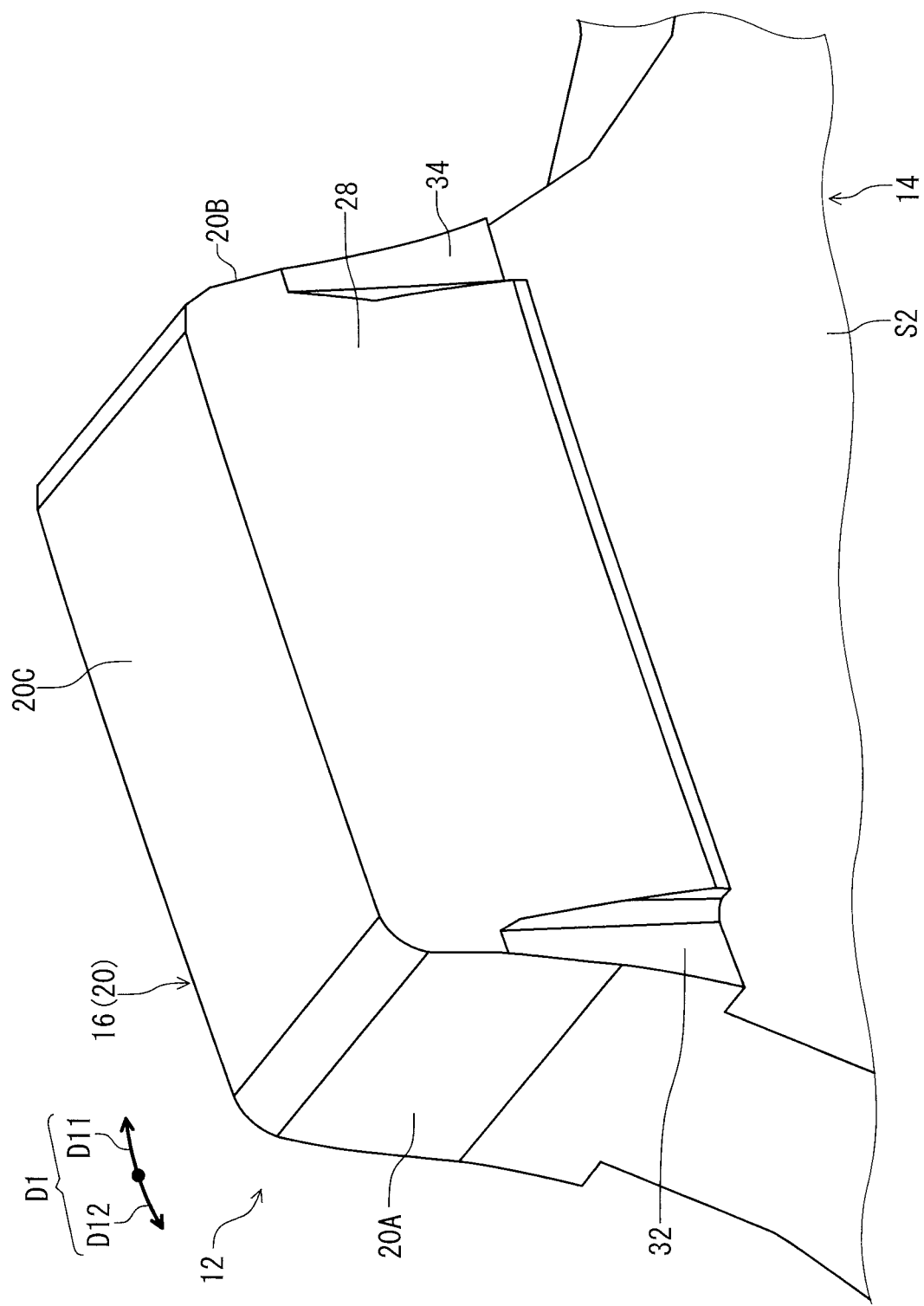
FIG. 8 is another perspective view of the first tooth of the bicycle sprocket illustrated in FIG. 3.

As seen in FIGS. 7 and 8, the at least one first tooth 20 includes a first additional chain-facing surface 28 provided on a reverse side of the first chain-facing surface 24 in the axial direction D2. The first additional chain-facing surface 28 is provided between the driving surface 20A and the non-driving surface 20B in the circumferential direction D1. The first additional chain-facing surface 28 faces the other of the opposed pair of outer link plates C1 of the bicycle chain C in the axial direction D2 in the state where the first tooth 20 is engaged with the opposed pair of outer link plates C1. The first additional chain-facing surface 28 is contactable with the other of the opposed pair of outer link plates C1 of the bicycle chain C.

Figure 9:
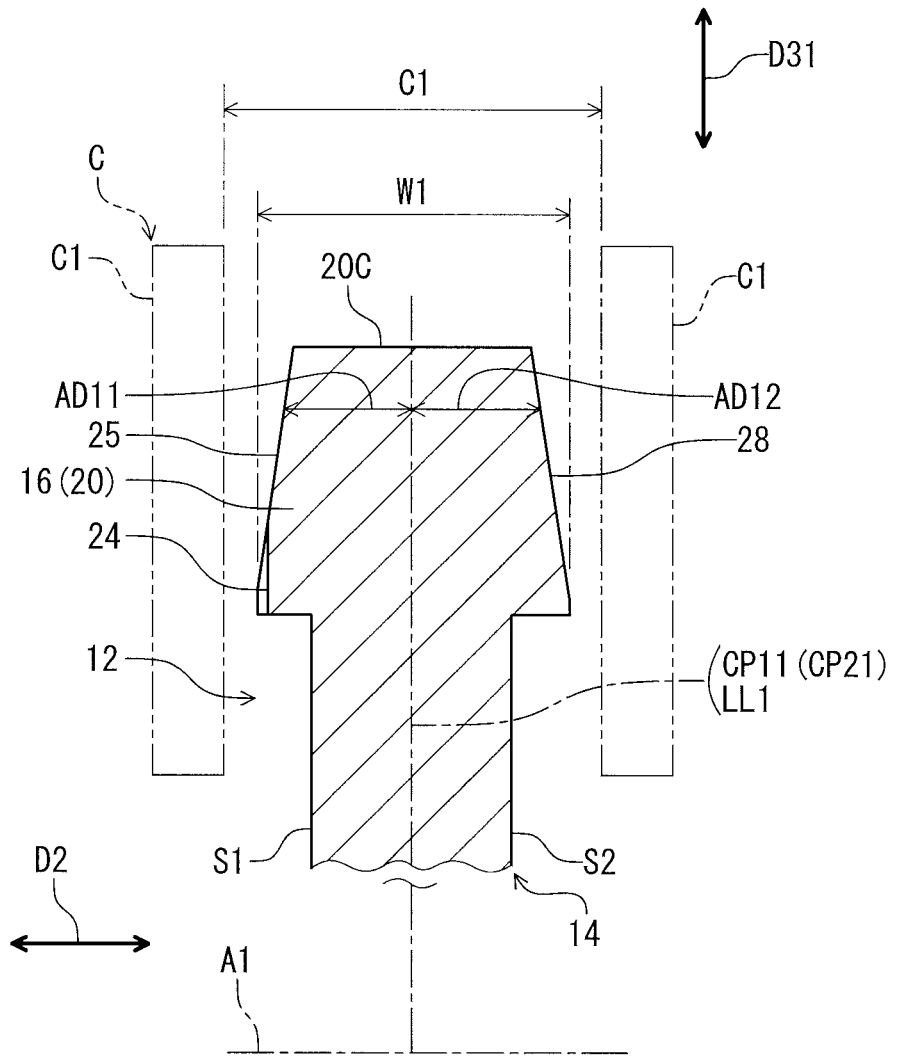
FIG. 9 is a partial cross-sectional view of the bicycle sprocket taken along line IX-IX of FIG. 4.

As seen in FIG. 9, the bicycle sprocket 12 comprises a first side surface S1 and a second side surface S2. The second side surface S2 is provided on a reverse side of the first side surface S1 in the axial direction D2. In this embodiment, the first side surface S1 is closer to the bicycle frame BF (FIG. 1) than the second side surface S2 in the axial direction D2. Thus, the first side surface S1 is an axially inner side surface and the second side surface S2 is an axially outer side surface in a state where the bicycle sprocket assembly 10 is mounted to the bicycle frame BF (FIG. 1). However, the first side surface S1 can be farther from the bicycle frame BF (FIG. 1) than the second side surface S2 in the axial direction D2. In this embodiment, the first chain-facing surface 24 is provided on the first side surface S1. The first additional chain-facing surface 28 is provided on the second side surface S2.

The at least one first tooth 20 has a first maximum chain-engaging width W1 defined in the axial direction D2 parallel to the rotational center axis A1 The at least one first tooth 20 has a first tooth center plane CP11 defined to bisect the first maximum chain-engaging width W1 in the axial direction D2. In this embodiment, the first maximum chain-engaging width W1 is defined between the first chain-facing surface 24 and the first additional chain-facing surface 28 in the axial direction D2.

The first maximum chain-engaging width W1 is 70% or more of an axial length of an outer link space C11 defined between the opposed pair of outer link plates C1 of the bicycle chain C. Preferably, the first maximum chain-engaging width W1 is 80% or more of the axial length of the outer link space C11. However, a radio of the first maximum chain-engaging width W1 to the axial length of the outer link space C11 is not limited to this embodiment.

As seen in FIG. 7, the first chain-facing surface 24 is inclined with respect to the first tooth center plane CP11 in the circumferential direction D1. The first additional chain-facing surface 28 extends parallel to the first tooth center plane CP11 in the circumferential direction D1.

Figure 10:
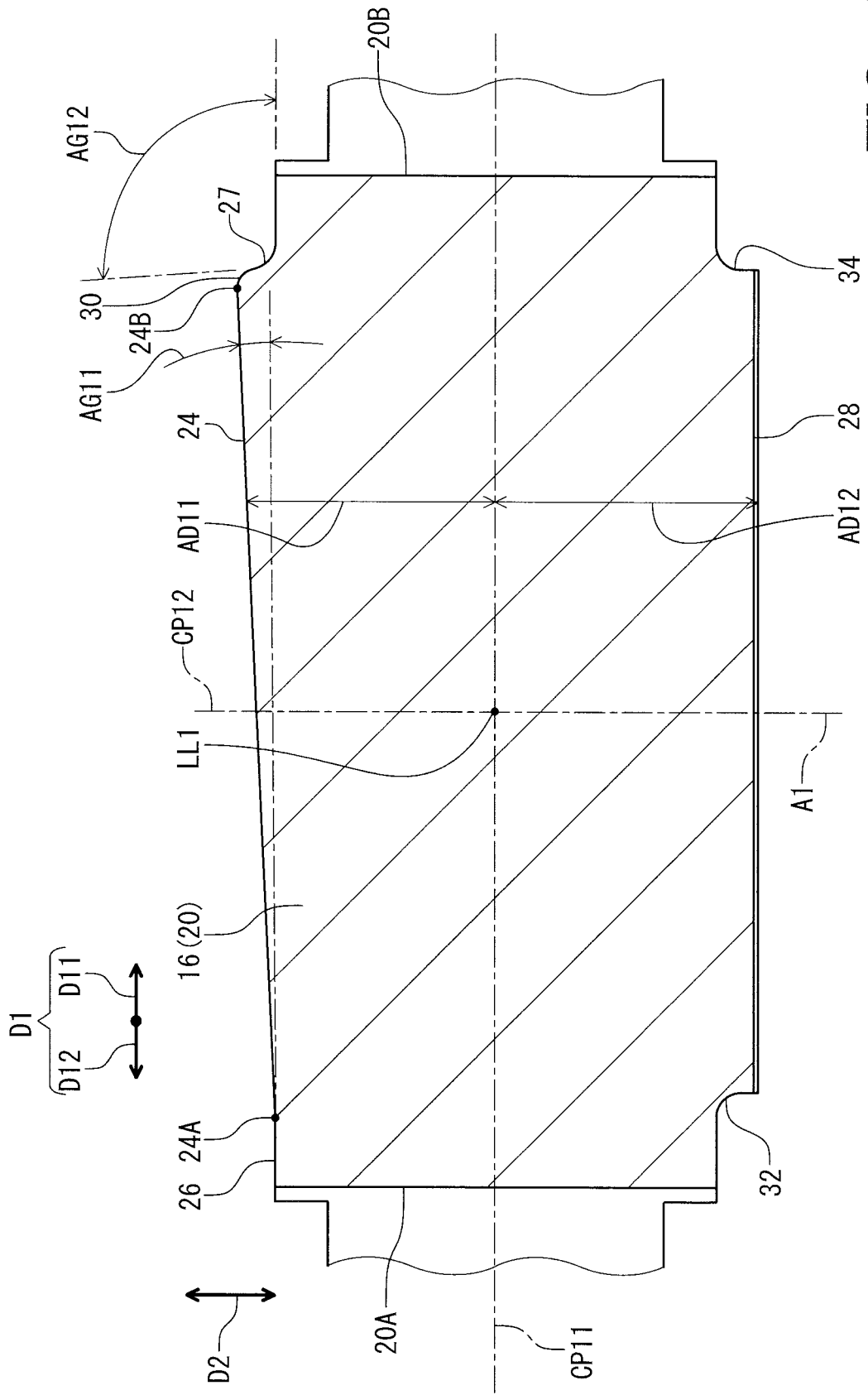
FIG. 10 is a cross-sectional view of the first tooth of the bicycle sprocket taken along line X-X of FIG. 4.
Figure 13:
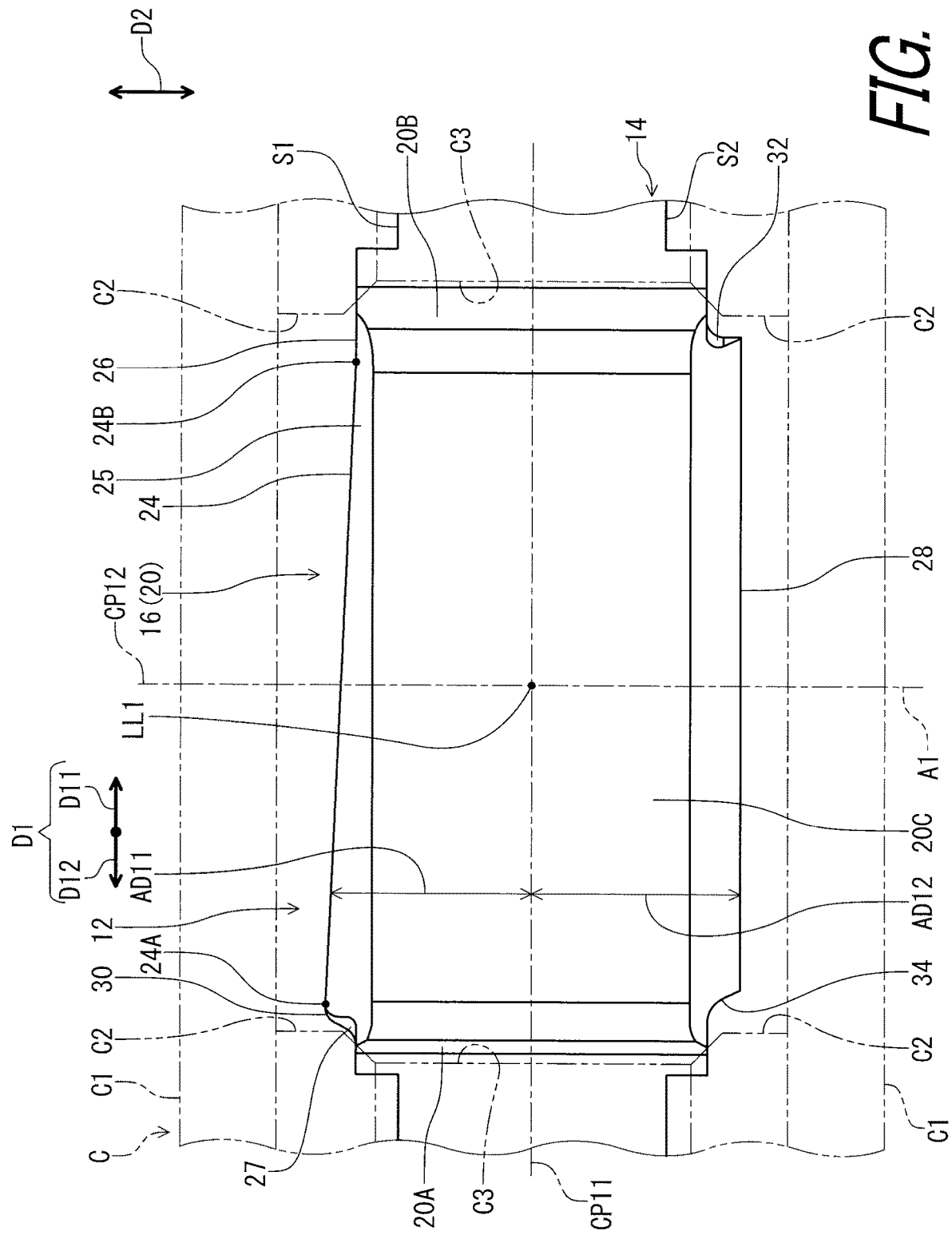
FIG. 13 is a plan view of a first tooth of a bicycle sprocket in accordance with a modification of the first embodiment.

As seen in FIG. 10, a first axial distance AD11 is defined between the first chain-facing surface 24 and the first tooth center plane CP11 in the axial direction D2. The first chain-facing surface 24 is inclined with respect to the first tooth center plane CP11 to increase the first axial distance AD11 from the driving surface 20A to the non-driving surface 20B in the circumferential direction D1. As seen in FIG. 13, however, the first chain-facing surface 24 can be inclined with respect to the first tooth center plane CP11 to increase the first axial distance AD11 from the non-driving surface 20B to the driving surface 20A in the circumferential direction D1.

As seen in FIG. 6, the first chain-facing surface 24 includes a first circumferential end 24A and a first additional circumferential end 24B and extends between the first circumferential end 24A and the first additional circumferential end 24B in the circumferential direction D1. The first maximum length L12 is defined between the first circumferential end 24A and the first additional circumferential end 24B in the circumferential direction D1.

As seen in FIG. 10, the first chain-facing surface 24 is inclined with respect to the first tooth center plane CP11 to increase the first axial distance AD11 from one of the first circumferential end 24A and the first additional circumferential end 24B to the other of the first circumferential end 24A and the first additional circumferential end 24B in the circumferential direction D1. The first circumferential end 24A is closer to the driving surface 20A than the first additional circumferential end 24B in the circumferential direction D1. In this embodiment, the first chain-facing surface 24 is inclined with respect to the first tooth center plane CP11 to increase the first axial distance AD11 from the first circumferential end 24A to the first additional circumferential end 24B in the circumferential direction D1. As seen in FIG. 13, however, the first chain-facing surface 24 can be inclined with respect to the first tooth center plane CP11 to increase the first axial distance AD11 from the first additional circumferential end 24B to the first circumferential end 24A in the circumferential direction D1.

In this embodiment, as seen in FIG. 10, a first circumferential inclined angle AG11 is defined between the first tooth center plane CP11 and the first chain-facing surface 24 when viewed in a radial direction D31 (FIG. 9) of the bicycle sprocket 12. The first circumferential inclined angle AG11 is equal to or smaller than 45 degrees. The first circumferential inclined angle AG11 is preferably smaller than an inclination angle AG12 of the recess 27. However, the first circumferential inclined angle AG11 is not limited to this embodiment.

Figure 11:
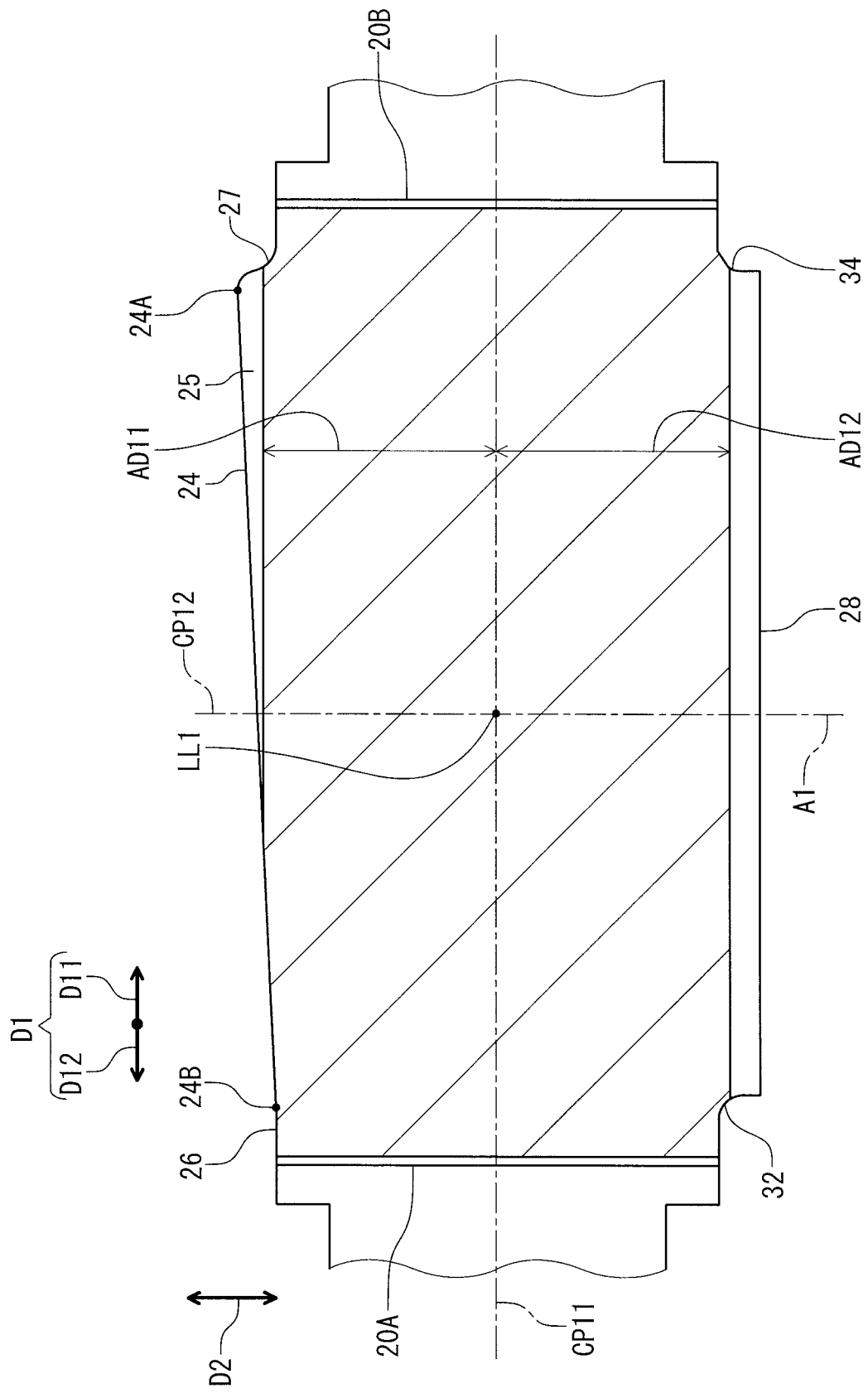
FIG. 11 is a cross-sectional view of the first tooth of the bicycle sprocket taken along line XI-XI of FIG. 4.
Figure 12:
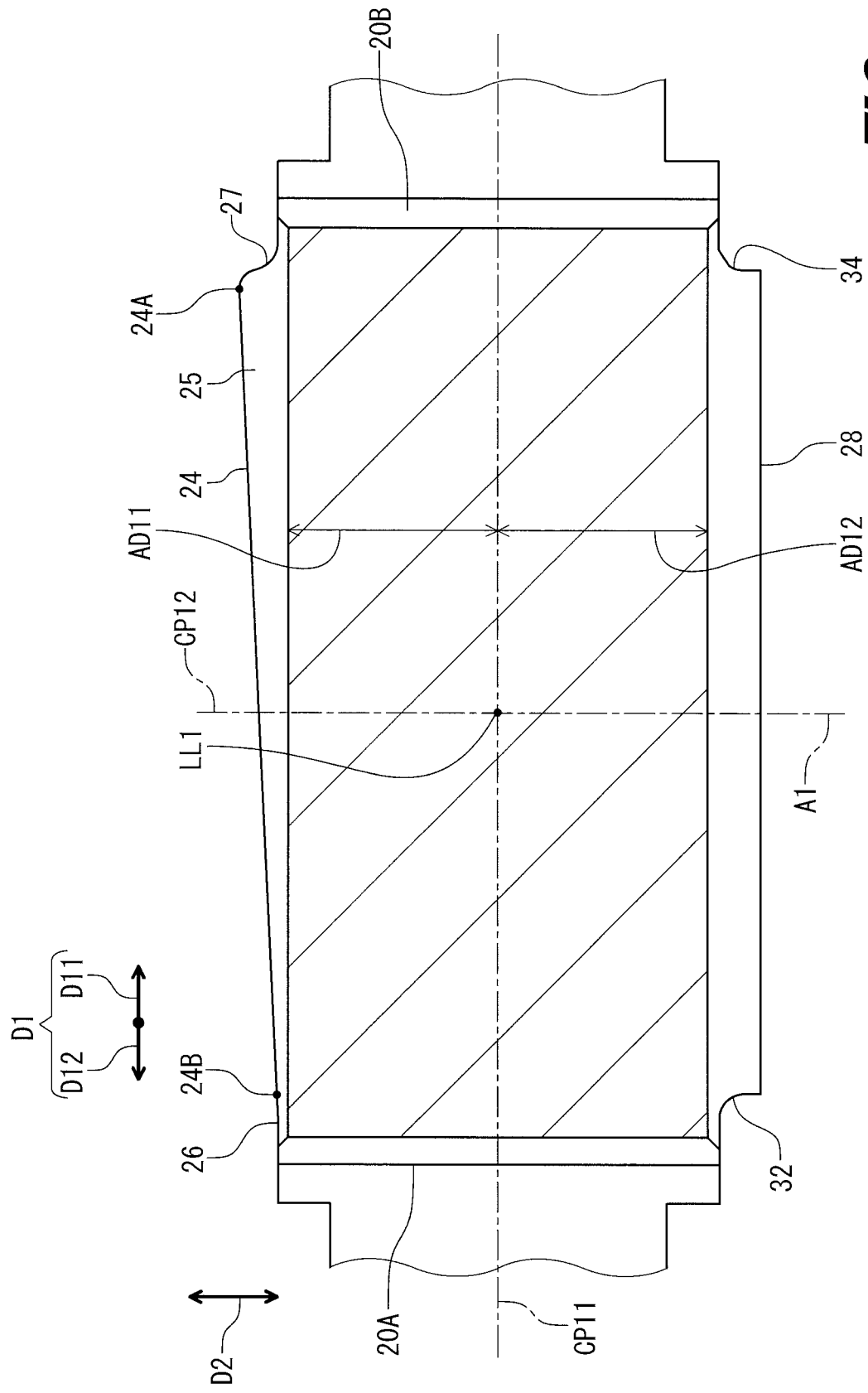
FIG. 12 is a cross-sectional view of the first tooth of the bicycle sprocket taken along line XII-XII of FIG. 4.

As seen in FIGS. 11 and 12, the first axial distance AD11 is also defined between the first surface 25 and the first tooth center plane CP11 in the axial direction D2. The first axial distance AD11 is also defined between the second surface 26 and the first tooth center plane CP11 in the axial direction D2. The first surface 25 extends in the circumferential direction D1 to keep the first axial distance AD11 constant. The second surface 26 extends in the circumferential direction D1 to keep the first axial distance AD11 constant.

As seen in FIG. 10, a first additional axial distance AD12 is defined between the first additional chain-facing surface 28 and the first tooth center plane CP11 in the axial direction D2. The first additional chain-facing surface 28 extends in the circumferential direction D1 to keep the first additional axial distance AD12 constant.

As seen in FIG. 9, the first chain-facing surface 24 extends in the radial direction D31 to keep the first axial distance AD11 constant. The radial direction D31 is perpendicular to the rotational center axis A1. The first tooth 20 includes a first tooth tip 20C provided radially outwardly of the outer periphery of the sprocket body 14. The first additional chain-facing surface 28 is inclined with respect to the first tooth center plane CP11 to increase the first additional axial distance AD12 from the first tooth tip 20C toward the rotational center axis A1. The first surface 25 is inclined with respect to the first tooth center plane CP11 to increase the first axial distance AD11 from the first tooth tip 20C to the first chain-facing surface 24. The first chain-facing surface 24 extends radially inwardly from the first surface 25 toward the rotational center axis A1 to keep the first axial distance AD11 constant.

As seen in FIGS. 7 and 10, the at least one first tooth 20 includes a curved surface 30 provided between the first chain-facing surface 24 and one of the driving surface 20A and the non-driving surface 20B. In this embodiment, the curved surface 30 is provided between the first chain-facing surface 24 and the non-driving surface 20B. However, a curved surface can be provided between the first chain-facing surface 24 and the driving surface 20A instead of or in addition to the curved surface 30.

As seen in FIG. 8, the first tooth 20 includes additional recesses 32 and 34. The additional recess 32 is provided between the first additional chain-facing surface 28 and the driving surface 20A in the circumferential direction D1. The additional recess 34 is provided between the first additional chain-facing surface 28 and the non-driving surface 20B in the circumferential direction D1. However, at least one of the additional recesses 32 and 34 can be omitted from the first tooth 20.

As seen in FIGS. 7 and 9, the first tooth 20 has an asymmetrical shape with respect to the first tooth center plane CP11. However, the first tooth 20 can have a symmetrical shape with respect to the first tooth center plane CP11.

As seen in FIGS. 4 and 5, the first tooth 20 includes a first center line LL1 extending radially outwardly from the rotational center axis A1 in the first tooth center plane CP11. The first center line LL1 is defined to bisect the first minimum tooth length L11 in the circumferential direction D1. As seen in FIG. 7, the first tooth 20 includes a first additional tooth center plane CP12 defined to extend radially outwardly from the rotational center axis A1.

As seen in FIG. 7, the first center line LL1 is defined as a line where the first tooth center plane CP11 intersects with the first additional tooth center plane CP12. The first additional tooth center plane CP12 coincides with the rotational center axis A1 when viewed in the radial direction D31. The first tooth 20 has an asymmetrical shape with respect to the first center line LL1. However, the first tooth 20 can have a symmetrical shape with respect to the first center line LL1. As seen in FIGS. 5 and 7, the first tooth 20 has an asymmetrical shape with respect to the first additional tooth center plane CP12. However, the first tooth 20 can have a symmetrical shape with respect to the first additional tooth center plane CP12.

Figure 14:
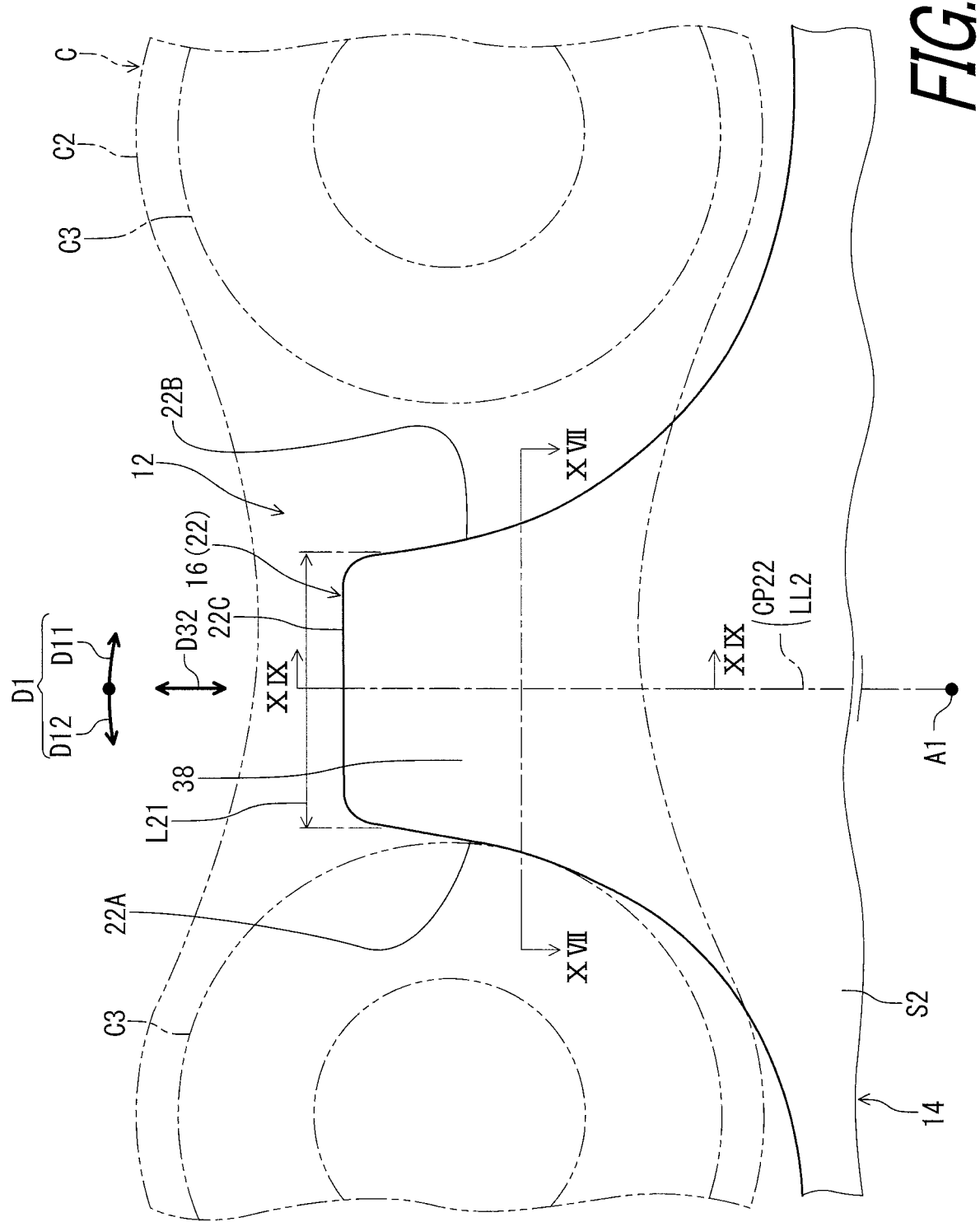
FIG. 14 is a side elevational view of a second tooth of the bicycle sprocket illustrated in FIG. 3, with the bicycle chain.
Figure 15:
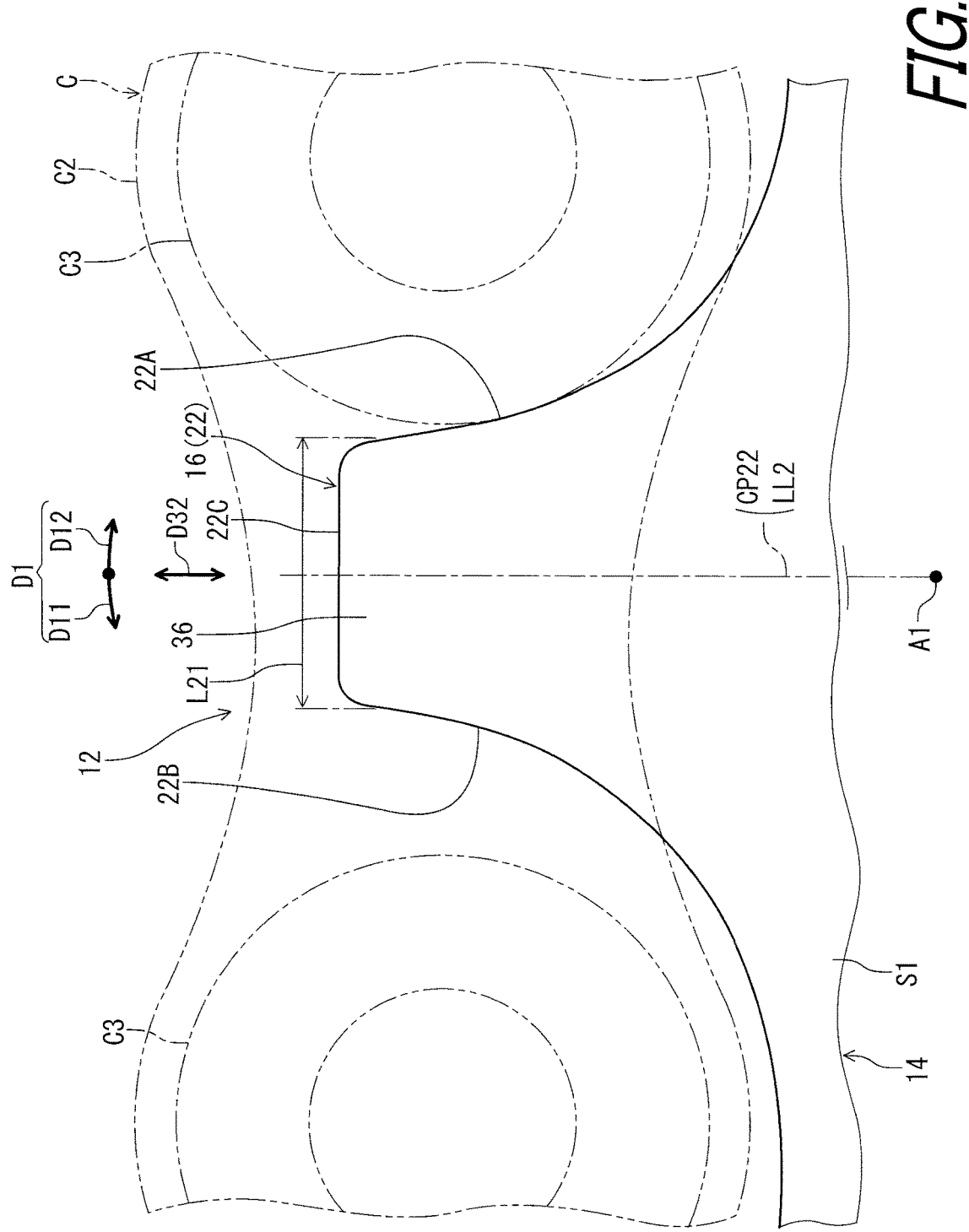
FIG. 15 is another side elevational view of the second tooth of the bicycle sprocket illustrated in FIG. 3, with the bicycle chain.

As seen in FIGS. 14 and 15, the at least one second tooth 22 has a second driving surface 22A and a second non-driving surface 22B. The second non-driving surface 22B is provided on a reverse side of the second driving surface 22A in the circumferential direction D1 with respect to the rotational center axis A1. The second driving surface 22A faces in the first circumferential direction D11 to contact the roller C3 of the bicycle chain C during pedaling. The second non-driving surface 22B faces in the second circumferential direction D12.

Figure 16:
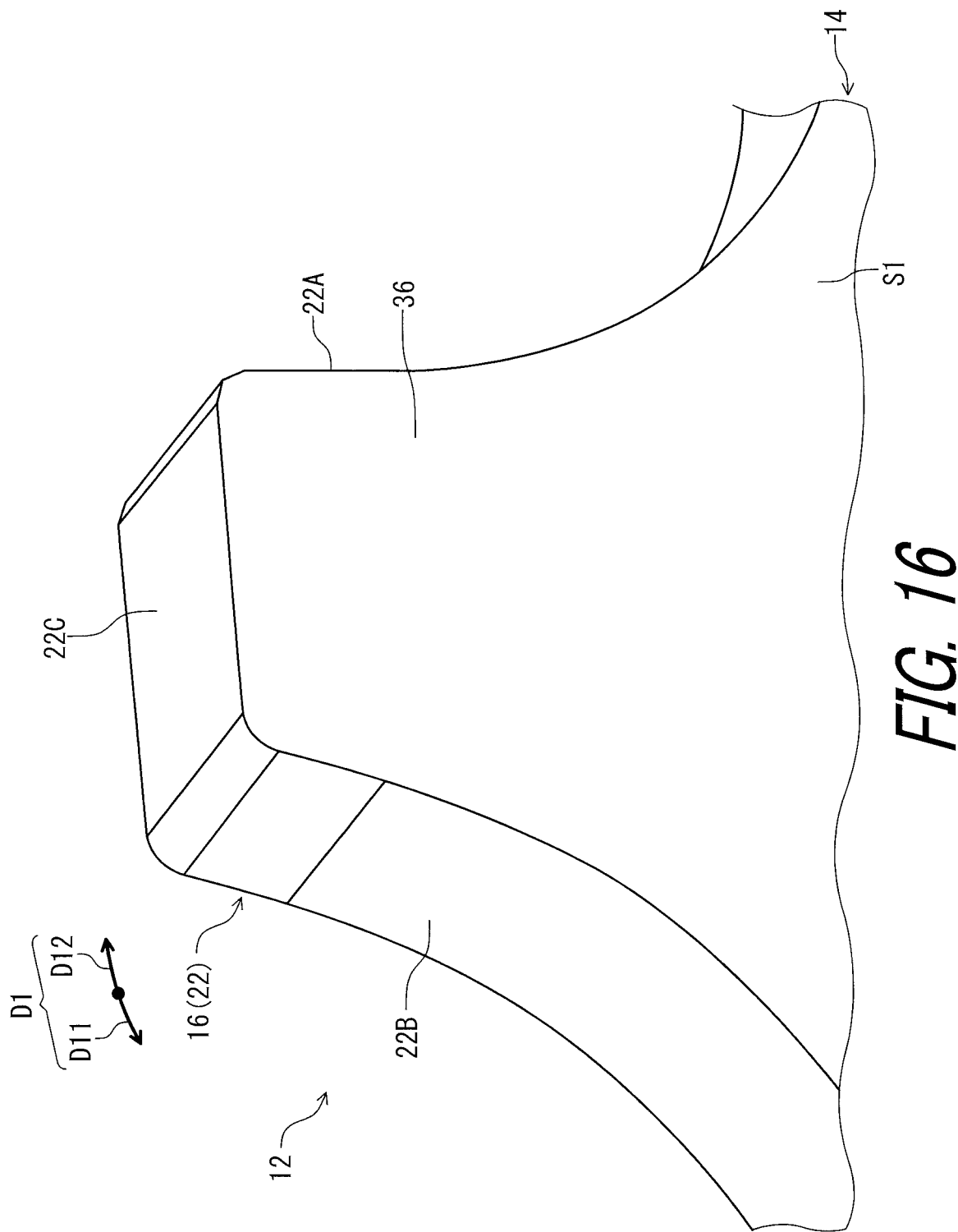
FIG. 16 is a perspective view of the second tooth of the bicycle sprocket illustrated in FIG. 3.
Figure 17:
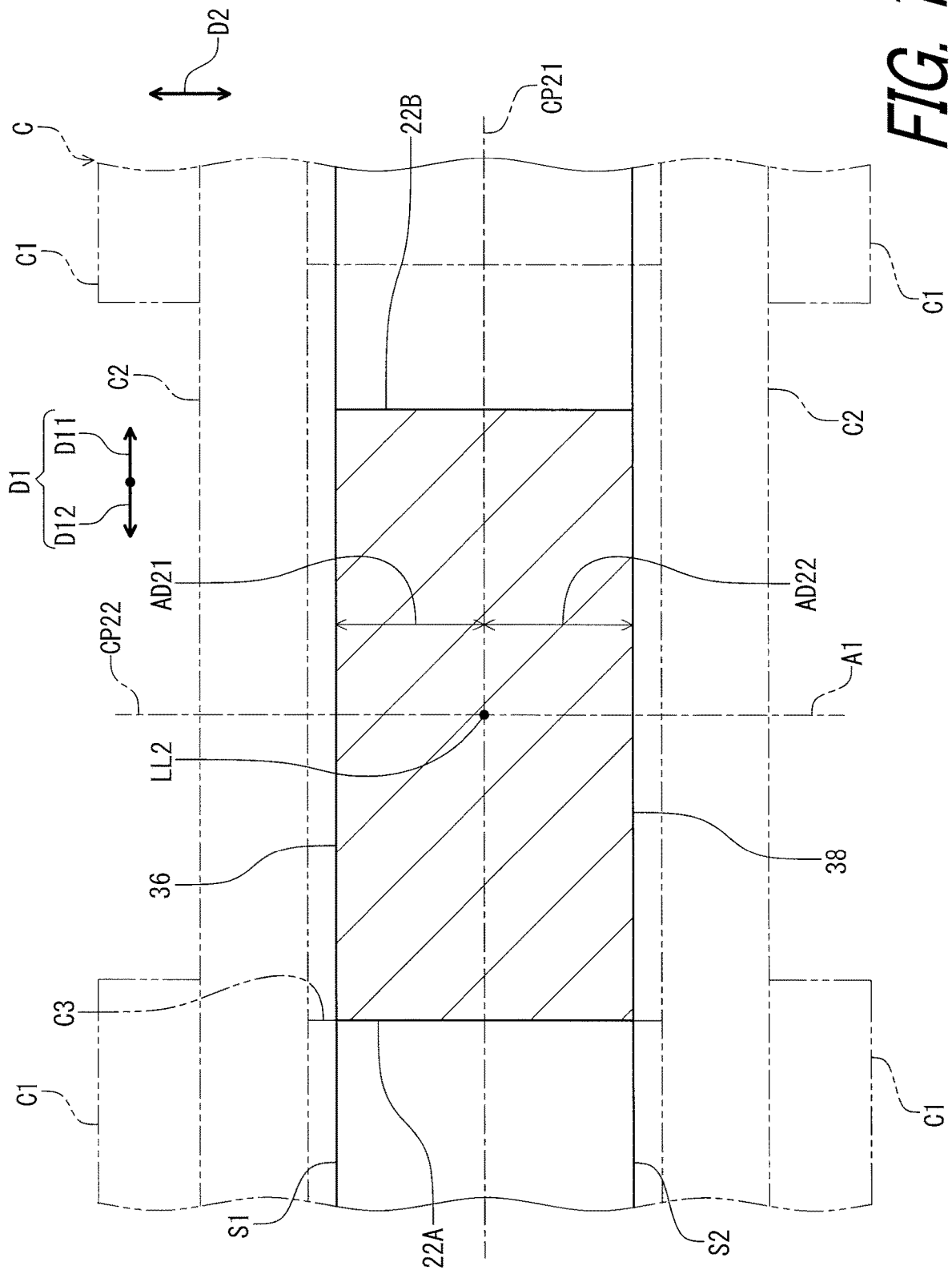
FIG. 17 is a cross-sectional view of the second tooth of the bicycle sprocket taken along line XVII-XVII of FIG. 14.

As seen in FIGS. 15 and 16, the at least one second tooth 22 has a second chain-facing surface 36. The second chain-facing surface 36 is provided between the second driving surface 22A and the second non-driving surface 22B in the circumferential direction D1. As seen in FIG. 17, the second chain-facing surface 36 faces one of an opposed pair of inner link plates C2 of the bicycle chain C in the axial direction D2 in a state where the second tooth 22 is engaged with the opposed pair of inner link plates C2. The second chain-facing surface 36 is contactable with the one of the opposed pair of inner link plates C2 of the bicycle chain C.

Figure 18:
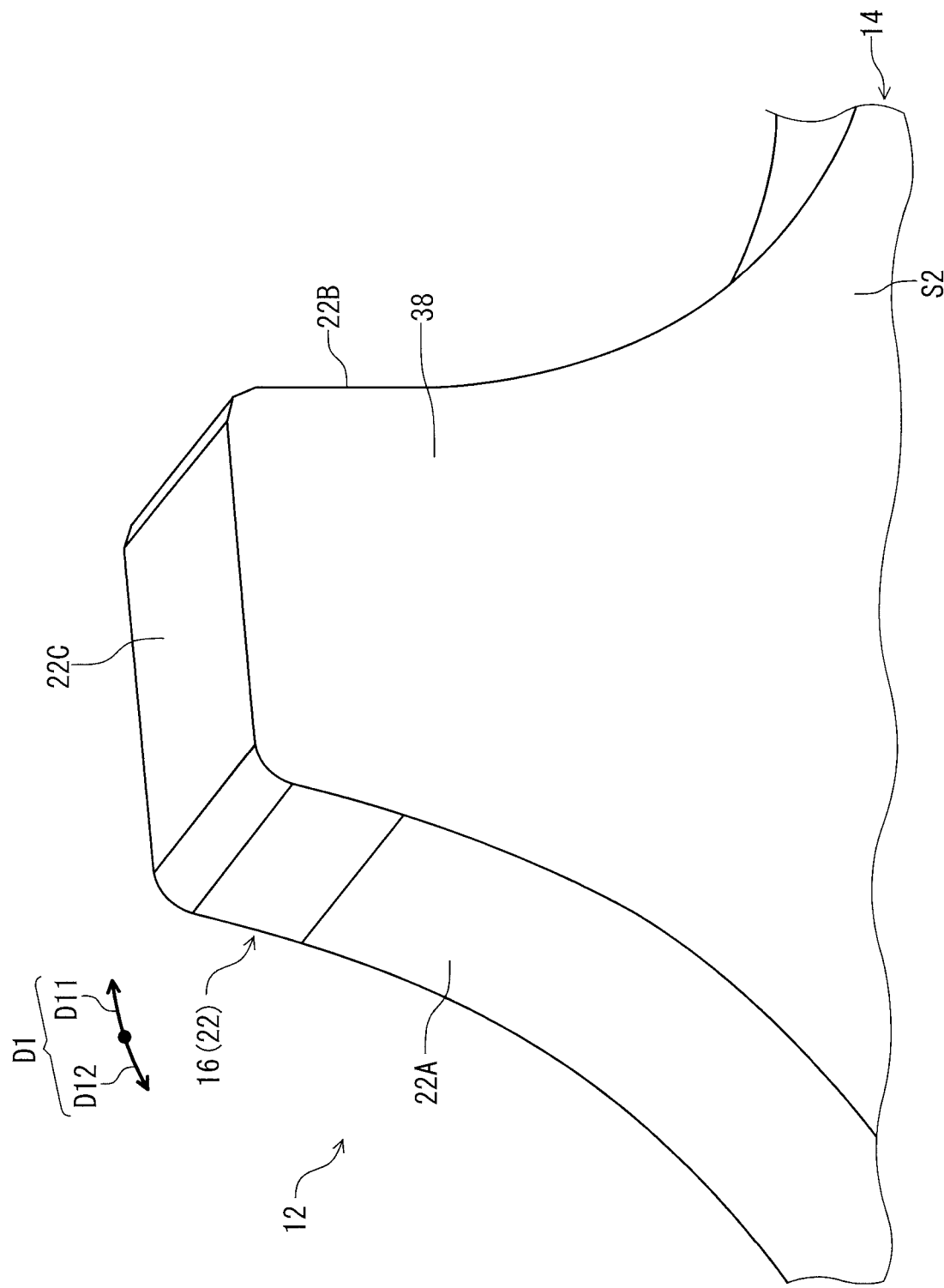
FIG. 18 is another perspective view of the second tooth of the bicycle sprocket illustrated in FIG. 3.

As seen in FIGS. 17 and 18, the at least one second tooth 22 has a second additional chain-facing surface 38. The second additional chain-facing surface 38 is provided between the second driving surface 22A and the second non-driving surface 22B in the circumferential direction D1. As seen in FIG. 17, the second additional chain-facing surface 38 is provided on a reverse side of the second chain-facing surface 36 in the axial direction D2. The second additional chain-facing surface 38 is contactable with the other of the opposed pair of inner link plates C2 of the bicycle chain C.

Figure 19:
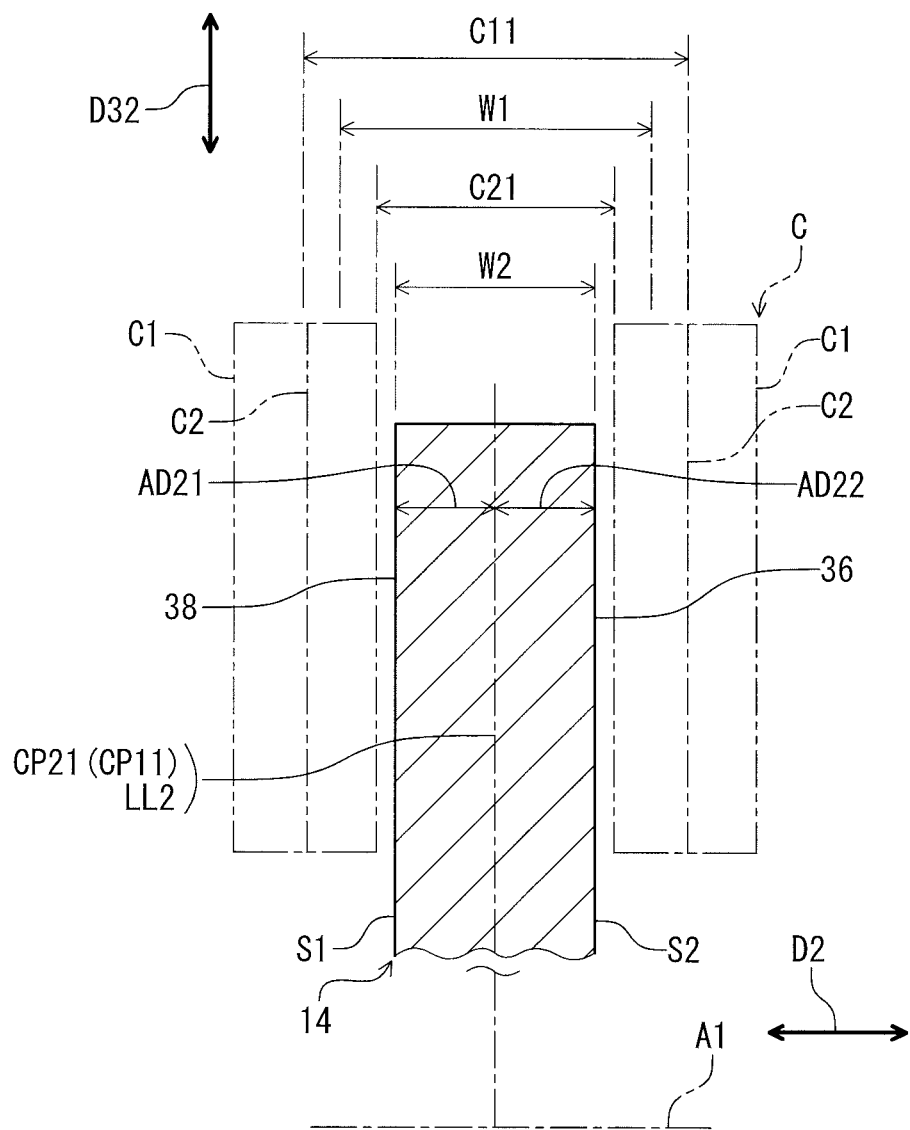
FIG. 19 is a partial cross-sectional view of the bicycle sprocket taken along line XIX-XIX of FIG. 14.

As seen in FIG. 19, the at least one second tooth 22 has a second maximum chain-engaging width W2 defined in in the axial direction D2. The second maximum chain-engaging width W2 is defined between the second chain-facing surface 36 and the second additional chain-facing surface 38 in the axial direction D2. The first maximum chain-engaging width W1 is larger than the second maximum chain-engaging width W2. The at least one second tooth 22 has a second tooth center plane CP21 defined to bisect the second maximum chain-engaging width W2 in the axial direction D2. In this embodiment, the second tooth center plane CP21 coincides with the first tooth center plane CP11. However, the second tooth center plane CP21 can be offset from the first tooth center plane CP11.

In this embodiment, the first maximum chain-engaging width W1 is larger than the axial length of the inner link space C21 defined between the opposed pair of inner link plates C2 of the bicycle chain C in the axial direction D2 and smaller than the axial length of the outer link space C11 defined between the opposed pair of outer link plates C1 of the bicycle chain C in the axial direction D2. The second maximum chain-engaging width W2 is smaller than the axial length of the inner link space C21. However, the first maximum chain-engaging width W1 can be smaller than the axial length of the inner link space C21.

As seen in FIG. 17, the second chain-facing surface 36 extends parallel to the second tooth center plane CP21 in the circumferential direction D1. The second additional chain-facing surface 38 extends parallel to the second tooth center plane CP21 in the circumferential direction D1. A second axial distance AD21 is defined between the second chain-facing surface 36 and the second tooth center plane CP21 in the axial direction D2. A second additional axial distance AD22 is defined between the second additional chain-facing surface 38 and the second tooth center plane CP21 in the axial direction D2. The second chain-facing surface 36 extends in the circumferential direction D1 to keep the second axial distance AD21 constant. The second additional chain-facing surface 38 extends in the circumferential direction D1 to keep the second additional axial distance AD22 constant.

As seen in FIG. 19, the second chain-facing surface 36 extends parallel to the second tooth center plane CP21 in a radial direction D32 perpendicular to the rotational center axis A1. The second additional chain-facing surface 38 extends parallel to the second tooth center plane CP21 in the radial direction D32. The second tooth 22 includes a second tooth tip 22C. The second chain-facing surface 36 extends from the second tooth tip 22C toward the rotational center axis A1 to keep the second axial distance AD21 constant. The second additional chain-facing surface 38 extends from the second tooth tip 22C toward the rotational center axis A1 to keep the second additional axial distance AD22 constant.

As seen in FIGS. 17 and 19, the second tooth 22 has a symmetrical shape with respect to the second tooth center plane CP21. However, the second tooth 22 can have an asymmetrical shape with respect to the second tooth center plane CP21.

As seen in FIGS. 14 and 15, the second tooth 22 includes a second center line LL2 extending radially outwardly from the rotational center axis A1 in the second tooth center plane CP21. The at least one second tooth 22 has a second minimum tooth length L21 defined between the second driving surface 22A and the second non-driving surface 22B in the circumferential direction D1. The second center line LL2 is defined to bisect the second minimum tooth length L21 in the circumferential direction D1. The second tooth 22 includes a second additional tooth center plane CP22 defined to extend radially outwardly from the rotational center axis A1.

As seen in FIG. 17, the second center line LL2 is defined as a line where the second tooth center plane CP21 intersects with the second additional tooth center plane CP22. The second additional tooth center plane CP22 coincides with the rotational center axis A1 when viewed in the radial direction D32. The second tooth 22 has a symmetrical shape with respect to the second center line LL2. However, the second tooth 22 can have an asymmetrical shape with respect to the second center line LL2. The second tooth 22 has a symmetrical shape with respect to the second additional tooth center plane CP22. However, the second tooth 22 can have an asymmetrical shape with respect to the second additional tooth center plane CP22.

As seen in FIG. 1, a chain line CL is defined by the bicycle chain C engaged with the front sprocket FS and the bicycle sprocket assembly 10. For example, a first chain line CL1 is defined by the bicycle chain C engaged with the front sprocket FS and the bicycle sprocket 12. A second chain line CL2 is defined by the bicycle chain C engaged with the front sprocket FS and the sprocket SP11. An axial distance CD is defined between the chain line CL and a transverse center plane FC of the bicycle frame BF in the axial direction D2. The transverse center plane FC is perpendicular to the rotational center axis A1 in a state where the bicycle sprocket 12 is mounted to the bicycle frame BF. The first chain line CL1 is inclined relative to the transverse center plane FC to decrease the axial distance CD from the front sprocket FS to the bicycle sprocket 12. The first chain line CL1 is inclined relative to the front sprocket FS toward a first side SD1 relative to the front sprocket FS. The second chain line CL2 is inclined relative to the transverse center plane FC to increase the axial distance CD from the front sprocket FS to the bicycle sprocket 12. The second chain line CL2 is inclined relative to the front sprocket FS toward a second side SD2 relative to the front sprocket FS.

With the bicycle sprocket 12, the first tooth 20 improves chain-holding performance of the bicycle sprocket 12 since the first maximum chain-engaging width W1 is larger than the second maximum chain-engaging width W2. Furthermore, the first chain-facing surface 24 further improves the chain-holding performance of the bicycle sprocket 12 even if the bicycle chain C is inclined along the first chain line CL1 since the first chain-facing surface 24 is inclined with respect to the first tooth center plane CP11 in the circumferential direction D1.

Figure 20:
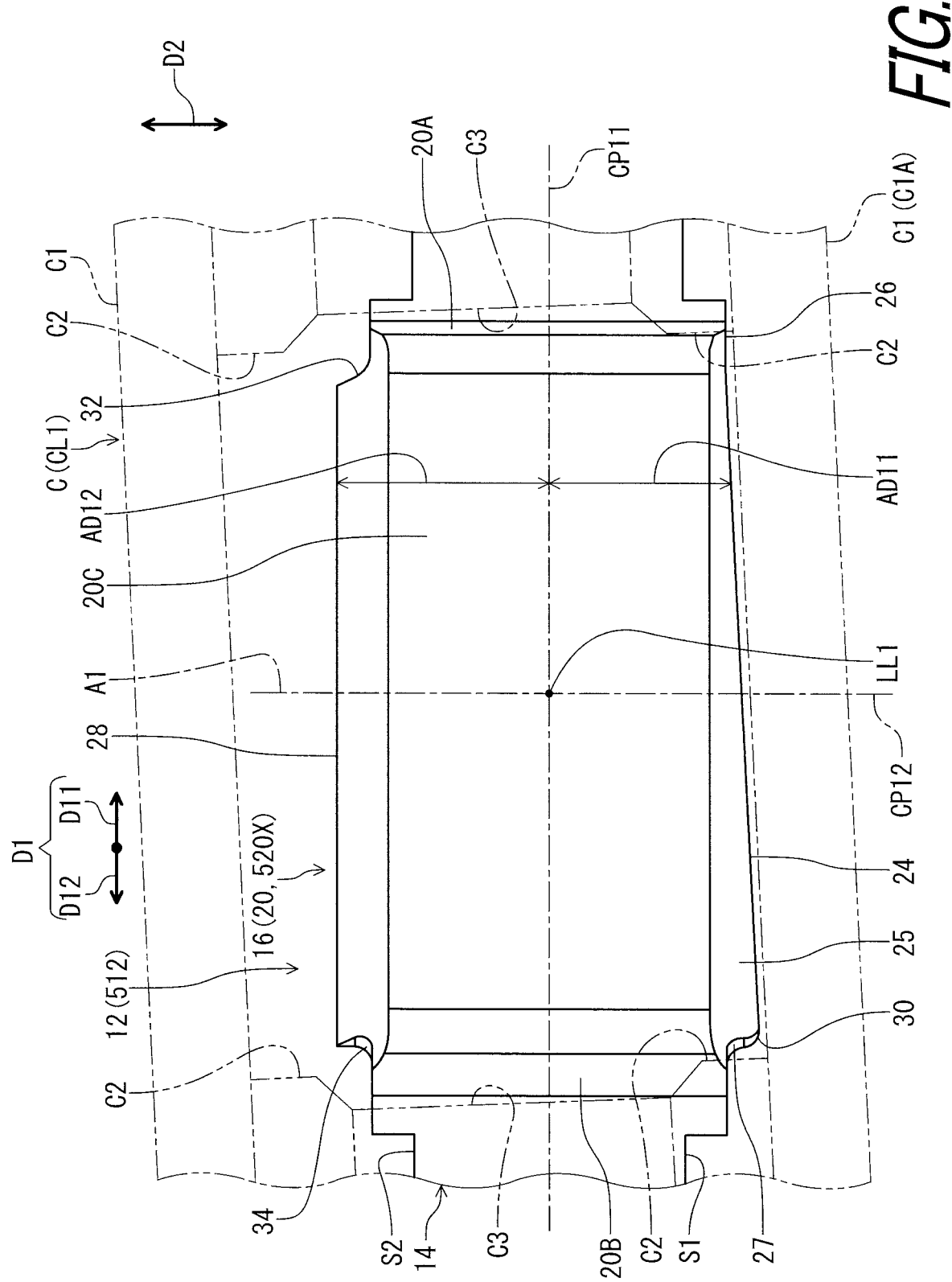
FIG. 20 is an arrow view taken in a direction of arrow XX of FIG. 3, with the bicycle chain (first chain line).

For example, as seen in FIGS. 2 and 3, the first tooth 20 and the second tooth 22 are alternately inserted into the outer link space C11 and the inner link space C21 of the bicycle chain C in a chain-engagement area CA. FIG. 20 is an arrow view taken in a direction of arrow XX of FIG. 3. As seen in FIG. 20, the first chain-facing surface 24 extends along an outer link plate CIA of the bicycle chain C inclined along the first chain line CL1. Thus, the first chain-facing surface 24 further improves the chain-holding performance of the bicycle sprocket 12.

Second Embodiment

A bicycle sprocket 212 in accordance with a second embodiment will be described below referring to FIGS. 21 to 28. The bicycle sprocket 212 has the same structure as that of the bicycle sprocket 12 except for the first additional chain-facing surface 28. Thus, elements having substantially the same function as those in the first embodiment will be numbered the same here, and will not be described and/or illustrated again in detail here for the sake of brevity.

Figure 21:
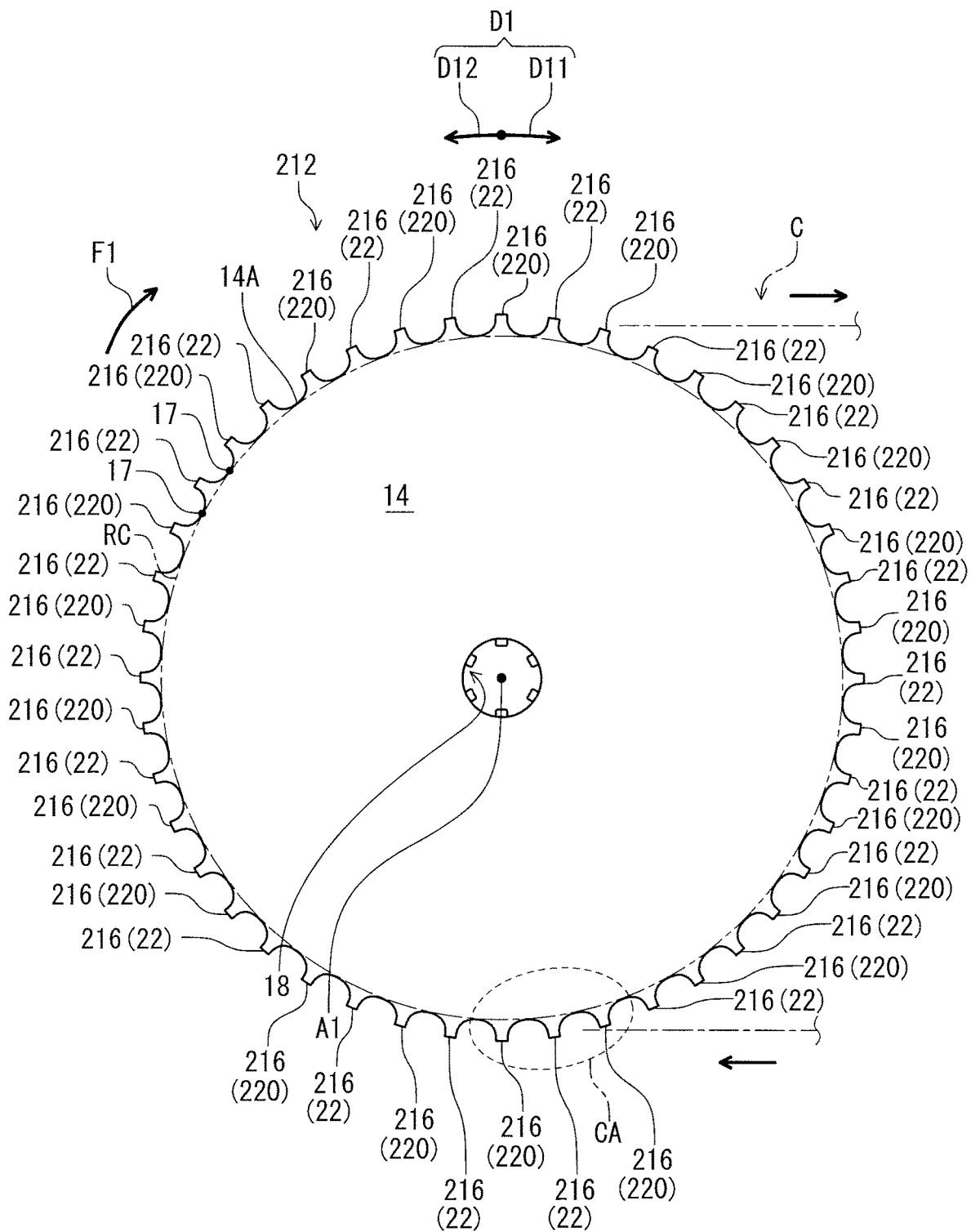
FIG. 21 is a side elevational view of a bicycle sprocket in accordance with a second embodiment.
Figure 22:
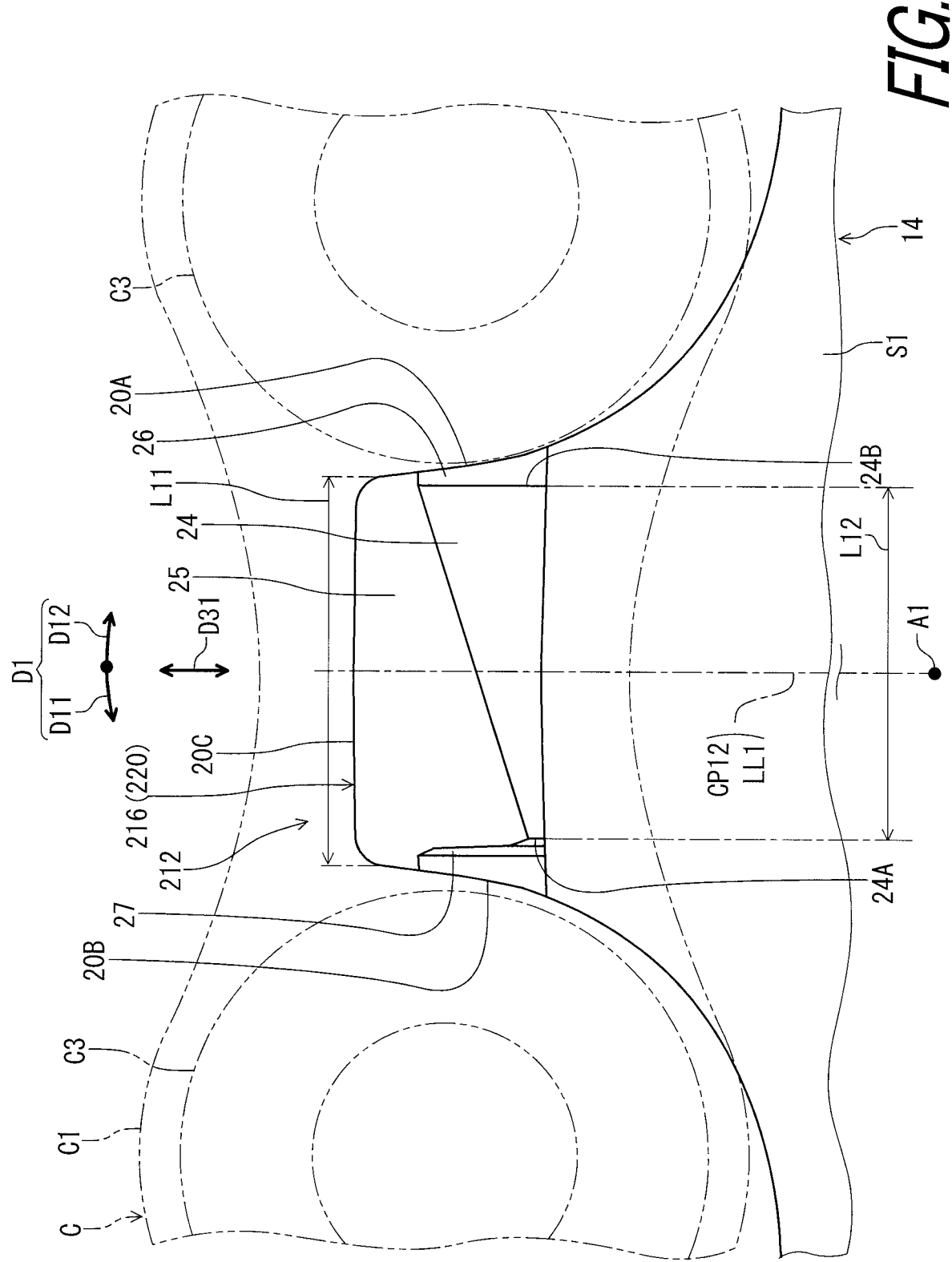
FIG. 22 is a side elevational view of a first tooth of the bicycle sprocket illustrated in FIG. 21, with the bicycle chain.
Figure 23:
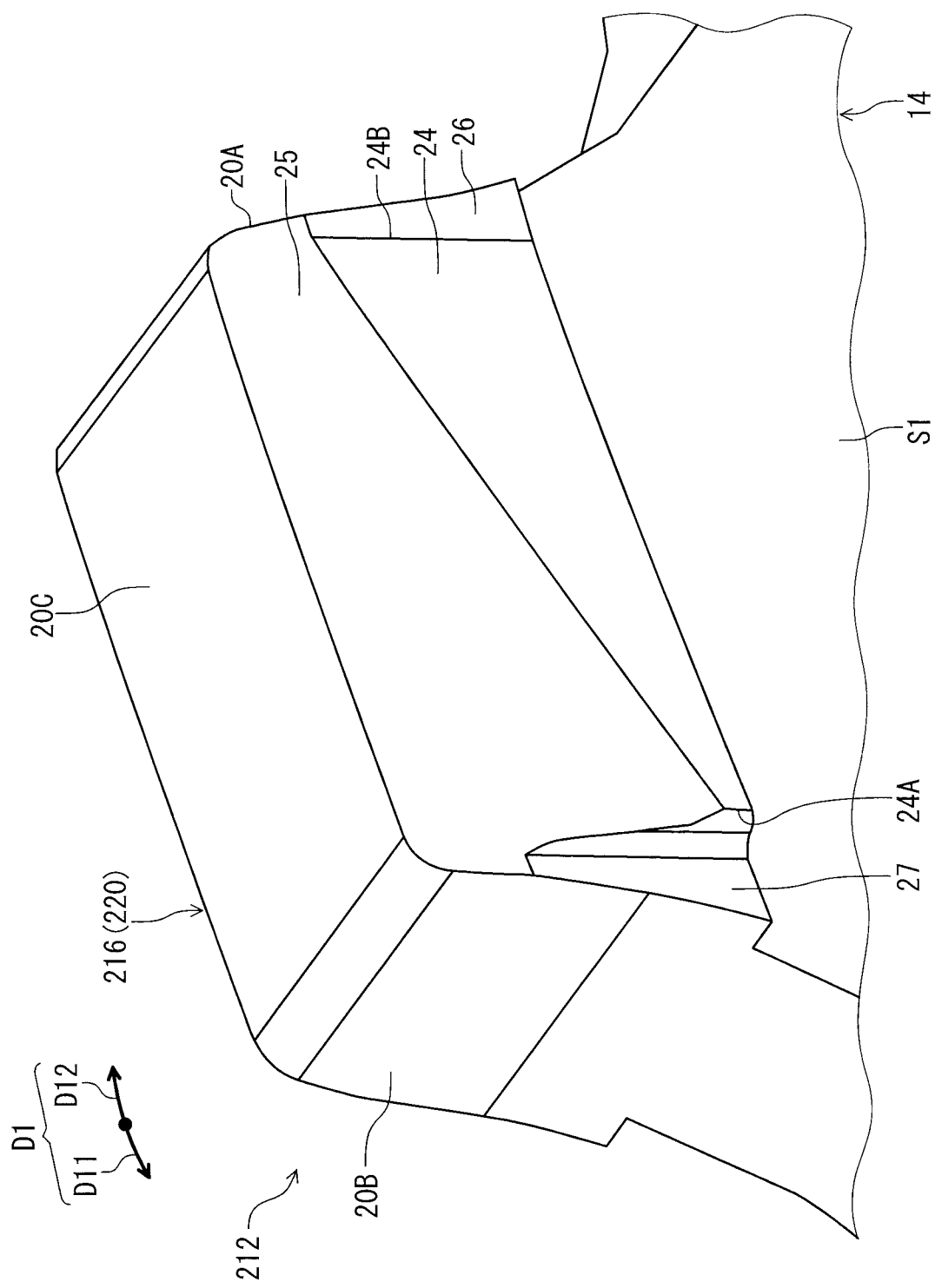
FIG. 23 is a perspective view of the first tooth of the bicycle sprocket illustrated in FIG. 21.

As seen in FIG. 21, the bicycle sprocket 212 comprises the sprocket body 14 and sprocket teeth 216. The sprocket teeth 216 include at least one first tooth 220 and the at least one second tooth 22. As seen in FIGS. 22 and 23, the at least one first tooth 220 has substantially the same structure as that of the first tooth 20 of the first embodiment. The at least one first tooth 220 has the driving surface 20A, the non-driving surface 20B, the first maximum chain-engaging width W1, the first tooth center plane CP11, and the first chain-facing surface 24.

Figure 24:
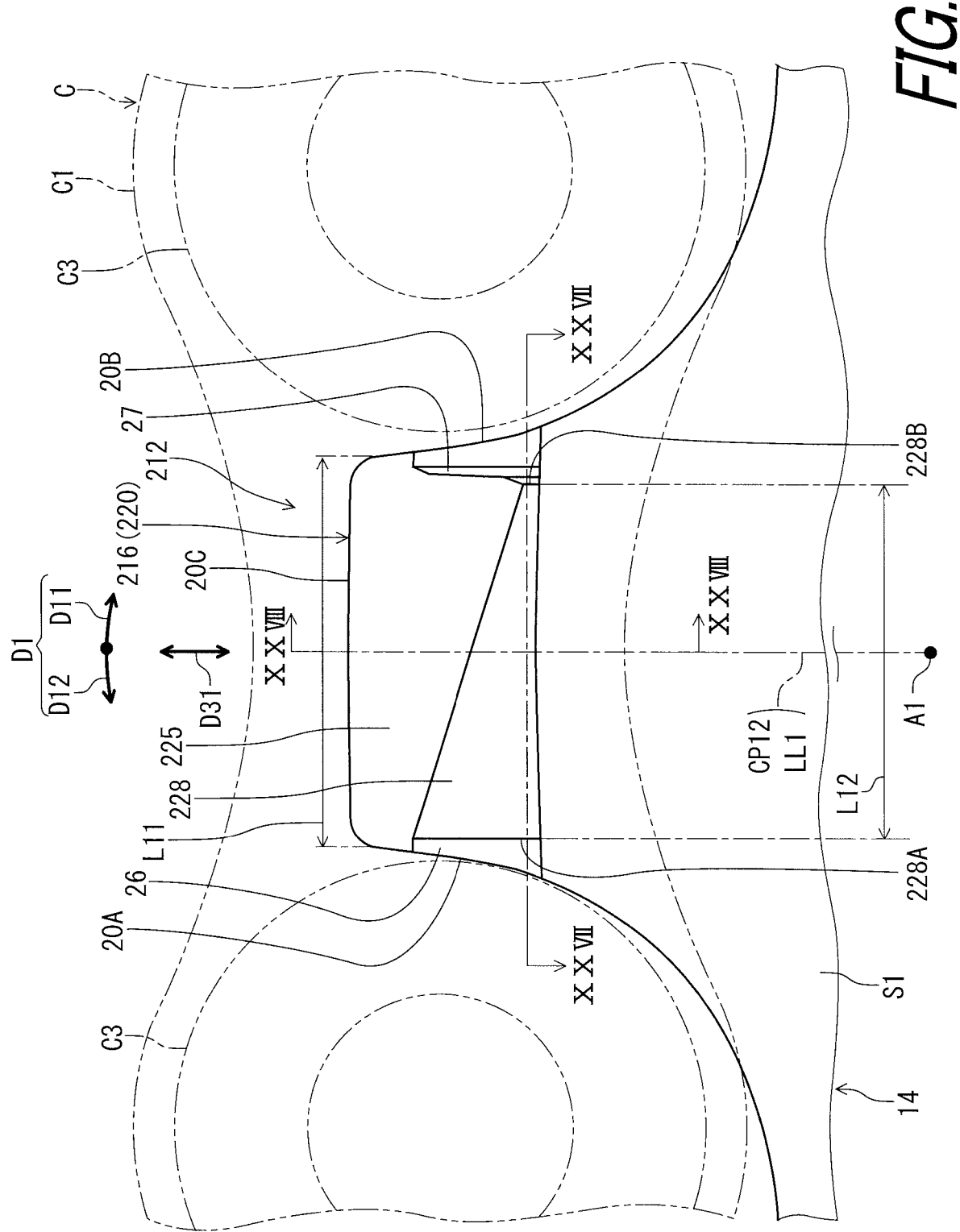
FIG. 24 is another side elevational view of the first tooth of the bicycle sprocket illustrated in FIG. 21, with the bicycle chain.
Figure 25:
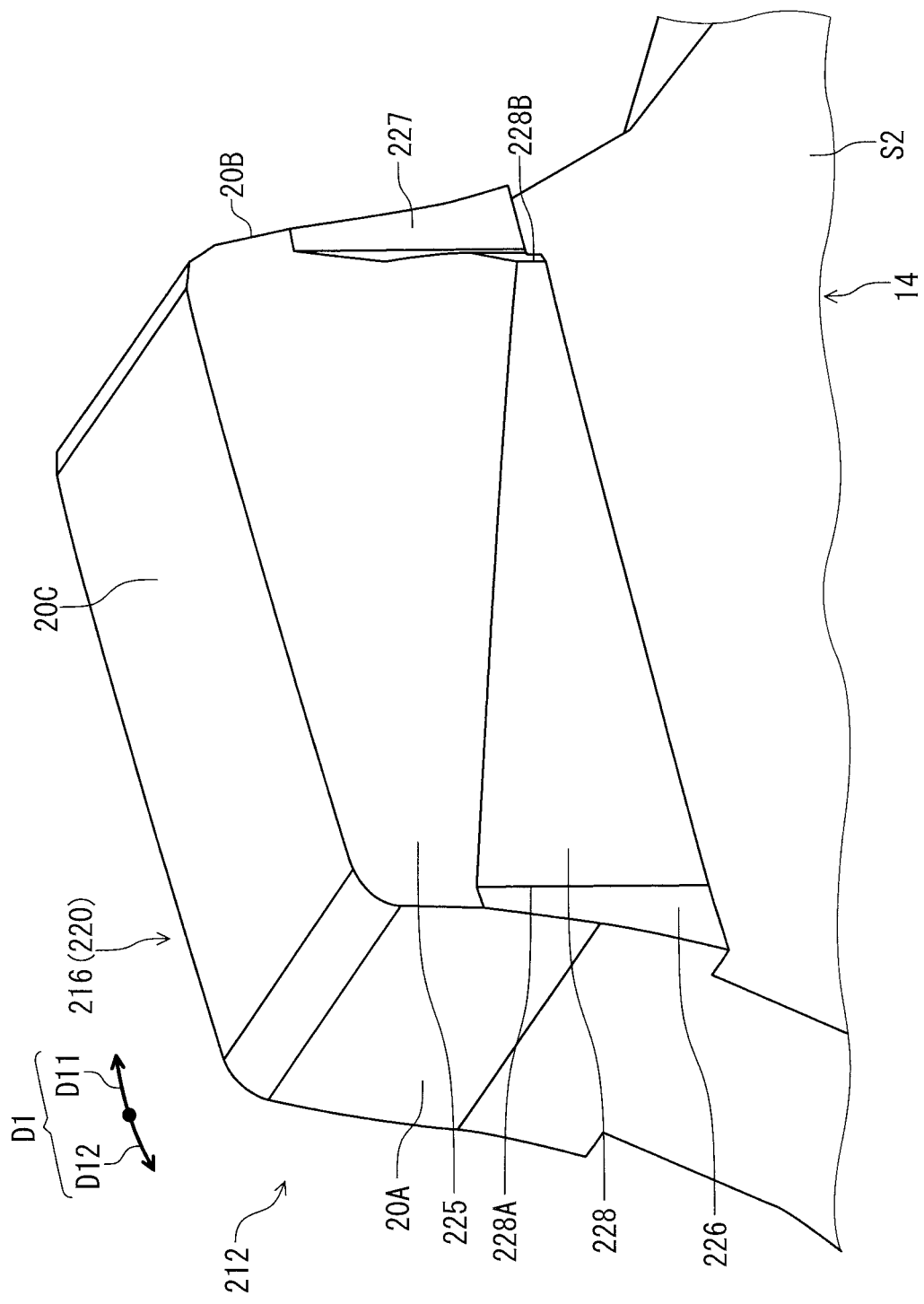
FIG. 25 is another perspective view of the first tooth of the bicycle sprocket illustrated in FIG. 21.

In this embodiment, as seen in FIGS. 24 and 25, the at least one first tooth 220 includes a first additional chain-facing surface 228 provided on a reverse side of the first chain-facing surface 24 in the axial direction D2. The first additional chain-facing surface 228 is provided between the driving surface 20A and the non-driving surface 20B in the circumferential direction D1. The first additional chain-facing surface 228 is inclined with respect to the first tooth center plane CP11 in the circumferential direction D1.

Figure 26:
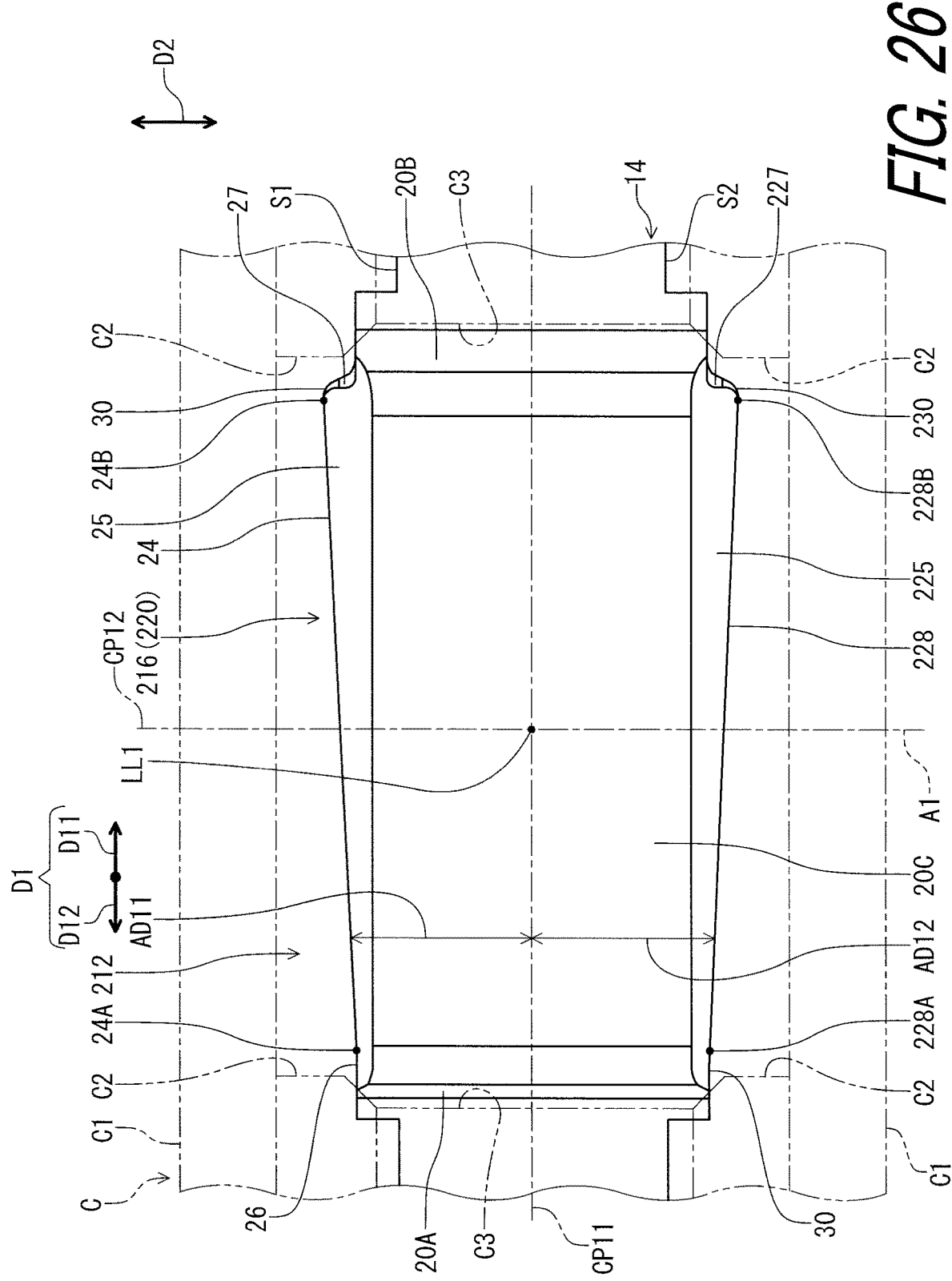
FIG. 26 is a plan view of the first tooth of the bicycle sprocket illustrated in FIG. 21.

As seen in FIG. 26, the first additional chain-facing surface 228 is inclined with respect to the first tooth center plane CP11 to increase the first additional axial distance AD12 in the second circumferential direction D12. The first chain-facing surface 24 and the first additional chain-facing surface 228 are symmetrical with respect to the first tooth center plane CP11.

As seen in FIG. 25, the first additional chain-facing surface 228 includes a first circumferential end 228A and a first additional circumferential end 228B and extends between the first circumferential end 228A and the first additional circumferential end 228B in the circumferential direction D1. The first circumferential end 228A is closer to the driving surface 20A than the first additional circumferential end 228B in the circumferential direction D1.

As seen in FIG. 26, the first additional chain-facing surface 228 is inclined with respect to the first tooth center plane CP11 to increase the first additional axial distance AD12 from one of the first circumferential end 228A and the first additional circumferential end 228B to the other of the first circumferential end 228A and the first additional circumferential end 228B in the circumferential direction D1. In this embodiment, the first additional chain-facing surface 228 is inclined with respect to the first tooth center plane CP11 to increase the first additional axial distance AD12 from the first circumferential end 228A to the first additional circumferential end 228B in the circumferential direction D1. However, the first additional chain-facing surface 228 can be inclined with respect to the first tooth center plane CP11 to increase the first additional axial distance AD12 from the first additional circumferential end 228B to the first circumferential end 228A in the circumferential direction D1.

As seen in FIGS. 24 to 26, the first tooth 220 includes a first surface 225, a second surface 226, a recess 227, and a curved surface 230. The first surfaces 25 and 225 have a symmetrical shape with respect to the first tooth center plane CP11. The second surfaces 26 and 226 have a symmetrical shape with respect to the first tooth center plane CP11. The recesses 27 and 227 have a symmetrical shape with respect to the first tooth center plane CP11. The curved surfaces 30 and 230 have a symmetrical shape with respect to the first tooth center plane CP11. Thus, they will not be described in detail here for the sake of brevity.

Figure 27:
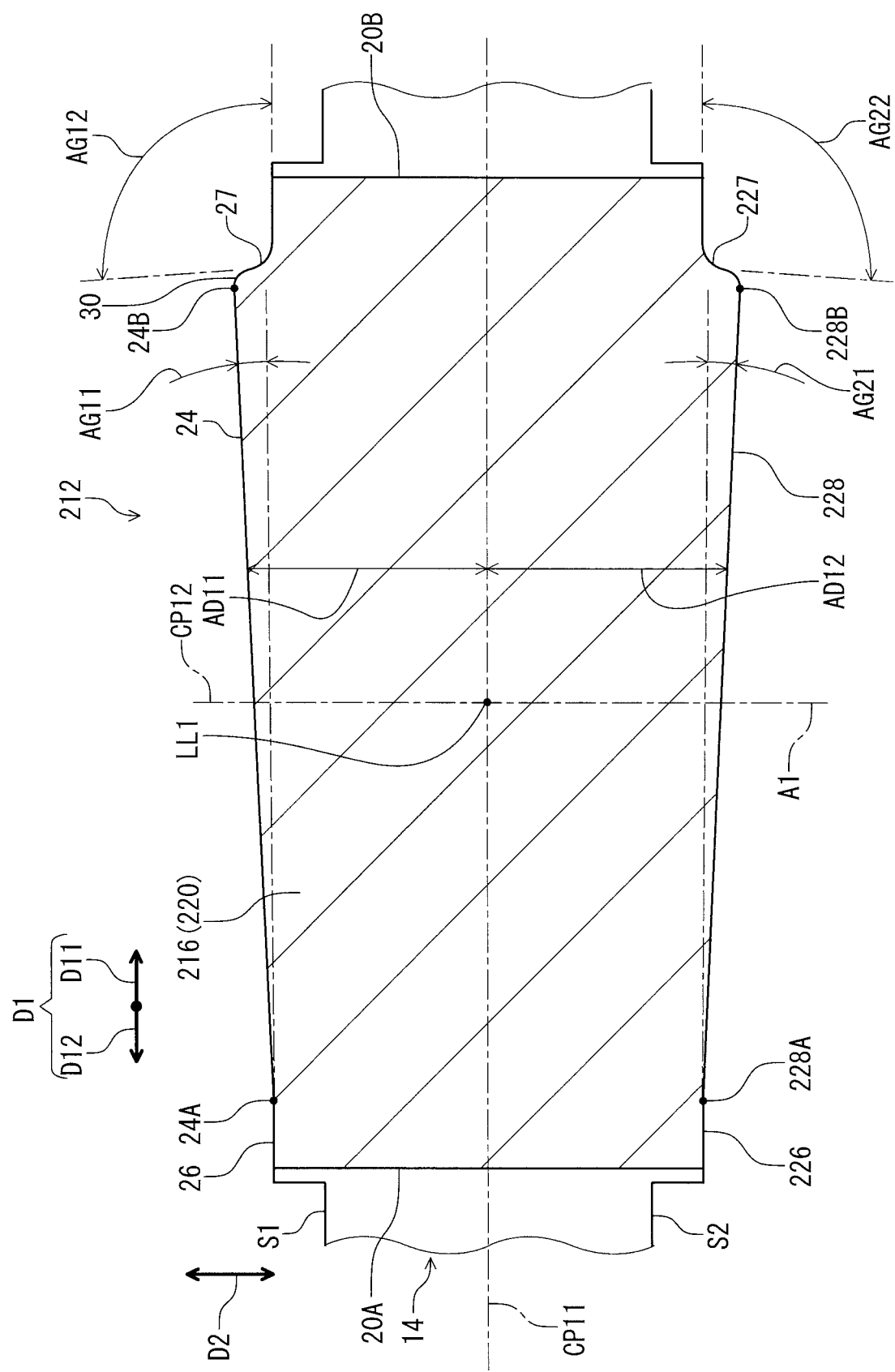
FIG. 27 is a cross-sectional view of the first tooth of the bicycle sprocket taken along line XXVII-XXVII of FIG. 24.

As seen in FIG. 27, a first additional circumferential inclined angle AG21 is defined between the first tooth center plane CP11 and the first additional chain-facing surface 228 when viewed in the radial direction D31 (FIG. 28) of the bicycle sprocket 212. The first additional circumferential inclined angle AG21 is equal to or smaller than 45 degrees. The first additional circumferential inclined angle AG21 is preferably smaller than an inclination angle AG22 of the recess 227. However, the first additional circumferential inclined angle AG21 is not limited to this embodiment.

Figure 28:
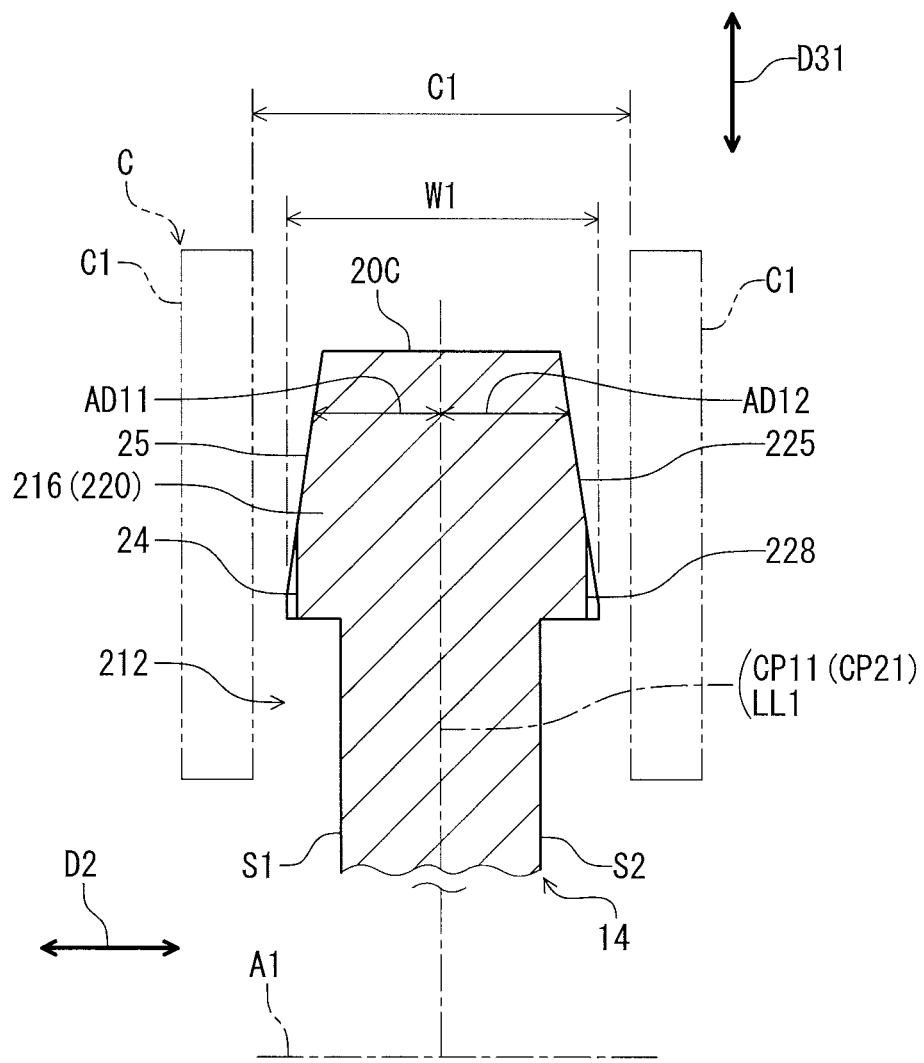
FIG. 28 is a partial cross-sectional view of the bicycle sprocket taken along line XXVIII-XXVIII of FIG. 24.

As seen in FIG. 28, the first additional chain-facing surface 228 extends in the radial direction D31 perpendicular to the rotational center axis A1 to keep the first additional axial distance AD12 constant. The first additional chain-facing surface 228 extends radially inwardly from the first surface 225 toward the rotational center axis A1 to keep the first additional axial distance AD12 constant.

Figure 29:
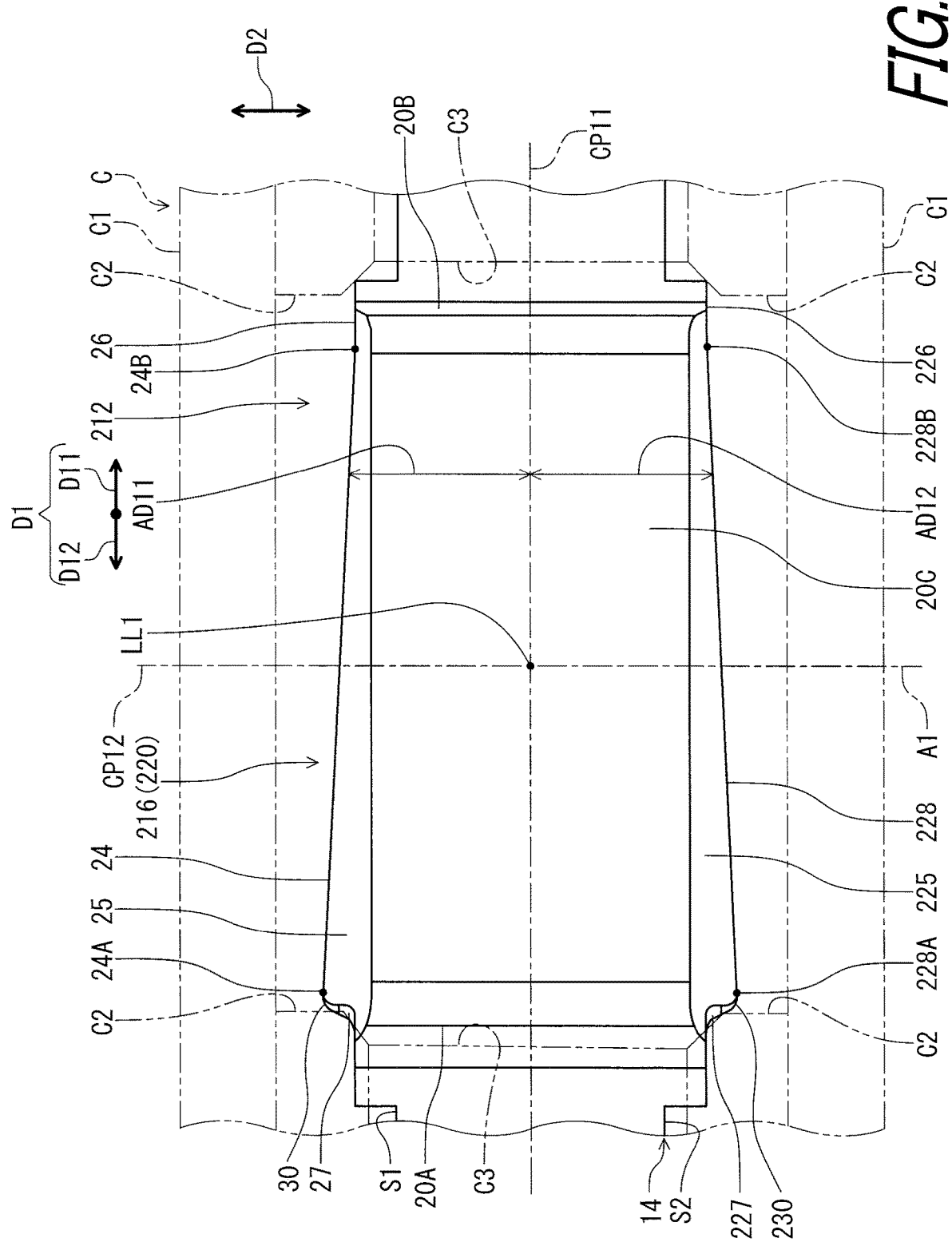
FIG. 29 is a plan view of a first tooth of a bicycle sprocket in accordance with a modification of the second embodiment.

As seen in FIG. 26, the first chain-facing surface 24 is inclined with respect to the first tooth center plane CP11 to increase the first axial distance AD11 from the driving surface 20A to the non-driving surface 20B in the circumferential direction D1. The first additional chain-facing surface 228 is inclined with respect to the first tooth center plane CP11 to increase the first additional axial distance AD12 from the driving surface 20A to the non-driving surface 20B in the circumferential direction D1. As seen in FIG. 29, however, the first chain-facing surface 24 can be inclined with respect to the first tooth center plane CP11 to increase the first axial distance AD11 from the non-driving surface 20B to the driving surface 20A in the circumferential direction D1. The first additional chain-facing surface 228 can be inclined with respect to the first tooth center plane CP11 to increase the first additional axial distance AD12 from the non-driving surface 20B to the driving surface 20A in the circumferential direction D1.

With the bicycle sprocket 212, it is possible to obtain substantially the same effect as that of the bicycle sprocket 12 of the first embodiment.

Third Embodiment

A bicycle sprocket 312 in accordance with a third embodiment will be described below referring to FIGS. 30 to 35. The bicycle sprocket 312 has the same structure as that of the bicycle sprocket 12 except for the first additional chain-facing surface 28. Thus, elements having substantially the same function as those in the above embodiments will be numbered the same here, and will not be described and/or illustrated again in detail here for the sake of brevity.

Figure 30:
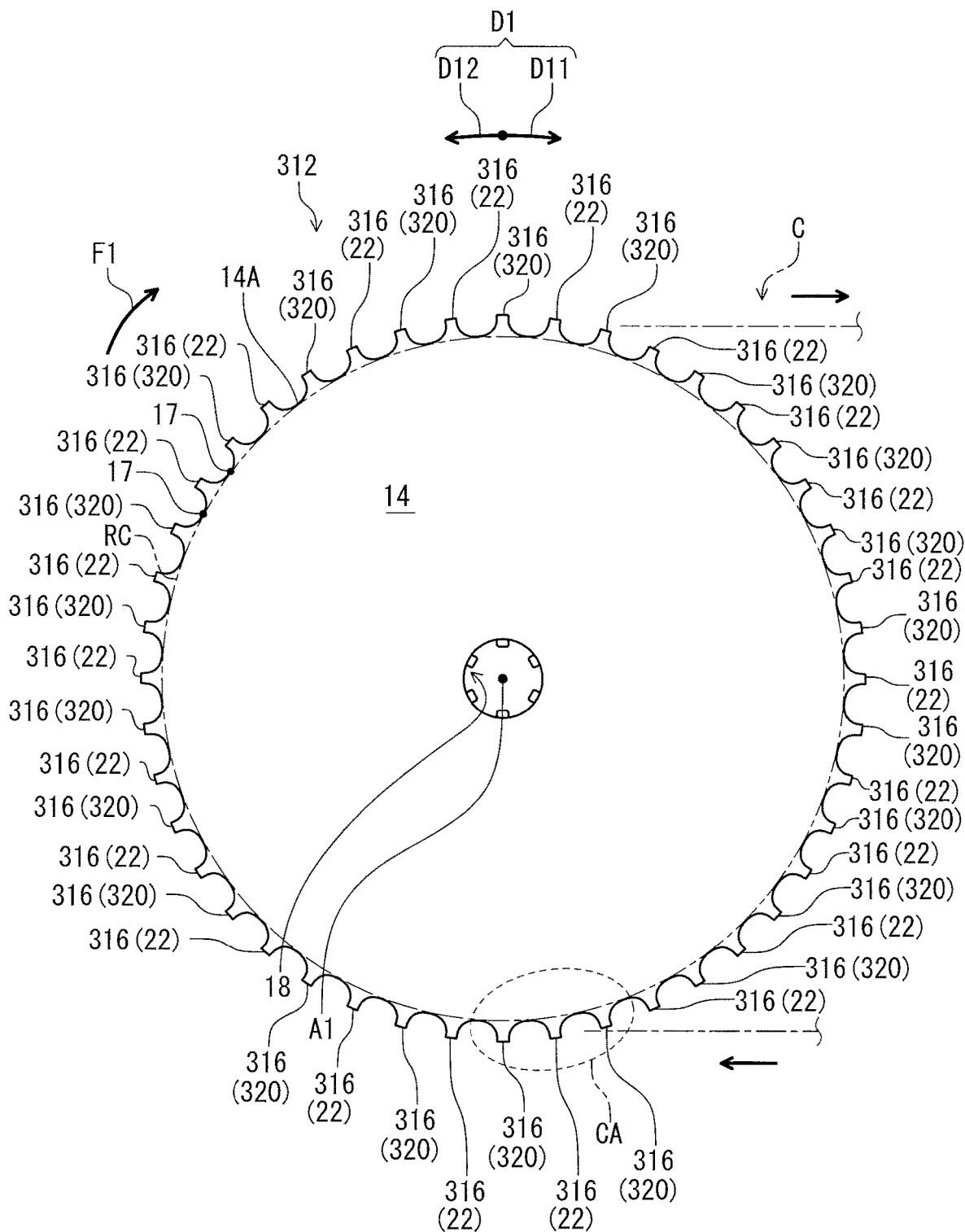
FIG. 30 is a side elevational view of a bicycle sprocket in accordance with a third embodiment.
Figure 31:
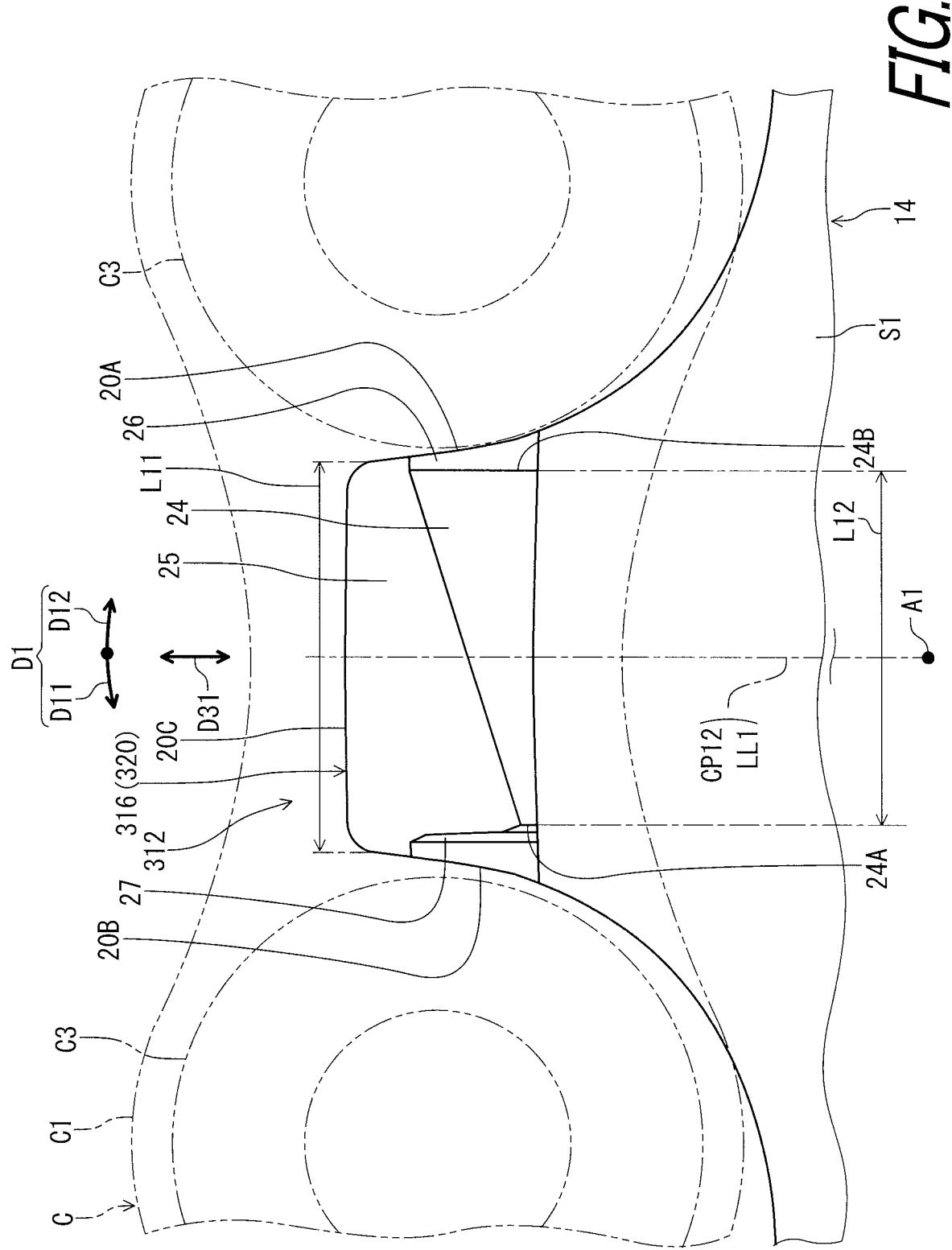
FIG. 31 is a side elevational view of a first tooth of the bicycle sprocket illustrated in FIG. 30, with the bicycle chain.
Figure 32:
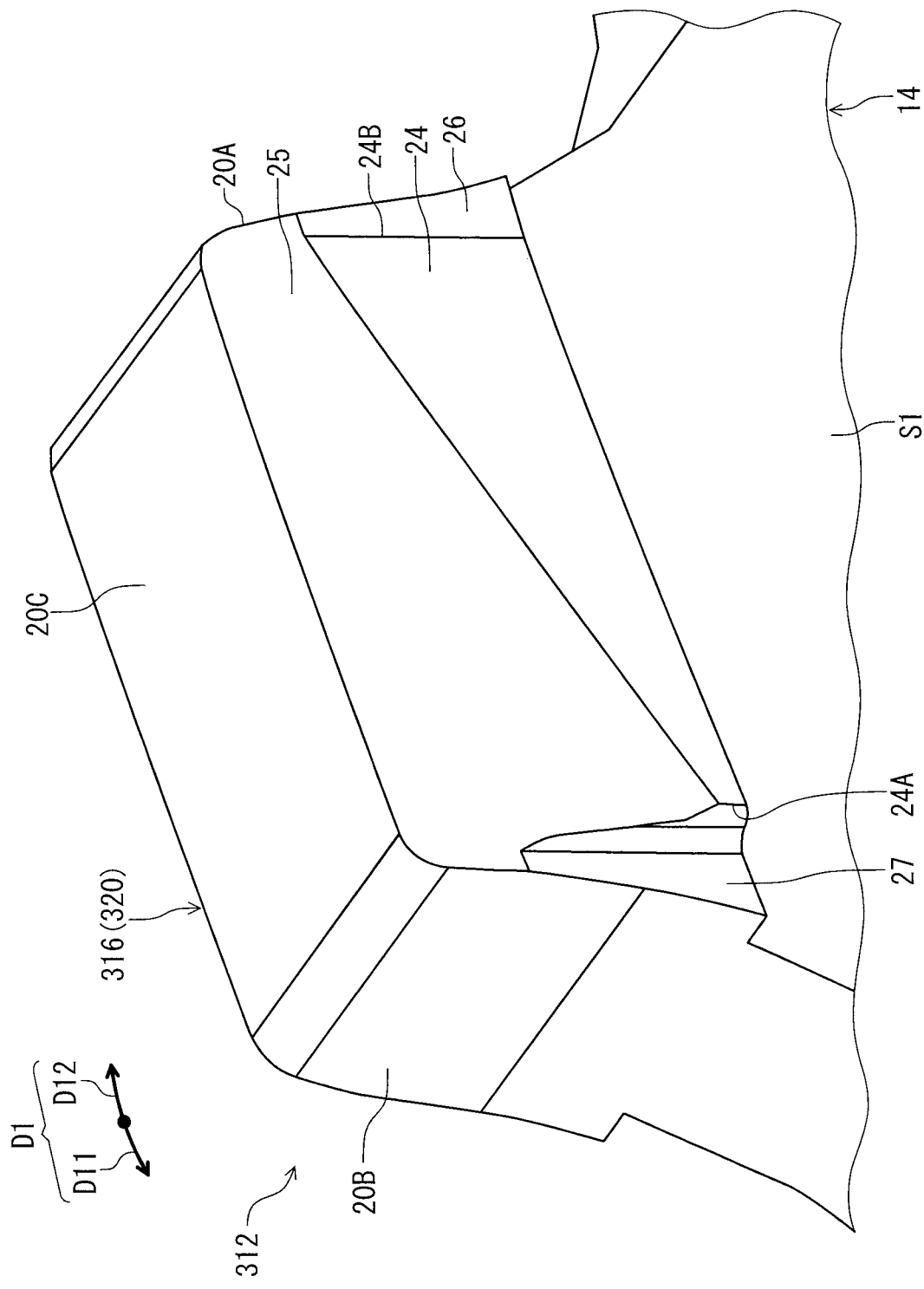
FIG. 32 is a perspective view of the first tooth of the bicycle sprocket illustrated in FIG. 30.

As seen in FIG. 30, the bicycle sprocket 312 comprises the sprocket body 14 and sprocket teeth 316. The sprocket teeth 316 include at least one first tooth 320 and the at least one second tooth 22. As seen in FIGS. 31 and 32, the at least one first tooth 320 has substantially the same structure as that of the first tooth 20 of the first embodiment. The at least one first tooth 320 has the driving surface 20A, the non-driving surface 20B, the first maximum chain-engaging width W1, the first tooth center plane CP11, and the first chain-facing surface 24.

Figure 33:
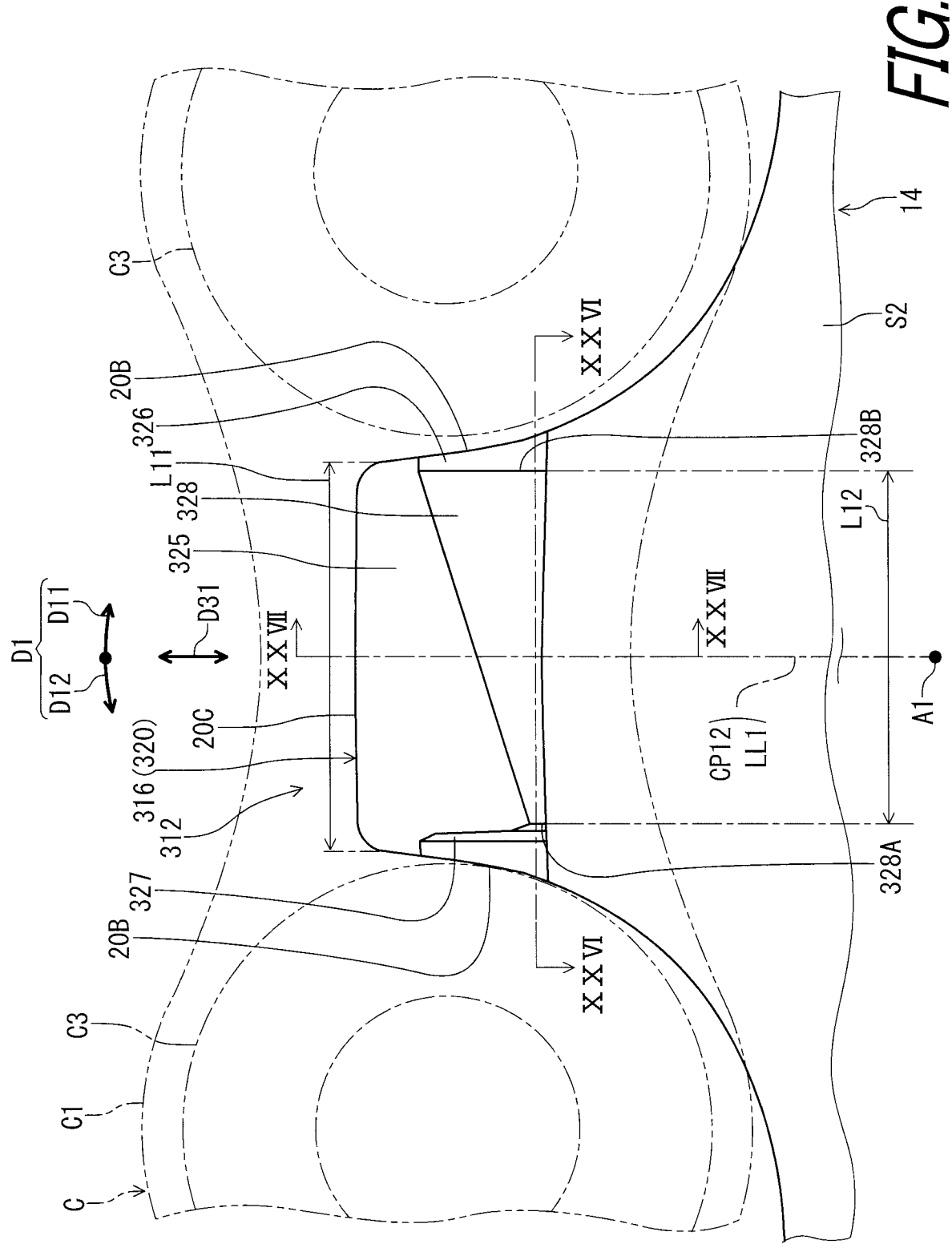
FIG. 33 is another side elevational view of the first tooth of the bicycle sprocket illustrated in FIG. 30, with the bicycle chain.
Figure 34:
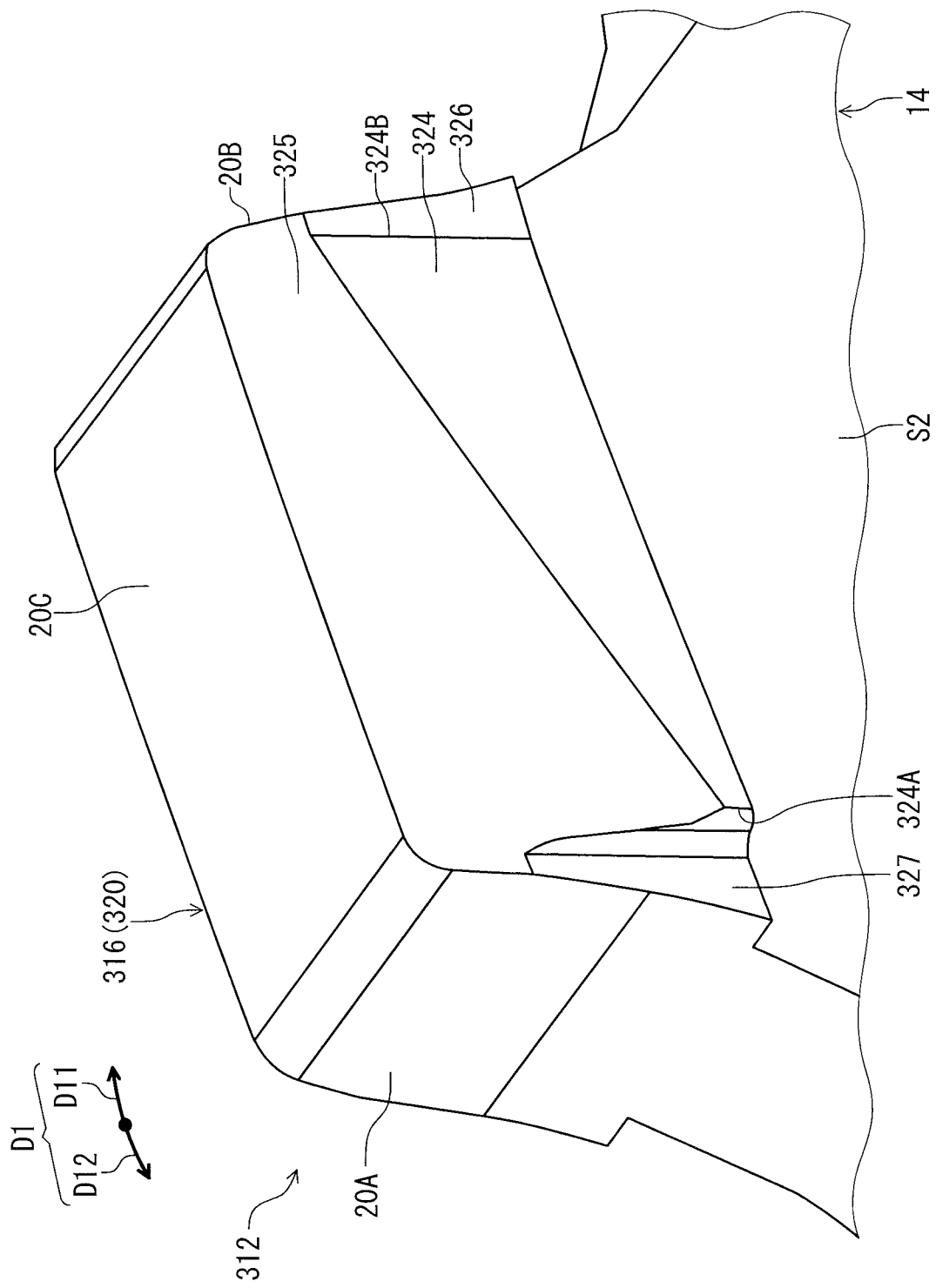
FIG. 34 is another perspective view of the first tooth of the bicycle sprocket illustrated in FIG. 30.

In this embodiment, as seen in FIGS. 33 and 34, the at least one first tooth 320 includes a first additional chain-facing surface 328 provided on a reverse side of the first chain-facing surface 24 in the axial direction D2. The first additional chain-facing surface 328 is provided between the driving surface 20A and the non-driving surface 20B in the circumferential direction D1. The first additional chain-facing surface 328 is inclined with respect to the first tooth center plane CP11 in the circumferential direction D1.

Figure 35:
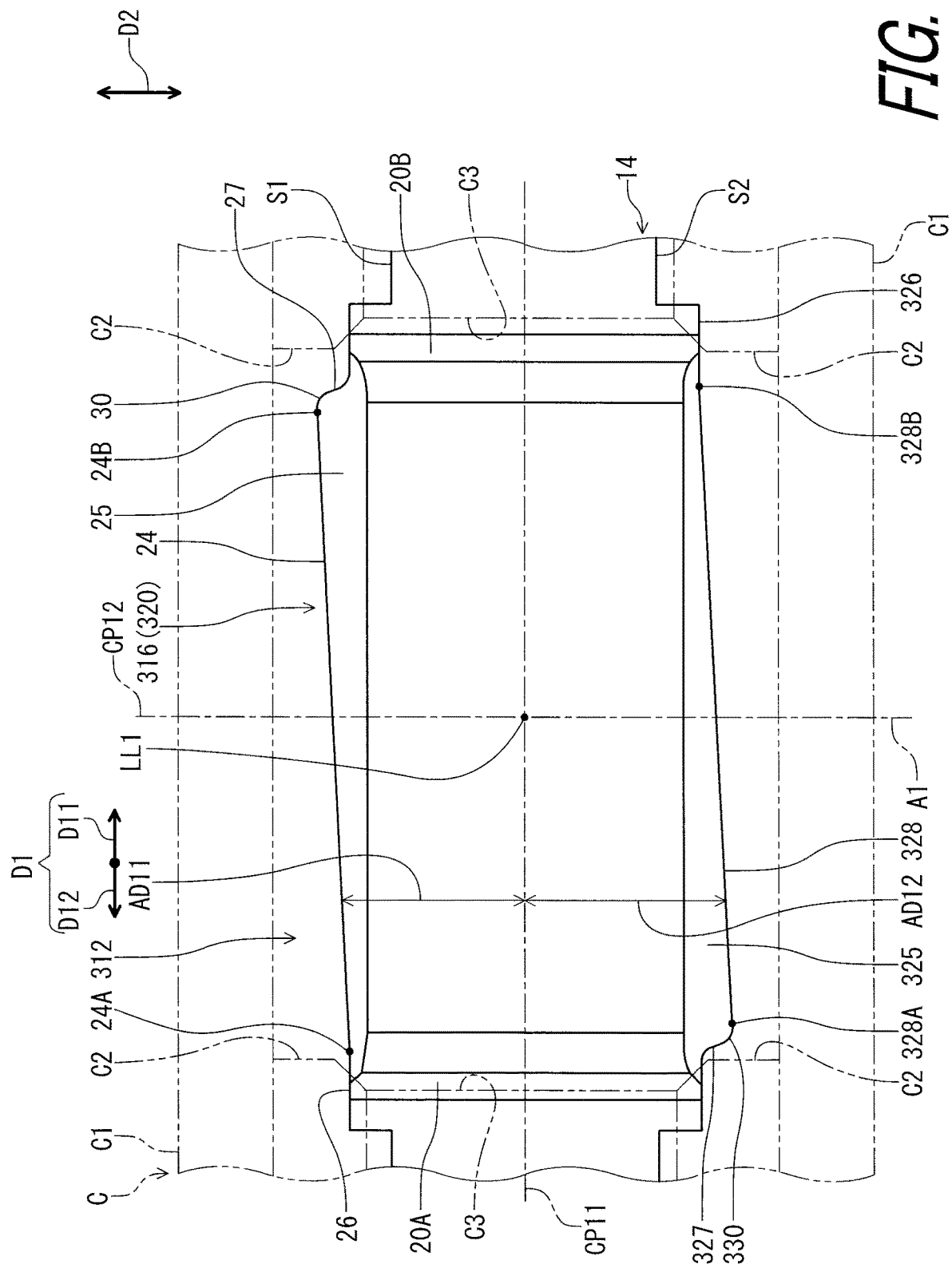
FIG. 35 is a plan view of the first tooth of the bicycle sprocket illustrated in FIG. 30.

As seen in FIG. 35, the first additional chain-facing surface 328 is inclined with respect to the first tooth center plane CP11 to increase the first additional axial distance AD12 in the first circumferential direction D11. The first chain-facing surface 24 and the first additional chain-facing surface 328 are asymmetrical with respect to the first tooth center plane CP11. The first chain-facing surface 24 and the first additional chain-facing surface 328 are symmetrical with respect to the first center line LL1. Thus, it will not be described in detail here for the sake of brevity.

As seen in FIGS. 33 to 35, the first tooth 320 includes a first surface 325, a second surface 326, a recess 327, and a curved surface 330. As seen in FIG. 35, the first surfaces 25 and 325 have a symmetrical shape with respect to the first center line LL1. The second surfaces 26 and 326 have a symmetrical shape with respect to the first center line LL1. The recesses 27 and 227 have a symmetrical shape with respect to the first center line LL1. The curved surfaces 30 and 330 have a symmetrical shape with respect to the first center line LL1. Thus, they will not be described in detail here for the sake of brevity. In other words, the first additional chain-facing surface 328, the first surface 325, the second surface 326, the recess 327, and the curved surface 330 have the same structures as those of the first additional chain-facing surface 228, the first surface 225, the second surface 226, the recess 227, and the curved surface 230 illustrated in FIG. 29 as a modification of the second embodiment.

Figure 36:
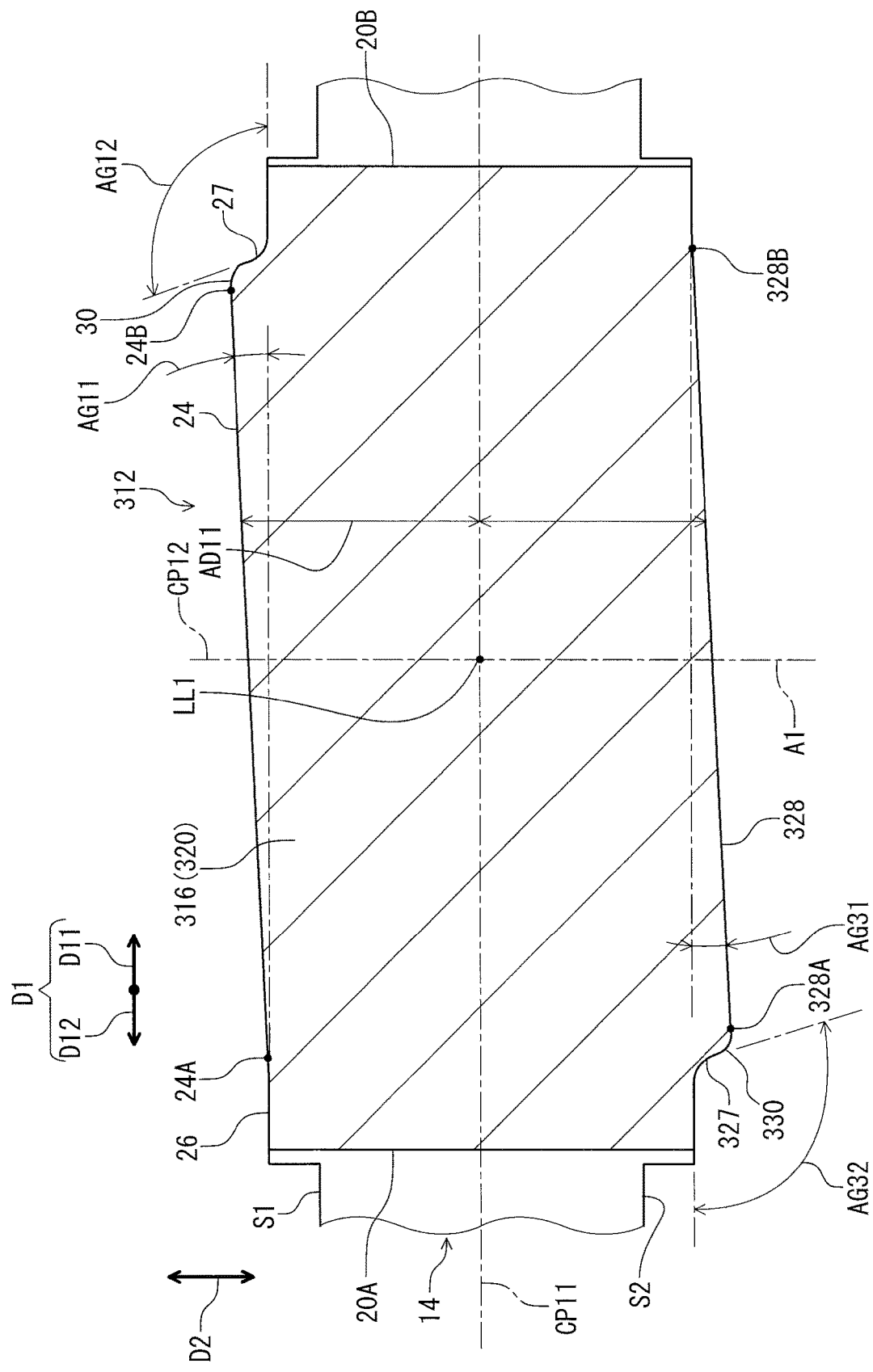
FIG. 36 is a cross-sectional view of the first tooth of the bicycle sprocket taken along line XXXVI-XXXVI of FIG. 33.

As seen in FIG. 36, a first additional circumferential inclined angle AG31 is defined between the first tooth center plane CP11 and the first additional chain-facing surface 328 when viewed in the radial direction D31 (FIG. 37) of the bicycle sprocket 212. The first additional circumferential inclined angle AG31 is equal to or smaller than 45 degrees. The first additional circumferential inclined angle AG31 is preferably smaller than an inclination angle AG22 of the recess 227. However, the first additional circumferential inclined angle AG31 is not limited to this embodiment.

Figure 37:
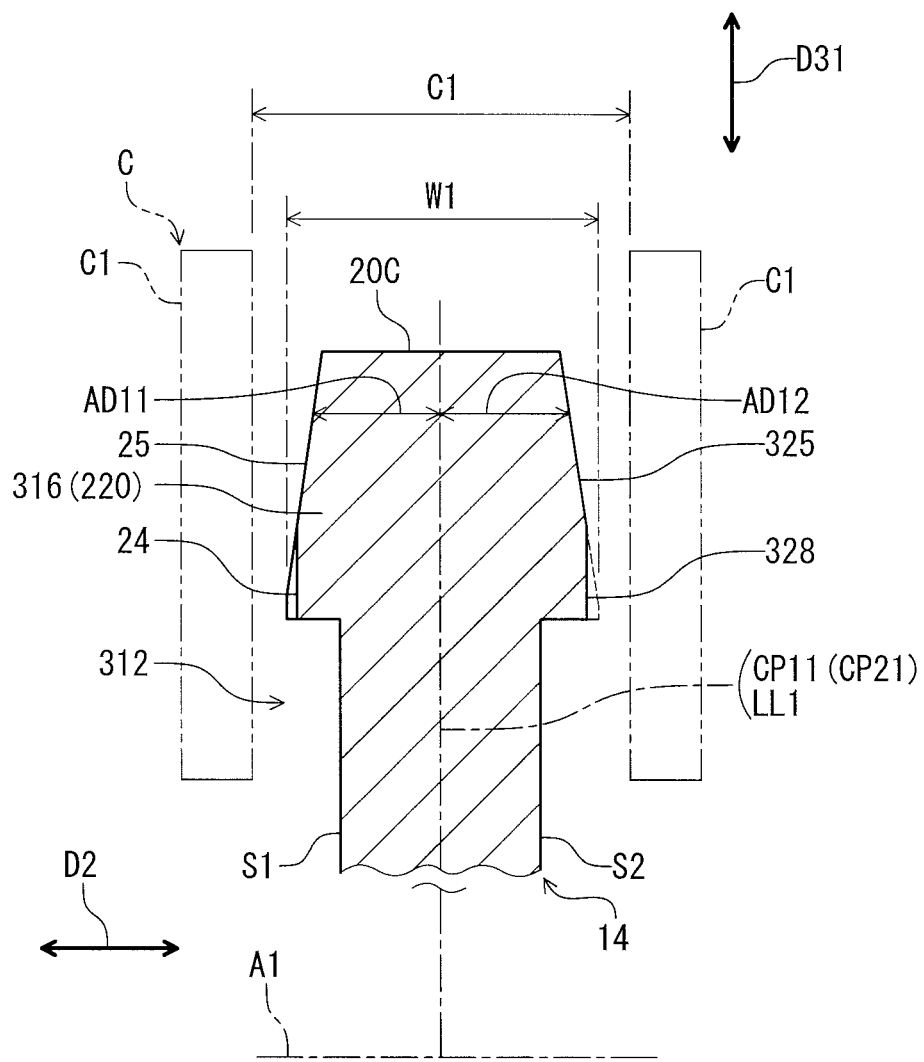
FIG. 37 is a partial cross-sectional view of the bicycle sprocket taken along line XXXVII-XXVII of FIG. 33.

As seen in FIG. 37, the first additional chain-facing surface 328 extends in the radial direction D31 perpendicular to the rotational center axis A1 to keep the first additional axial distance AD12 constant. The first additional chain-facing surface 328 extends radially inwardly from the first surface 325 toward the rotational center axis A1 to keep the first additional axial distance AD12 constant.

Figure 38:
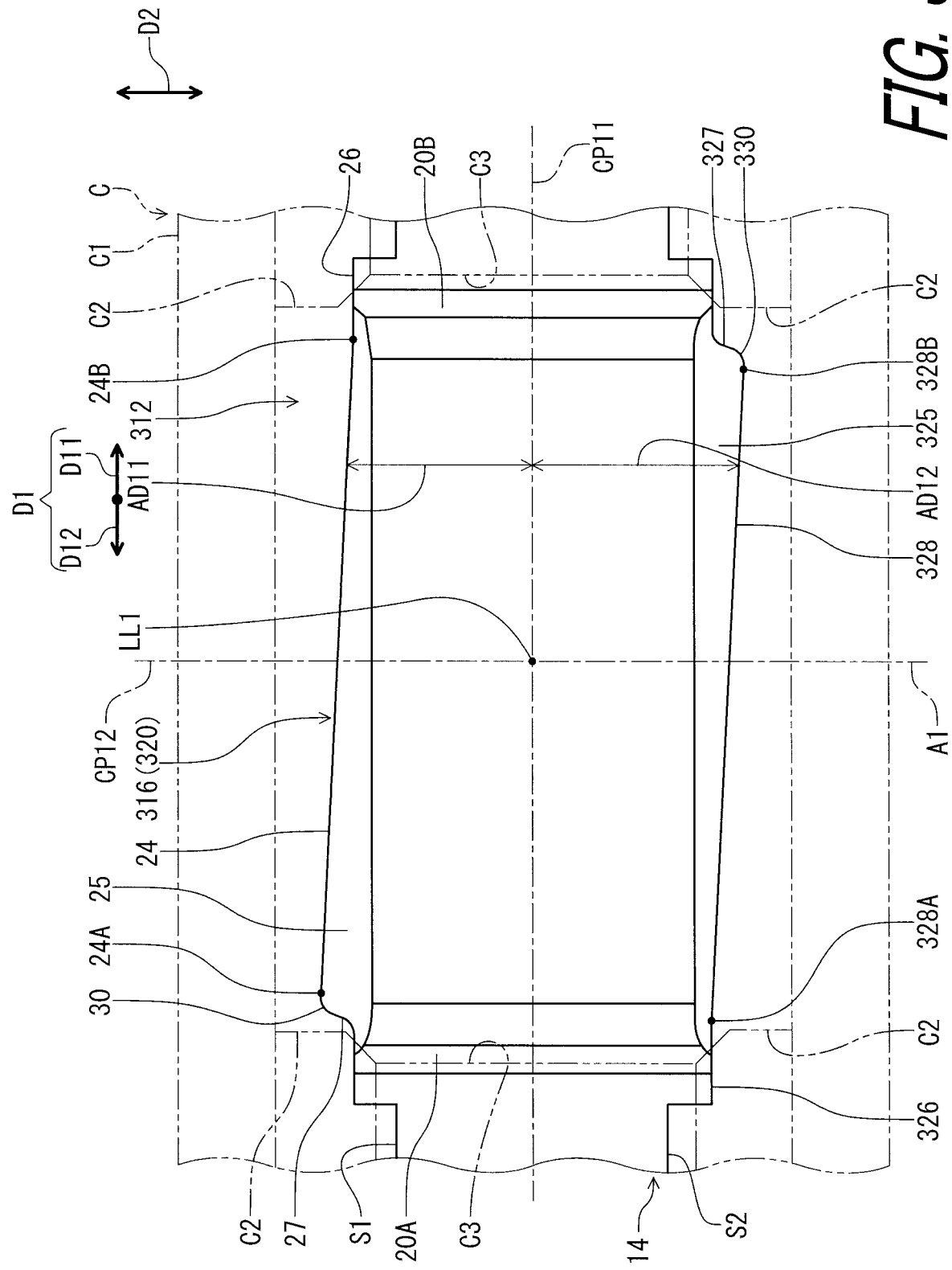
FIG. 38 is a plan view of a first tooth of a bicycle sprocket in accordance with a modification of the third embodiment.

As seen in FIG. 35, the first chain-facing surface 24 is inclined with respect to the first tooth center plane CP11 to increase the first axial distance AD11 from the driving surface 20A to the non-driving surface 20B in the circumferential direction D1. The first additional chain-facing surface 328 is inclined with respect to the first tooth center plane CP11 to increase the first additional axial distance AD12 from the non-driving surface 20B to the driving surface 20A in the circumferential direction D1. As seen in FIG. 38, however, the first chain-facing surface 24 can be inclined with respect to the first tooth center plane CP11 to increase the first axial distance AD11 from the non-driving surface 20B to the driving surface 20A in the circumferential direction D1. The first additional chain-facing surface 328 can be inclined with respect to the first tooth center plane CP11 to increase the first additional axial distance AD12 from the driving surface 20A to the non-driving surface 20B in the circumferential direction D1.

With the bicycle sprocket 312, it is possible to obtain the substantially the same effect as that of the bicycle sprocket 12 of the first embodiment.

Fourth Embodiment

A bicycle sprocket 412 in accordance with a fourth embodiment will be described below referring to FIGS. 39 to 44. The bicycle sprocket 412 has the same structure as that of the bicycle sprocket 12 except for the first chain-facing surface 24. Thus, elements having substantially the same function as those in the above embodiments will be numbered the same here, and will not be described and/or illustrated again in detail here for the sake of brevity.

Figure 39:
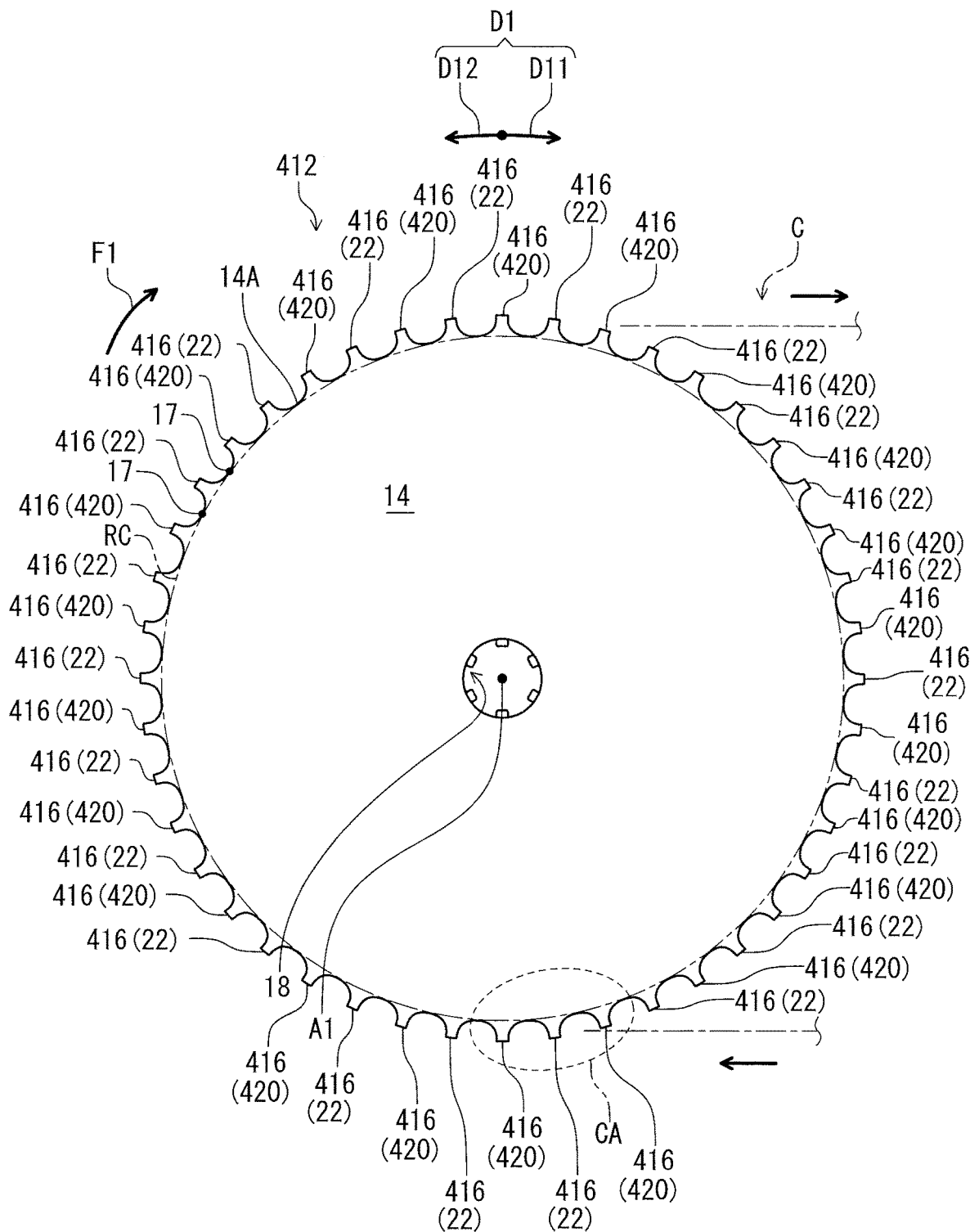
FIG. 39 is a side elevational view of a bicycle sprocket in accordance with a fourth embodiment.
Figure 40:
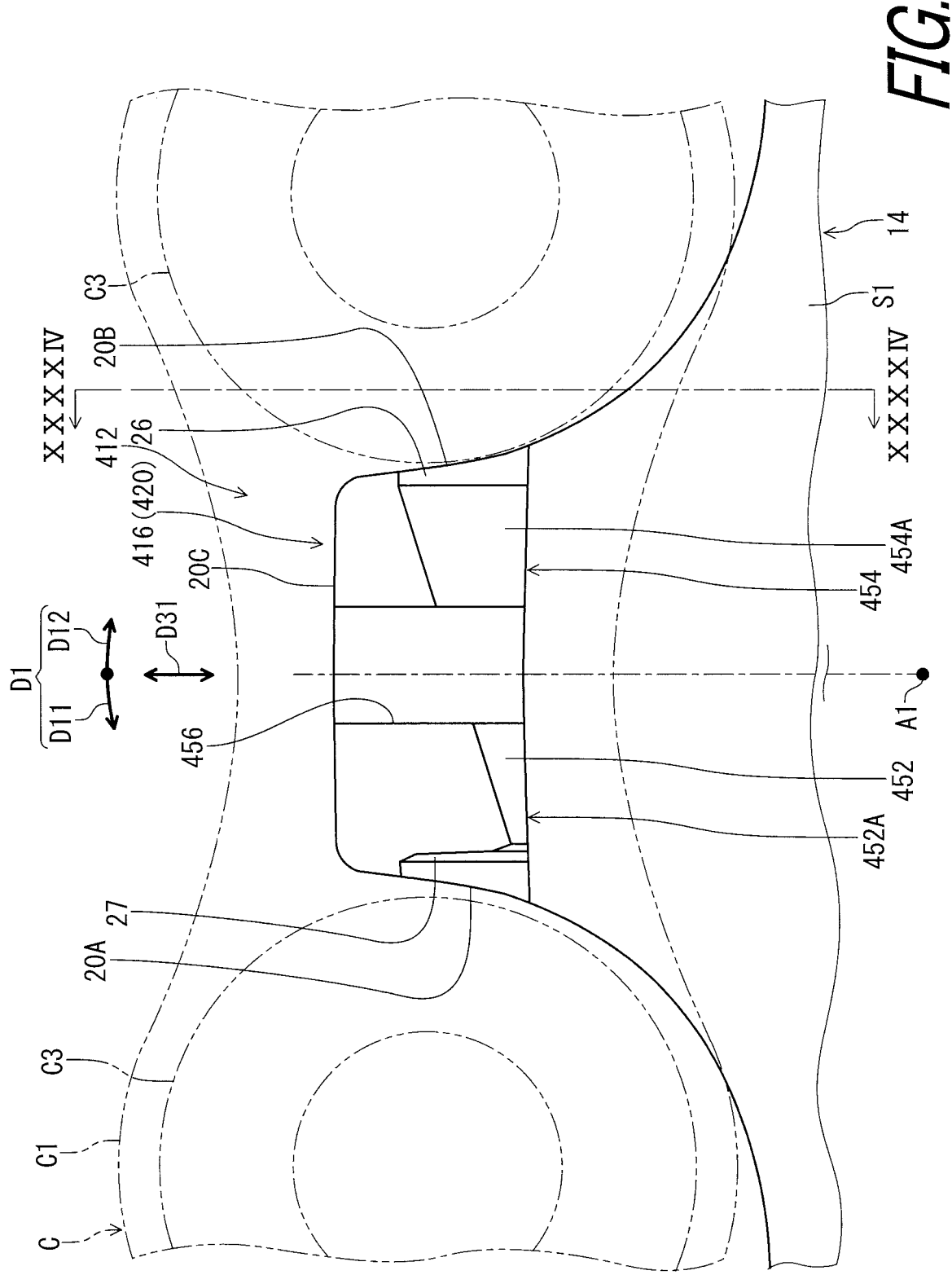
FIG. 40 is a side elevational view of a first tooth of the bicycle sprocket illustrated in FIG. 39, with the bicycle chain.
Figure 41:
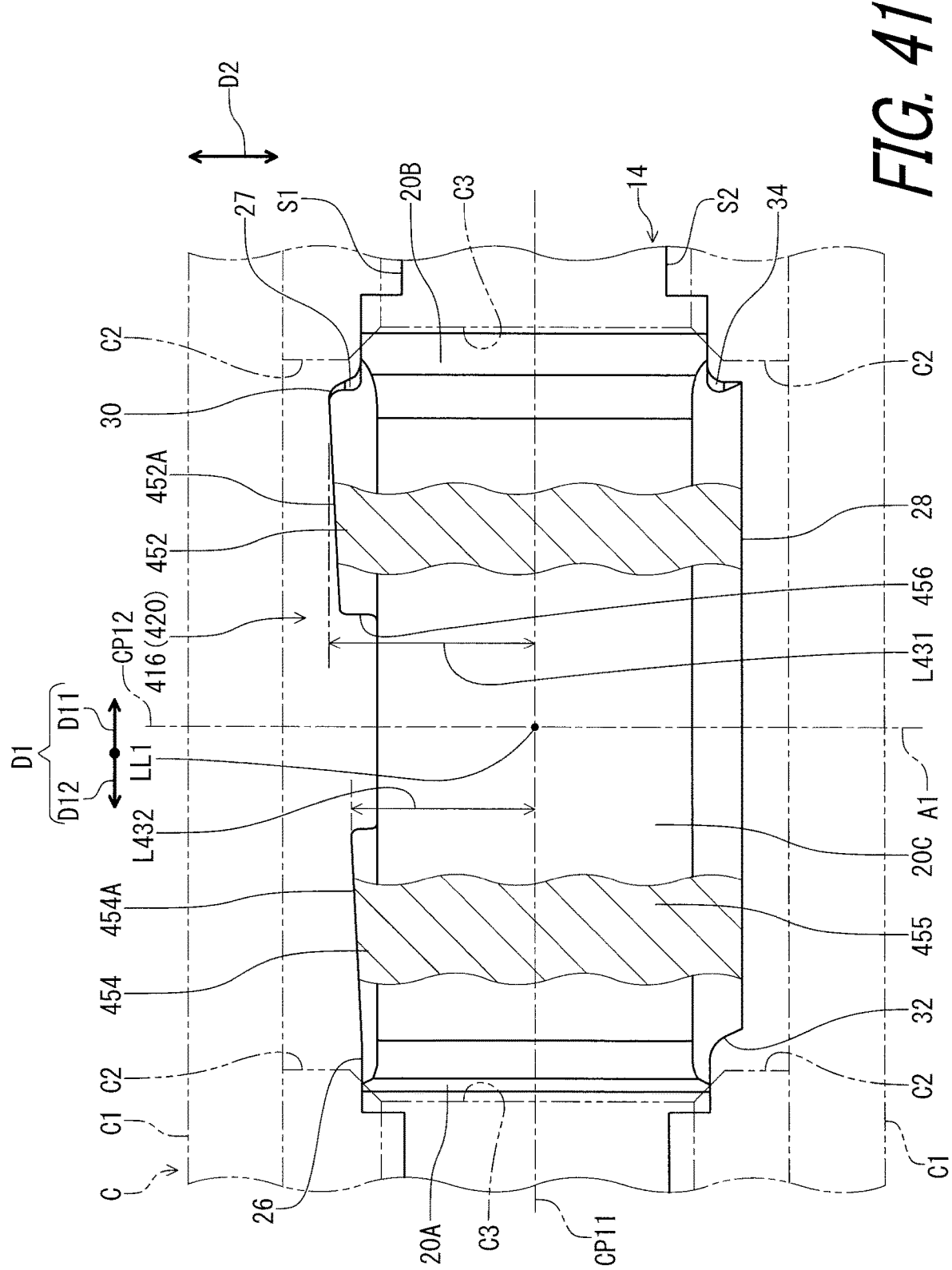
FIG. 41 is a plan view of the first tooth of the bicycle sprocket illustrated in FIG. 39.

As seen in FIG. 39, the bicycle sprocket 412 comprises the sprocket body 14 and sprocket teeth 416. The sprocket teeth 416 include at least one first tooth 420 and the at least one second tooth 22. As seen in FIGS. 40 and 41, the at least one first tooth 420 has substantially the same structure as that of the first tooth 20 of the first embodiment. The at least one first tooth 420 has the driving surface 20A, the non-driving surface 20B, the first maximum chain-engaging width W1, the first tooth center plane CP11, and the first chain-facing surface 24.

In this embodiment, as seen in FIG. 41, the at least one first tooth 420 has a first projection 452 and a second projection 454. The first tooth 420 includes a main body 455. The first projection 452 and the second projection 454 are projected from the main body 455 in the axial direction D2. The first projection 452 and the second projection 454 are integrally provided with the main body 455 as a one-piece unitary member. However, at least one of the first projection 452 and the second projection 454 can be a separate member from the main body 455.

Figure 42:
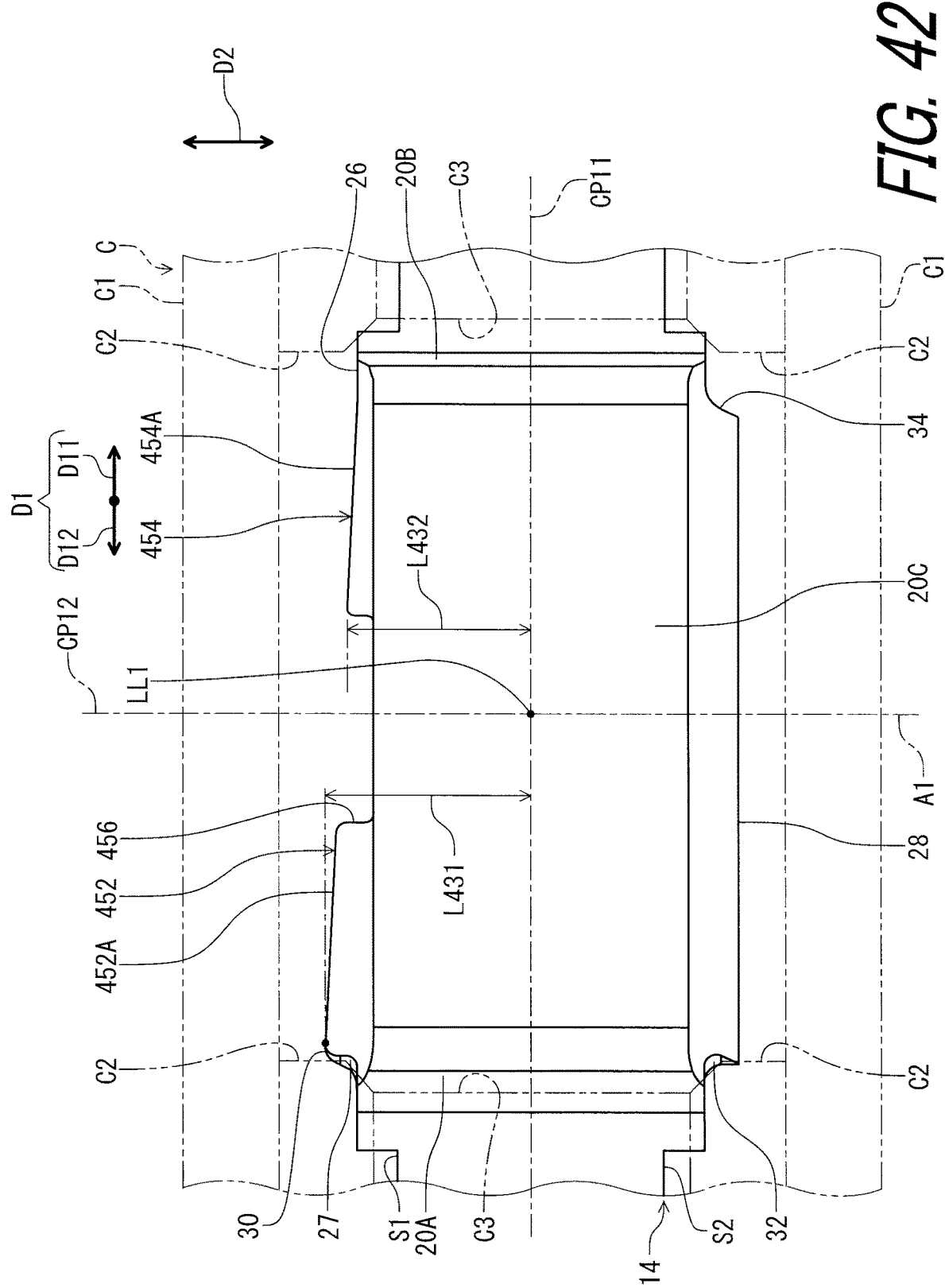
FIG. 42 is a plan view of a first tooth of a bicycle sprocket in accordance with a modification of the fourth embodiment.

The at least one first tooth 420 includes a groove 456 defined between the first projection 452 and the second projection 454 in the circumferential direction D1. The first projection 452 has a first maximum axial length L431 defined from the first tooth center plane CP11 in the axial direction D2. The second projection 454 has a second maximum axial length L432 defined from the first tooth center plane CP11 in the axial direction D2. The second maximum axial length L432 is different from the first maximum axial length L431. In this embodiment, the first maximum axial length L431 is larger than the second maximum axial length L432. The first projection 452 is provided on a downstream side of the second projection 454 in the driving rotational direction D11 in which the bicycle sprocket 412 is rotated during pedaling. As seen in FIG. 42, however, the first projection 452 is provided on an upstream side of the second projection 454 in the driving rotational direction D11 in which the bicycle sprocket 412 is rotated during pedaling.

Figure 43:
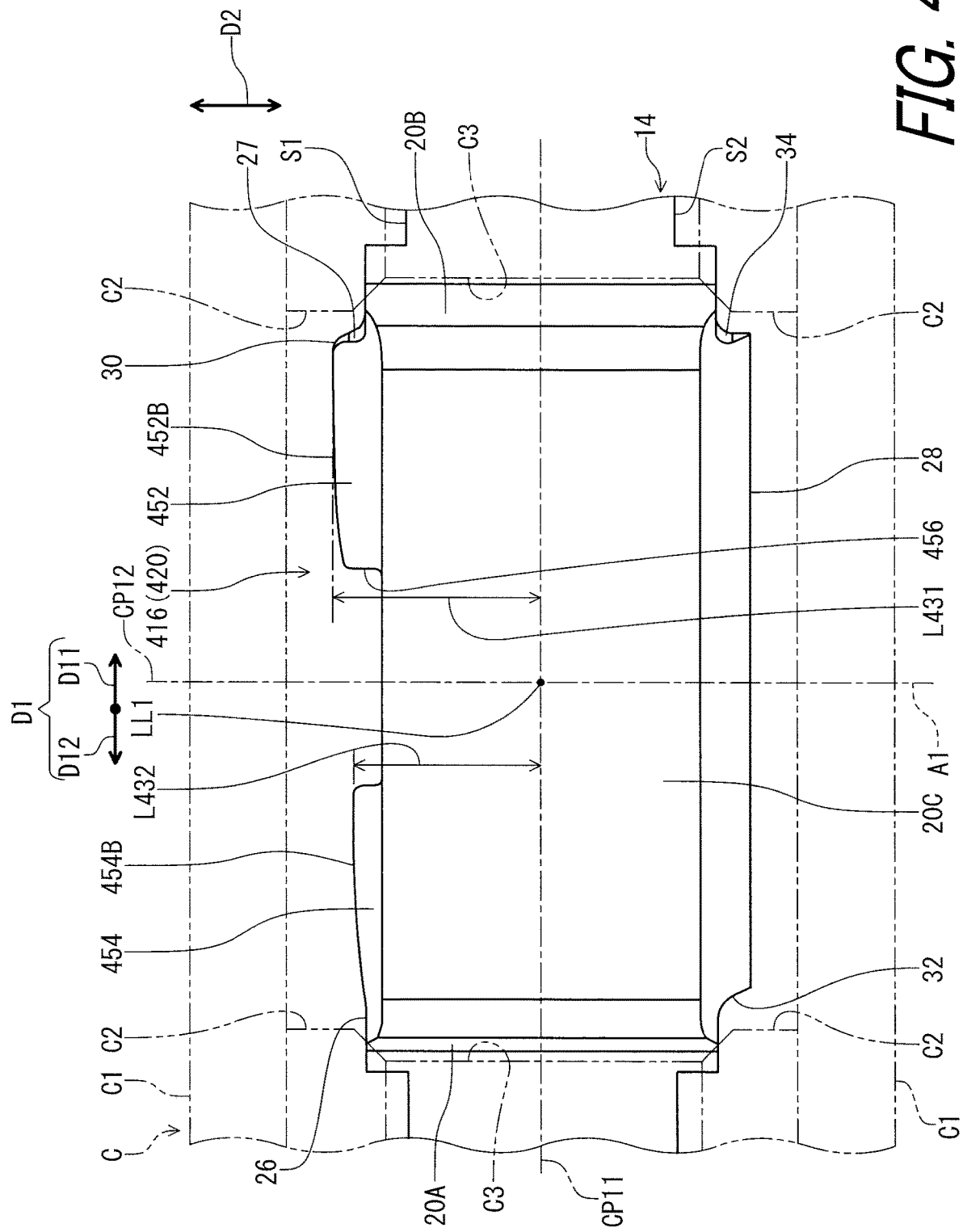
FIG. 43 is a plan view of a first tooth of a bicycle sprocket in accordance with another modification of the fourth embodiment.

As seen in FIG. 41, at least one of the first projection 452 and the second projection 454 includes an inclined surface inclined with respect to the first tooth center plane CP11 in the circumferential direction D1 with respect to the rotational center axis A1. In this embodiment, the first projection 452 includes an inclined surface 452A inclined with respect to the first tooth center plane CP11 in the circumferential direction D1 with respect to the rotational center axis A1. The second projection 454 includes an inclined surface 454A inclined with respect to the first tooth center plane CP11 in the circumferential direction D1 with respect to the rotational center axis A1. As seen in FIG. 43, however, at least one of the first projection 452 and the second projection 454 can include a projection end having a curved surface. In this modification, the first projection 452 includes a projection end 452B having a curved surface. The second projection 454 includes a projection end 454B having a curved surface. However, the shapes of the first projection 452 and the second projection 454 are not limited to this embodiment.

Figure 44:
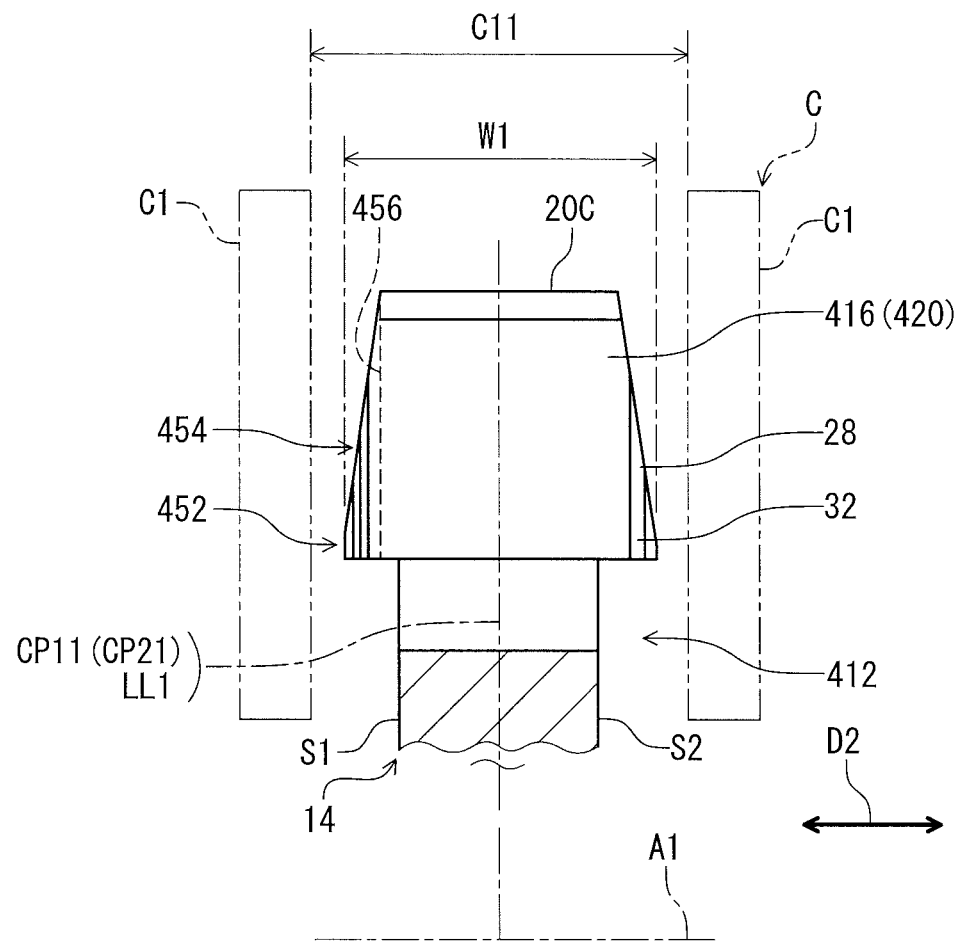
FIG. 44 is a partial cross-sectional view of the bicycle sprocket taken along line XXXXIV-XXXXIV of FIG. 40.

As seen in FIG. 44, the first projection 452 at least partly overlaps with the second projection 454 when viewed in the circumferential direction D1 with respect to the rotational center axis A1. In this embodiment, the first projection 452 partly overlaps with the second projection 454 when viewed in the circumferential direction D1 with respect to the rotational center axis A1. However, the first projection 452 can entirely overlap with the second projection 454 when viewed in the circumferential direction D1 with respect to the rotational center axis A1. A total number of projections is not limited to this embodiment. The first tooth 420 can include three or more projections such as the first and second projections 452 and 454.

With the bicycle sprocket 412, it is possible to obtain substantially the same effect as that of the bicycle sprocket 12 of the first embodiment.

Fifth Embodiment

A bicycle sprocket 512 in accordance with a fifth embodiment will be described below referring to FIG. 45. The bicycle sprocket 512 has the same structure as that of the bicycle sprocket 12 except for a shifting facilitation recess. Thus, elements having substantially the same function as those in the above embodiments will be numbered the same here, and will not be described and/or illustrated again in detail here for the sake of brevity.

Figure 45:
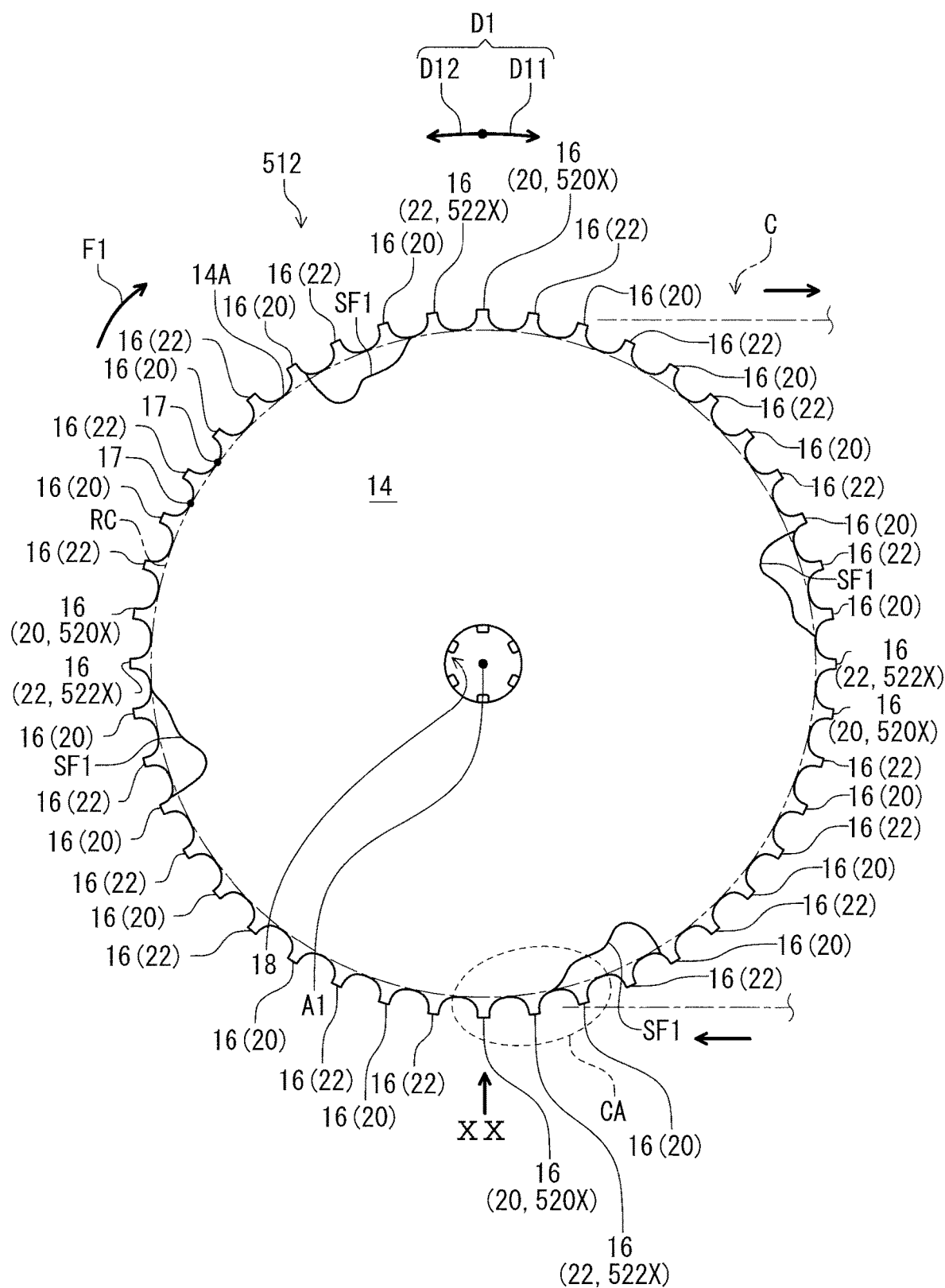
FIG. 45 is a side elevational view of a bicycle sprocket in accordance with a fifth embodiment.

As seen in FIG. 45, the bicycle sprocket 512 comprises the sprocket body 14 and sprocket teeth 16. The sprocket teeth 16 include at least one first tooth 20 and the at least one second tooth 22. The bicycle sprocket 512 further comprises shifting facilitation recesses SF1 each configured to facilitate a first shifting operation in which the bicycle chain C is shifted from the bicycle sprocket 12 to the sprocket SP2 (FIG. 2). Specifically, the shifting facilitation recess SF1 is provided on the second side surface S2 to reduce interference between the bicycle sprocket 512 and the bicycle chain C in the first shifting operation. The second teeth 22 include a derailing tooth 522X configured to first derail the bicycle chain C from the bicycle sprocket 512 in the first shifting operation. The first teeth 20 include a first tooth 520X adjacent to the derailing tooth 522X in the circumferential direction D1 without another tooth between the first tooth 520X and the derailing tooth 522X. The first tooth 520X is provided on a downstream side of the derailing tooth 522X in the driving rotational direction D11.

For example, the bicycle chain C is first derailed from the bicycle sprocket 512 in the chain-engagement area CA when a rear derailleur (not shown) moves the bicycle chain C toward the sprocket SP2 (FIG. 2). As seen in FIG. 20, since the first chain-facing surface 24 of the first tooth 520X (FIG. 45) is inclined with respect to the first tooth center plane CP11 in the circumferential direction D1, the first chain-facing surface 24 of the first tooth 22X (FIG. 45) facilitates movement of the bicycle chain C toward the sprocket SP2 (FIG. 2) in the chain-engagement area CA. This facilitates derailing of the bicycle chain C at the derailing tooth 522X in the first shifting operation.

Sixth Embodiment

A bicycle sprocket 612 in accordance with a sixth embodiment will be described below referring to FIG. 46. The bicycle sprocket 612 has the same structure as that of the bicycle sprocket 12 except for a shifting facilitation recess. Thus, elements having substantially the same function as those in the above embodiments will be numbered the same here, and will not be described and/or illustrated again in detail here for the sake of brevity.

The structure of the first teeth of the first to fourth embodiments can applied to at least one of the sprockets SP2 to SP11. For example, as seen in FIG. 46, the bicycle sprocket 612 corresponds to the sprocket SP2 and comprises the sprocket body 14 and sprocket teeth 316. The sprocket teeth 316 include at least one first tooth 320 and the at least one second tooth 22. The bicycle sprocket 612 further comprises shifting facilitation recesses SF2 each configured to facilitate a first shifting operation in which the bicycle chain C is shifted from the bicycle sprocket 612 to the sprocket SP3 (FIG. 2). Specifically, the shifting facilitation recess SF2 is provided on the second side surface S2 to reduce interference between the bicycle sprocket 612 and the bicycle chain C in the first shifting operation. The second teeth 22 include a derailing tooth 622X configured to first derail the bicycle chain C from the bicycle sprocket 612 in the first shifting operation. The first teeth 20 include a first tooth 620X adjacent to the derailing tooth 622X in the circumferential direction D1 without another tooth between the first tooth 620X and the derailing tooth 622X. The first tooth 620X is provided on a downstream side of the derailing tooth 622X in the driving rotational direction D11.

Figure 47:
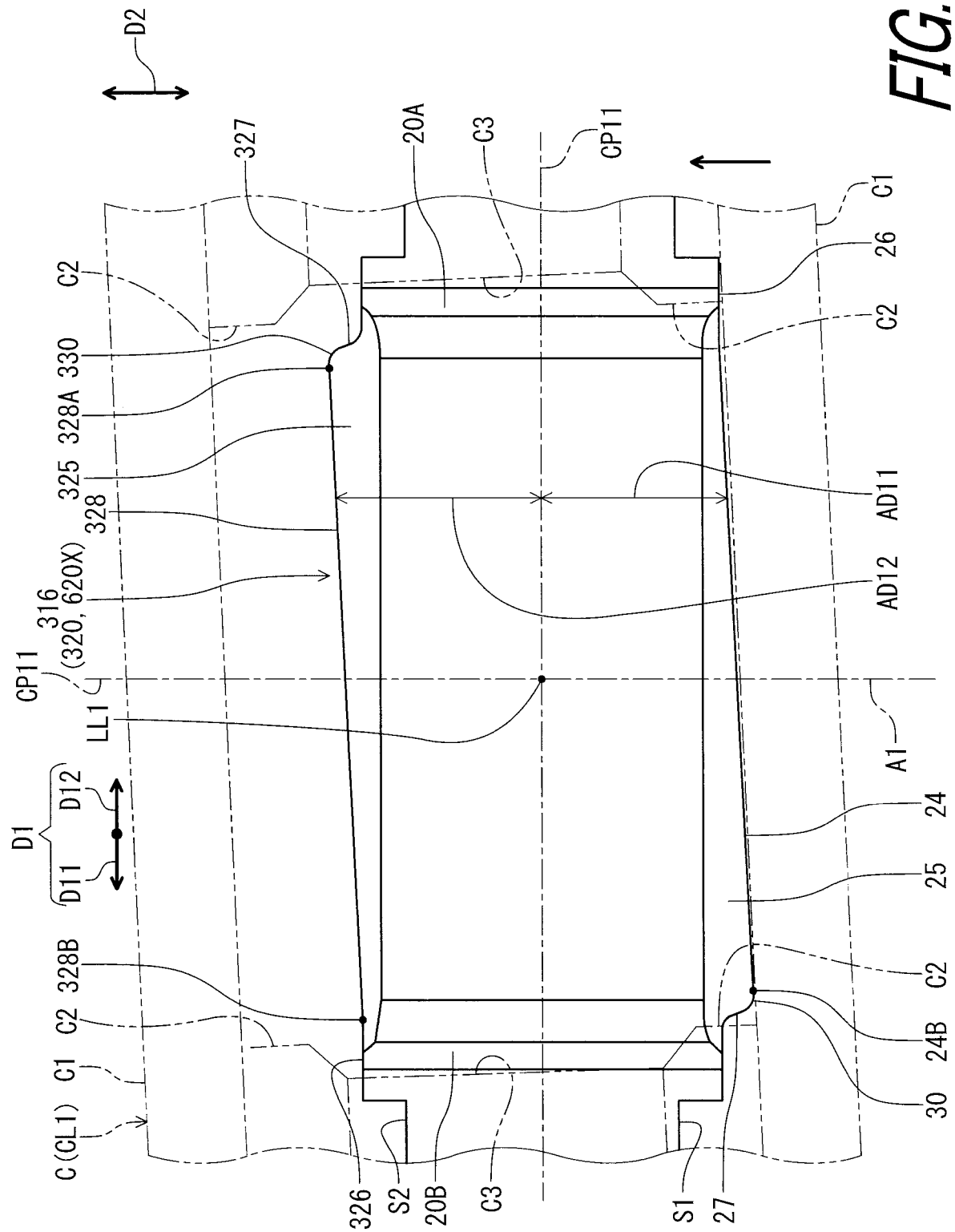
FIG. 47 is an arrow view of the bicycle sprocket taken in a direction of arrow XXXXVII of FIG. 46.

For example, the bicycle chain C is first derailed from the bicycle sprocket 612 in the chain-engagement area CA when a rear derailleur (not shown) moves the bicycle chain C toward the sprocket SP3 (FIG. 2). As seen in FIG. 47, since the first chain-facing surface 24 of the first tooth 620X (FIG. 45) is inclined with respect to the first tooth center plane CP11 in the circumferential direction D1, the first chain-facing surface 24 of the first tooth 22X (FIG. 45) facilitates movement of the bicycle chain C toward the sprocket SP3 (FIG. 2) in the chain-engagement area CA. This facilitates derailing of the bicycle chain C at the derailing tooth 622X in the first shifting operation.

Figure 46:
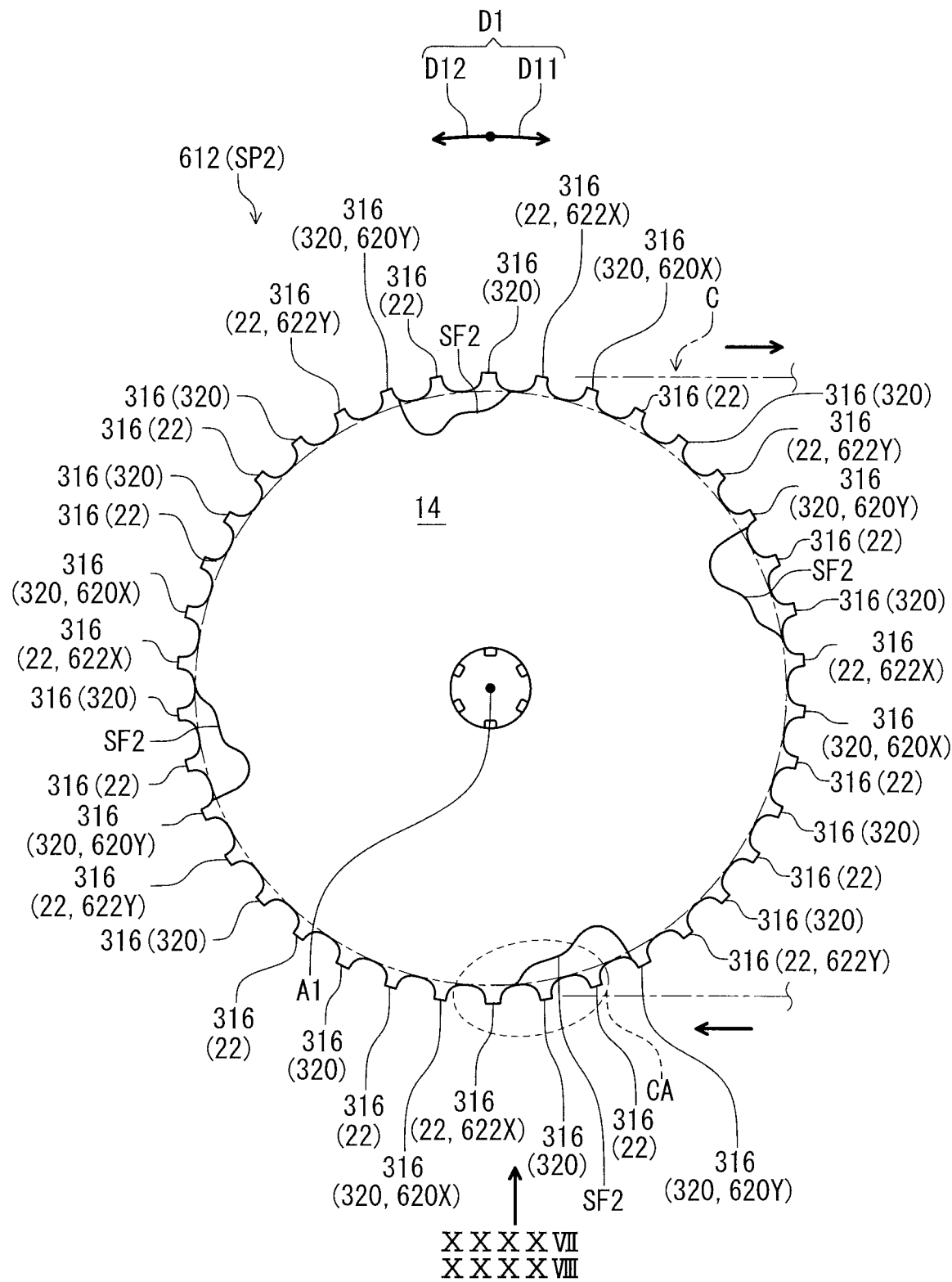
FIG. 46 is a side elevational view of a bicycle sprocket in accordance with a sixth embodiment.

Furthermore, as seen in FIG. 46, the shifting facilitation recesses SF2 are each configured to facilitate a second shifting operation in which the bicycle chain C is shifted from the sprocket SP3 (FIG. 2) to the bicycle sprocket 612. Specifically, the shifting facilitation recess SF2 is provided on the second side surface S2 to reduce interference between the bicycle sprocket 612 and the bicycle chain C in the second shifting operation. The second teeth 22 include a derailing tooth 622Y configured to first derail the bicycle chain C from the bicycle sprocket 612 in the second shifting operation. The first teeth 20 include a first tooth 620Y adjacent to the derailing tooth 622Y in the circumferential direction D1 without another tooth between the first tooth 620Y and the derailing tooth 622Y. The first tooth 620Y is provided on a downstream side of the derailing tooth 622Y in the driving rotational direction D11.

Figure 48:
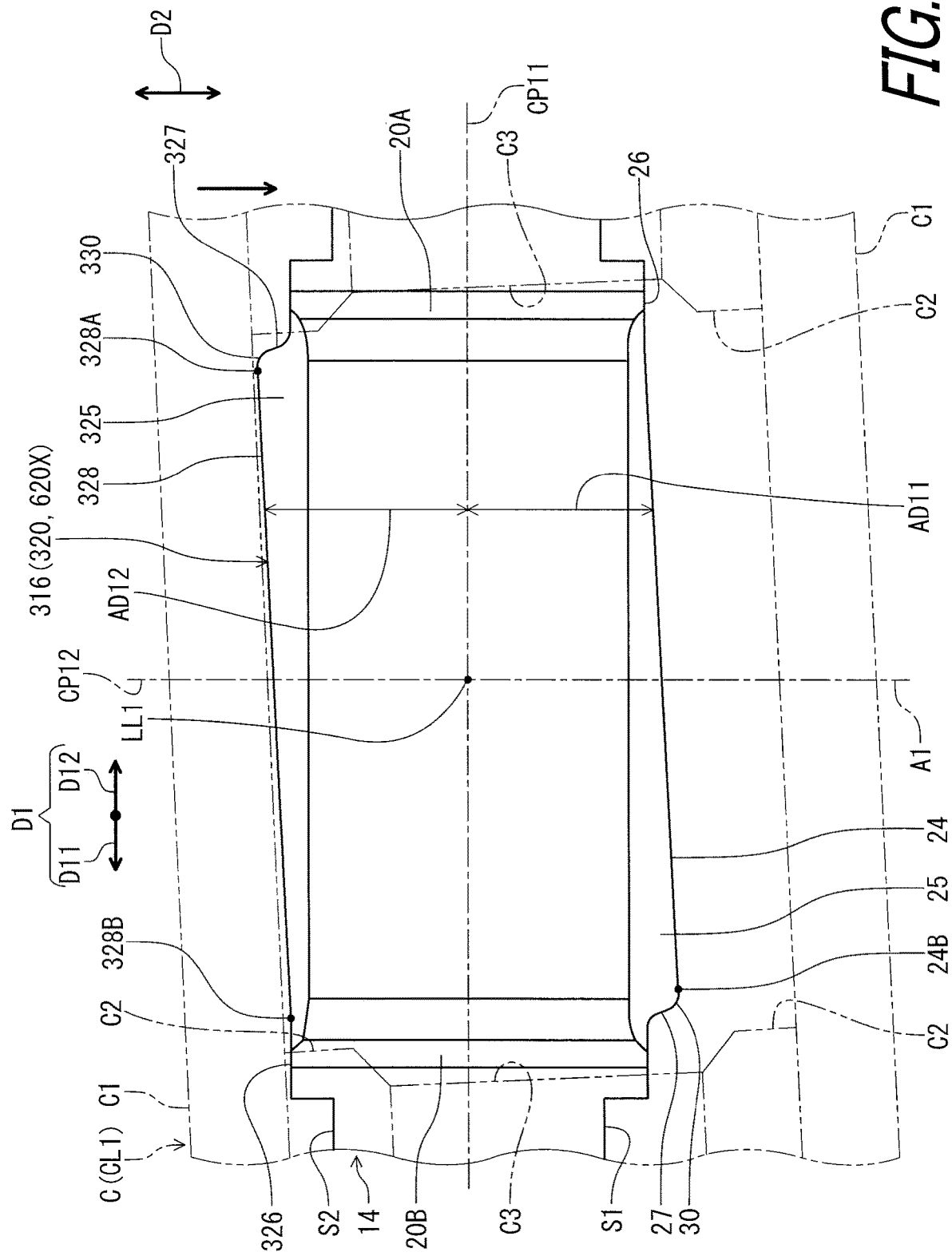
FIG. 48 is an arrow view of the bicycle sprocket taken in a direction of arrow XXXXVIII of FIG. 46.

The bicycle chain C is first derailed from the bicycle sprocket 612 in the chain-engagement area CA when the rear derailleur (not shown) moves the bicycle chain C toward the bicycle sprocket 12 (FIG. 2). As seen in FIG. 48, since the first additional chain-facing surface 328 of the first tooth 620Y (FIG. 46) is inclined with respect to the first tooth center plane CP11 in the circumferential direction D1, the first additional chain-facing surface 328 of the first tooth 22X (FIG. 46) facilitates movement of the bicycle chain C toward the bicycle sprocket 12 (FIG. 2) in the chain-engagement area CA. This facilitates derailing of the bicycle chain C at the derailing tooth 622Y in the second shifting operation.

Modifications

Figure 49:
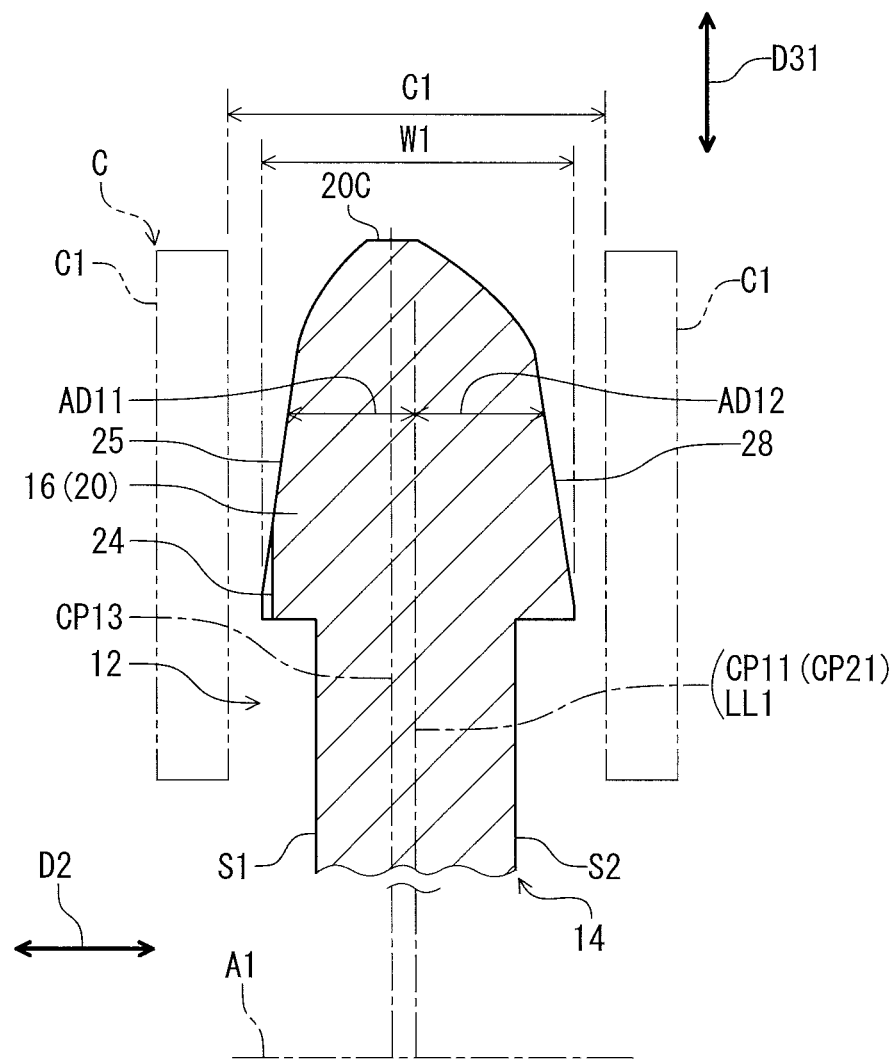
FIG. 49 is a partial cross-sectional view of a bicycle sprocket in accordance with a modification.

As seen in FIG. 49, the first tooth tip 20C of the at least one first tooth 20 can has a first tooth-tip center plane CP13 perpendicular to the rotational center axis A1. The first tooth-tip center plane CP13 is offset from the first tooth center plane CP11 in the axial direction D2. The first teeth 220, 320, and 420 of the second to sixth embodiments can have such structures illustrated in FIG. 49.

Figure 50:
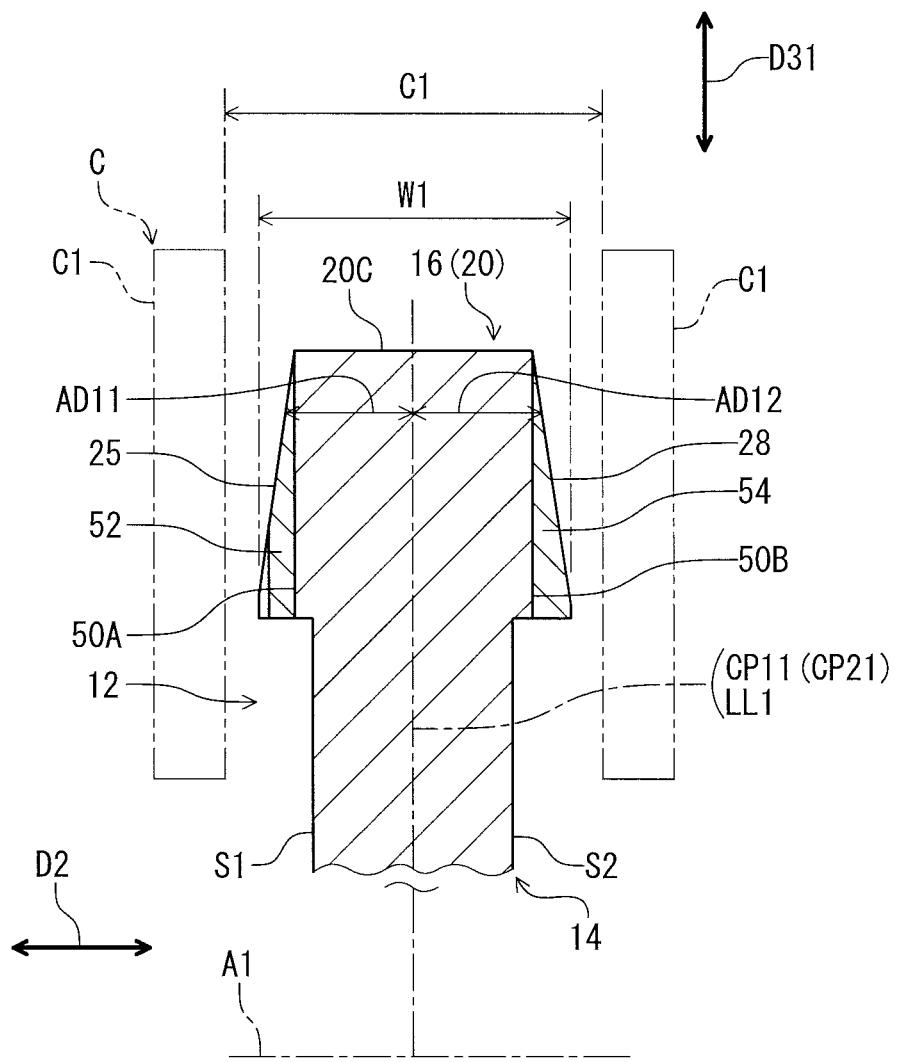
FIG. 50 is a partial cross-sectional view of a bicycle sprocket in accordance with another modification.

As seen in FIG. 50, the at least one first tooth 20 can include a first tooth body 50, a first side part 52, and a second side part 54. The first tooth body 50 includes a first axial surface 50A and a first additional axial surface 50B provided on a reverse side of the first axial surface 50A in the axial direction D2. The first side part 52 is attached to the first axial surface 50A as a separate member from the first tooth body 50. The second side part 54 is attached to the first additional axial surface 50B as a separate member from the first tooth body 50. The first side part 52 includes the first chain-facing surface 24. The second side part 54 includes the first additional chain-facing surface 28. For example, the first tooth body 50 is made of a metallic material, and the first side part 52 is made of a metallic material different from the metallic material of the first tooth body 50. The second side part 54 is made of a metallic material different from the metallic material of the first tooth body 50. The metallic material of the second side part 54 can be the same as or different from the metallic material of the first side part 52. The first side part 52 can be made of a non-metallic material such a resin material. The second side part 54 can be made of a non-metallic material such a resin material. The first teeth 220, 320, and 420 of the second to sixth embodiments can have such structures illustrated in FIG. 50.

Figure 51:
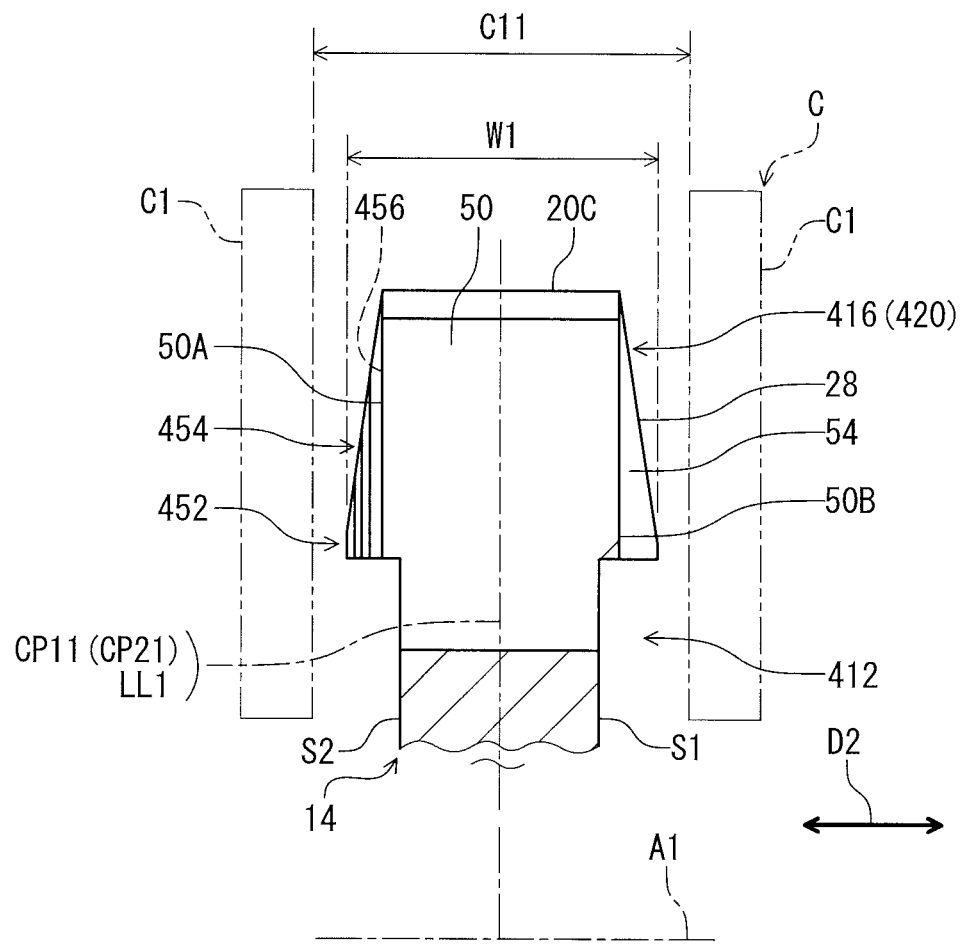
FIG. 51 is a partial cross-sectional view of a bicycle sprocket in accordance with another modification.

For example, as seen in FIGS. 51 and 52, at least one of the first projection 452 and the second projection 454 can be attached to the first axial surface 50A as a separate member from the first tooth body 50. In this modification, the first projection 452 and the second projection 454 are attached to the first axial surface 50A as a separate member from the first tooth body 50. At least one of the first projection 452 and the second projection 454 can be made of a metallic material. In this embodiment, the first projection 452 and the second projection 454 are made of a metallic material. However, at least one of the first projection 452 and the second projection 454 can be made of a non-metallic material such as a resin material.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
    a sprocket body;
    sprocket teeth extending radially outwardly from an outer periphery of the sprocket body with respect to a rotational center axis of the bicycle sprocket, the sprocket teeth including at least one first tooth having
        a first maximum chain-engaging width defined in an axial direction parallel to the rotational center axis,
        a first tooth center plane defined to bisect the first maximum chain-engaging width in the axial direction,
        a first projection having a first maximum axial length defined from the first tooth center plane in the axial direction, and
        a second projection having a second maximum axial length defined from the first tooth center plane in the axial direction, the second maximum axial length being different from the first maximum axial length.

2. The bicycle sprocket according to claim 1, wherein
the sprocket teeth further include at least one second tooth, and
the at least one second tooth has a second maximum chain-engaging width defined in the axial direction, the first maximum chain-engaging width being larger than the second maximum chain-engaging width.

3. The bicycle sprocket according to claim 2, wherein
the first maximum chain-engaging width is larger than an axial length of an inner link space defined between an opposed pair of inner link plates of a bicycle chain in the axial direction and smaller than an axial length of an outer link space defined between an opposed pair of outer link plates of the bicycle chain in the axial direction, and
the second maximum chain-engaging width is smaller than the axial length of the inner link space.

4. The bicycle sprocket according to claim 1, wherein
the first projection at least partly overlaps with the second projection when viewed in a circumferential direction with respect to the rotational center axis.

5. The bicycle sprocket according to claim 1, wherein
the first maximum axial length is larger than the second maximum axial length.

6. The bicycle sprocket according to claim 5, wherein
the first projection is provided on an upstream side of the second projection in a driving rotational direction in which the bicycle sprocket is rotated during pedaling.

7. The bicycle sprocket according to claim 5, wherein
the first projection is provided on a downstream side of the second projection in a driving rotational direction in which the bicycle sprocket is rotated during pedaling.

8. The bicycle sprocket according to claim 1, wherein
at least one of the first projection and the second projection includes an inclined surface inclined with respect to the first tooth center plane in a circumferential direction with respect to the rotational center axis.

9. The bicycle sprocket according to claim 1, wherein
at least one of the first projection and the second projection includes a projection end having a curved surface.

10. The bicycle sprocket according to claim 1, wherein
the at least one first tooth includes a first tooth body including
    a first axial surface, and
    a first additional axial surface provided on a reverse side of the first axial surface in the axial direction, and
at least one of the first projection and the second projection is attached to the first axial surface as a separate member from the first tooth body.

11. The bicycle sprocket according to claim 10, wherein
at least one of the first projection and the second projection is made of a metallic material.

12. The bicycle sprocket according to claim 10, wherein at least one of the first projection and the second projection is made of a non-metallic material.

* * * * *